(12) United States Patent
Aronson

(10) Patent No.: US 12,047,376 B2
(45) Date of Patent: *Jul. 23, 2024

(54) UNIVERSAL OPERATING SYSTEM

(71) Applicant: Jeffry David Aronson, San Antonio, TX (US)

(72) Inventor: Jeffry David Aronson, San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/998,868

(22) Filed: Aug. 20, 2020

(65) Prior Publication Data

US 2021/0037014 A1 Feb. 4, 2021

Related U.S. Application Data

(63) Continuation-in-part of application No. 15/483,970, filed on Apr. 10, 2017, which is a continuation-in-part
(Continued)

(51) Int. Cl.
*H04L 29/06* (2006.01)
*G06F 21/60* (2013.01)
(Continued)

(52) U.S. Cl.
CPC .............. *H04L 63/10* (2013.01); *G06F 21/60* (2013.01); *G06F 21/6218* (2013.01);
(Continued)

(58) Field of Classification Search
CPC ....... H04L 63/10; H04L 63/102; H04L 63/20; H04L 63/0876; H04L 41/50; G06F 21/60; G06F 21/6218; G06F 21/6263
See application file for complete search history.

(56) References Cited

U.S. PATENT DOCUMENTS

2002/0171546 A1* 11/2002 Evans ............... G06F 21/88
340/540
2003/0074568 A1* 4/2003 Kinsella ............. G06F 21/34
713/186
(Continued)

FOREIGN PATENT DOCUMENTS

CN 103944728 A * 7/2014 ............. G06F 21/44

*Primary Examiner* — Noura Zoubair
(74) *Attorney, Agent, or Firm* — John A. Fortkort; Fortkort & Houston PC

(57) ABSTRACT

A universal operating system and associated processes and procedures, which, together, are configurable to provide at least one operating system resource. The at least one operating system resource may be utilized by at least one cyber system for providing at least one individual with safe, secure, private cyber interactions with accurately identified instances of the individual's cyber devices, with other parties, and with the cyber devices of other parties. Processes and procedures are also provided which may be configured to provide an individual with the ability to selectively grant or selectively deny another party or a cyber device access to at least one part of the individual's cyber activities, cyber interactions, cyber assets, and cyber resources. A universal operating system is also provided which is configurable for providing interoperable use of cyber content, cyber devices, and cyber programming throughout at least one cyber system.

9 Claims, 18 Drawing Sheets

Related U.S. Application Data of application No. 15/236,337, filed on Aug. 12, 2016, now Pat. No. 9,660,996, which is a continuation-in-part of application No. 14/447,283, filed on Jul. 30, 2014, now Pat. No. 9,479,507, which is a continuation of application No. 13/702,537, filed as application No. PCT/US2011/056931 on Oct. 19, 2011, now Pat. No. 8,832,794, which is a continuation-in-part of application No. 12/908,162, filed on Oct. 20, 2010, now abandoned.

(51) Int. Cl.
| | | |
|---|---|---|
| *G06F 21/62* | (2013.01) | |
| *H04L 9/40* | (2022.01) | |
| *H04L 12/24* | (2006.01) | |
| *H04L 41/50* | (2022.01) | |
| *G06F 1/16* | (2006.01) | |

(52) U.S. Cl.
CPC .......... *G06F 21/6263* (2013.01); *H04L 41/50* (2013.01); *H04L 63/0876* (2013.01); *H04L 63/102* (2013.01); *H04L 63/20* (2013.01); *G06F 1/162* (2013.01); *G06F 1/1622* (2013.01); *G06F 1/1641* (2013.01); *G06F 2221/2101* (2013.01); *G06F 2221/2149* (2013.01)

(56) References Cited

U.S. PATENT DOCUMENTS

| | | | | |
|---|---|---|---|---|
| 2010/0280635 | A1* | 11/2010 | Cohn | H04L 69/26 |
| | | | | 700/90 |
| 2013/0281077 | A1* | 10/2013 | Zou | H04L 65/1059 |
| | | | | 455/418 |
| 2017/0064554 | A1* | 3/2017 | Li | H04L 63/101 |

* cited by examiner

UNIVERSAL OPERATING SYSTEM

CROSS REFERENCE TO RELATED APPLICATIONS

This application is a continuation-in-part application claiming priority to U.S. patent application Ser. No. 15/483,970, filed Apr. 10, 2017 entitled "SCALABLE CONFIGURABLE UNIVERSAL OPERATING SYSTEM," having the same inventor, and which is incorporated herein by reference in its entirety; which application is a continuation-in-part application claiming priority to U.S. patent application Ser. No. 15/236,337, now U.S. Pat. No. 9,660,996 (Aronson) filed Aug. 12, 2016 entitled "POINT-OF-CYBER-ACCESS CYBER SYSTEM,", having the same inventor, and which is incorporated herein by reference in its entirety; which application is a continuation-in-part application claiming priority to U.S. patent application Ser. No. 14/447,283, now U.S. Pat. No. 9,479,507 (Aronson), filed Jul. 30, 2014 entitled "SINGLE-POINT-OF-ACCESS CYBER SYSTEM," having the same inventor, and which is incorporated herein by reference in its entirety; which application is a continuation application claiming priority to U.S. Ser. No. 13/702,537, now U.S. Pat. No. 8,832,794 (Aronson), filed Mar. 4, 2013, entitled "SINGLE-POINT-OF-ACCESS CYBER SYSTEM," having the same inventor, and which is incorporated herein by reference in its entirety, filed as application PCT/US2011/056931 in Oct. 19, 2011, and which is incorporated herein by reference in its entirety; which application is a continuation-in-part application claiming priority to U.S. Ser. No. 12/908,162, filed Oct. 20, 2010, entitled "SINGLE-POINT-OF-ACCESS CYBER SYSTEM, having the same inventor, now abandoned, and which is incorporated herein by reference in its entirety.

FIELD OF THE DISCLOSURE

The present disclosure pertains generally to a universal operating system that may be scaled or configured to provide for cyber interactions among people, entities and cyber devices. More particularly, the present disclosure pertains to a universal operating system, universal operating system processes and universal operating system procedures that, together, are configurable for providing at least one operating system resource that may be utilized by at least one cyber system or at least one cyber system component or resource for providing at least one person or at least one entity with at least one member selected from the group consisting of: (a) safe, secure, private cyber interactions with the at least one person's or the at least one entity's accurately identified cyber devices, (b) safe, secure, private cyber interactions with accurately identified other people or other entities, and (c) safe, secure, private cyber interactions with the accurately identified cyber devices of other people or other entities. In addition, the present disclosure also pertains to processes and procedures that may be configured to provide people or entities with the ability to selectively grant or to selectively deny other people, other entities or cyber devices of other people or entities access to all or part of the person's or the entity's cyber activities, cyber interactions, cyber assets, or cyber resources. The present disclosure further pertains to a universal operating system that may be configured to provide a person or an entity with interoperable use of: (i) cyber devices, (ii) cyber content, and (iii) cyber programming of any kind, throughout at least one cyber system.

BACKGROUND OF THE DISCLOSURE

People or entities that utilize prior art cyber systems have little or no assurance or expectations that these systems will provide any one person or any one entity with security, privacy, or the ability to accurately grant or deny other people, other entities or the cyber devices of other people or other entities access to all or part of at least one member selected from the group consisting of: (a) the person's or the entity's cyber activities, (b) the person's or the entity's cyber interactions, (c) the person's or the entity's cyber assets, or (d) the person's or the entity's cyber resources. In addition, prior art cyber systems cannot provide a person or an entity with accurate testing or verification of the identities of any other person, any other entity, or any other cyber devices with whom, through use of these cyber systems, the person or the entity may interact. Further, prior art cyber systems do not provide for cyber system-wide interoperable use of any cyber device, cyber programming, or cyber content.

There thus remains a need in the art for universal operating system programming that can be utilized in conjunction with cyber devices of cyber systems to provide a safe and secure cyber system that provides people or entities with safety, security, and privacy for the person's or the entity's cyber activities, and that also provide accurate and reliable control over access by any other person or any other entity to the person's or the entities': (a) cyber activities, (b) cyber interactions, (c) cyber assets, or (d) cyber resources. In addition, a need remains in the art for a combination of universal operating system programming and cyber system devices that are configured to accurately identify at least one cyber device, at least one person or at least one entity that uses the at least one cyber system. Further, a need remains in the art for a combination of universal operating system programming and cyber system devices that provide cyber system-wide interoperable use of any cyber device, cyber programming, or cyber content.

SUMMARY OF THE DISCLOSURE

Unless otherwise specified herein, throughout this entire disclosure, use of the singular form of any word, phrase or statement indicates either the singular or the plural form of the word, phrase or statement, and use of the plural form of any word, phrase or statement indicates either the singular or the plural form of the word, phrase or statement. Additionally, the term "or" shall be construed as the logically inclusive "or". Hence, the statement "A or B" shall be true if: (a) only A is true, (b) only B is true, or (c) both A and B are true; the notation "A and/or B" explicitly refers to the logically inclusive "or".

A universal operating system is disclosed herein. The universal operating system includes programming that provides or enables processes or procedures that may be configured to be utilized in combination with the processes, procedures, system architectures, device architectures, and devices of at least one cyber system to provide at least one person or at least one entity with a safe and secure cyber system. Within a properly configured safe and secure cyber system each person, each entity and each cyber device may be accurately identified prior to at least one cyber interaction with: (a) a person, (b) an entity, or (c) a cyber device. The programming of the universal operating system may also be configured to provide a person or an entity with at least one level of privacy that is requested or required by the person or the entity for the person's or the entity's cyber activities, cyber assets, or cyber resources. The universal operating system may also be configured to provide for cyber system-wide interoperable use of any cyber device, cyber programming, or cyber content that may either be configured to be used with the universal operating system, or that may be converted for use with the universal operating system through utilization of interoperability processes or procedures that are components of the universal operating system.

In one aspect in combination with a point-of-cyber-access cyber system, a tangible, non-transient medium having sufficient programming instructions recorded therein which, when executed by at least one computer processor, performs the step of:

establishing a universal operating system which provides or enables processes or procedures that are utilizable for at least one operation of at least one component of the point-of-cyber-access cyber system;

wherein the point-of-cyber-access cyber system is utilizable by at least one individual or at least one cyber device;

wherein the point-of-cyber-access cyber system includes at least one component selected from the group consisting of
  (a) at least one cyber communications network,
  (b) at least one cyber portal,
  (c) at least one point of cyber access computer,
  (d) at least one private computer,
  (e) at least one public computer,
  (f) at least one cyber telephone system,
  (g) at least one cyber device manager,
  (h) at least one operating system
  (i) at least one cyber asset, or
  (j) at least one cyber resource;

wherein the universal operating system is configurable and can be configured in at least one configuration;

wherein the universal operating system is scalable and can be scaled to include universal operating system resources that fall at one point in a range of from a minimum to a maximum, wherein at the minimum the universal operating system is scaled to provide for the least complex of needs for included universal operating system resources, and wherein at the maximum, the universal operating system is scaled to include all of the universal operating system resources that are needed to provide for every need from the spectrum of needs for universal operating system resources;

wherein the universal operating system is configurable for requiring the at least one individual or the at least one cyber device pass at least one accurate identity test prior to or immediately prior to gaining initial access to at least one resource or at least one component of or from the point-of-cyber-access cyber system;

wherein the universal operating system is configurable for requiring that the at least one individual or the at least one cyber device constantly passes accurate identity tests during the entire period of time the at least one individual or the at least one cyber device is utilizing at least one resource or at least one component of or from the point-of-cyber-access cyber system;

wherein the universal operating system is further comprised of all or part of at least one member selected from the group consisting of
  (a) programming that provides or enables processes or procedures that accurately test the identity of any one specific individual or any one specific cyber device,
  (b) programming that provides or enables processes or procedures that require the at least one individual or the at least one cyber device pass at least one accurate identity test prior to or immediately prior to at least one cyber interaction of the at least one individual or the at least one cyber device taking at least one step throughout the point-of-cyber-access cyber system,
  (c) programming that provides or enables processes or procedures that require the at least one individual or the at least one cyber device pass at least one accurate identity test immediately prior to every step that at least one cyber interaction of the at least one individual or the at least one cyber device carries out throughout the point-of-cyber-access cyber system,
  (d) programming that provides or enables processes or procedures for the operations of or the use of at least one cyber communications network,
  (e) programming that provides or enables processes or procedures for the operations of or the use of at least one cyber portal,
  (f) programming that provides or enables processes or procedures for the operations of or the use of at least one point of cyber access computer,
  (g) programming that provides or enables processes or procedures for the operations of or the use of at least one private computer,
  (h) programming that provides or enables processes or procedures for the operations of or the use of at least one public computer,
  (i) programming that provides or enables processes or procedures for the operations of or the use of at least one device-based cyber asset,
  (j) programming that provides or enables processes or procedures for the operations of or the use of at least one device-based cyber resource,
  (k) programming that provides or enables processes or procedures for the operations of or the use of at least one cyber device manager,
  (l) programming that provides or enables processes or procedures for the operations of or the use of at least one cyber telephone system,
  (m) programming that provides or enables processes or procedures for the operations of or the use of at least cyber transfer packet system,
  (n) programming that provides or enables processes or procedures for the operations of or the use of at least one mobile or in-motion cyber device,
  (o) programming that provides or enables processes or procedures for the operations of or the use of at least one cyber vault,
  (p) programming that provides or enables processes or procedures for the operations of or the use of at least one cyber health system,
  (q) programming that provides or enables processes or procedures for the operations of or the use of at least one member selected from the group consisting of
    (i) at least one health care related cyber device,
    (ii) at least one health care related cyber asset, or
    (iii) at least one health care related cyber resource,
  (r) programming that provides or enables processes or procedures for the operations of or the use of at least one cyber rights licensing system,
  (s) programming that provides or enables processes or procedures for the operations of or the use of at least one cyber mail system,
  (t) programming that provides or enables processes or procedures for the operations of or the use of at least one cyber site, (v) programming that provides or enables processes or procedures for the operations of, or the use of at least one cyber education system, (w) programming that provides or enables processes or procedures for the operations of or the use of at least one cyber payment system, (x) programming that provides or enables processes or procedures for the operations of or the use of at least one universal operating system-standard device interconnection interface that may be utilized by at least one cyber device, (y) programming that provides or enables processes or procedures for the operations of or the use of a frames and scrolls system or format for interactive image-based cyber content, (z) programming that provides or enables processes or procedures for the operations of or the use of at least one autonomous device, (aa) programming that provides or enables processes or procedures for at least one member selected from the group consisting of
  (i) creating,
  (ii) accessing,
  (iii) modifying,
  (iv) using,
  (v) sharing,
  (vi) storing, or
  (vii) managing,
at least one file-based cyber asset, (bb) programming that provides or enables processes or procedures for at least one member selected from the group consisting of
  (i) creating,
  (ii) accessing,
  (iii) modifying,
  (iv) using,
  (v) sharing,
  (vi) storing, or
  (vii) managing,
at least one file-based cyber resource, (cc) programming that provides or enables processes or procedures that provide security, (dd) programming that provides or enables processes or procedures that provide historical records regarding at least one aspect of at least one operation of or from a point-of-cyber-access cyber system, and (ee) programming that provides or enables processes or procedures that enable an individual to exclusively select at least one setting of at least one member selected from the group consisting of
  (i) at least one administrative setting of the individual's point-of-cyber-access cyber system components or resources,
  (ii) at least one operational settings of the individual's point-of-cyber-access cyber system components or resources, and
  (iii) at least one access control settings of the individual's point-of-cyber-access cyber system components or resources;

and wherein said universal operating system is configurable for providing or utilizing (a) cyber device perimeters that cannot be penetrated, (b) programming that constantly tests, with 100% accuracy, the identity of any one specific individual or any one specific cyber device, (c) programming that requires every one specific individual and every one specific cyber device constantly pass 100% accurate identity tests when the one specific individual or the one specific cyber device is interacting with or utilizing at least one component or at least one resource of or from the point-of-cyber-access cyber system, (d) programming that constantly tests, with 100% accuracy, the identity of any one specific individual or any one specific cyber device during the entire period of time the one specific individual or the one specific cyber device interacts with or utilizes the at least one component or the at least one resource of or from the point-of-cyber-access cyber system, (e) programming that enables any one specific individual to exclusively select and configure for zero cybersecurity vulnerability
  (i) the administrative settings of the one specific individual's at least one point of cyber access computer, at least one private computer, at least one public computer, at least one cyber device manager, or at least one cyber device,
  (ii) the operational settings of the one specific individual's at least one point of cyber access computer, at least one private computer, at least one public computer, at least one cyber device manager, or at least one cyber device, or
  (iii) the access control settings of the one specific individual's at least one point of cyber access computer, at least one private computer, at least one public computer, at least one cyber device manager, or at least one cyber device, or (f) point-of-cyber-access cyber system architecture and rules, for establishing and maintaining zero cybersecurity vulnerability for at least one member selected from the group consisting of
  (i) at least one point of cyber access computer,
  (ii) at least one private computer,
  (iii) at least one public computer,
  (iv) at least one cyber device manager, or
  (v) at least one other cyber device from within a point-of-cyber-access cyber system that is utilizable by the at least one individual or the at least one cyber device;

wherein zero cybersecurity vulnerability occurs when the point-of-cyber-access cyber system and its at least one component or resource utilize point-of-cyber-access cyber system architecture and rules for zero cybersecurity vulnerability that require every zero cybersecurity vulnerability cyber device to have a perimeter that cannot be penetrated and wherein said cyber device perimeter that cannot be penetrated will include at least one 100% secure access portal that requires the constant passing of 100% accurate identity tests for preventing all individuals or cyber devices that cannot constantly pass 100% accurate identity tests from gaining access to the cybersecurity vulnerabilities of computers, computer processors, computer programming, the architecture of cyber devices and the architecture of components of the point-of-cyber-access cyber system that are within the safe and secure confines of the cyber device perimeters that cannot be penetrated.

In some embodiments of the foregoing combination, the universal operating system further includes programming that provides or enables processes or procedures that require or provide for separate and different processing or support for one member or a combination of two or more members selected from the group consisting of
  (a) an individual's private cyber activities, (b) an individual's private cyber content, or
(c) an individual's private cyber interactions,
as well as separate and different processing or support for one member or a combination of two or more members selected from the group consisting of
  (i) an individual's public cyber activities,
  (ii) an individual's cyber content that is made available to at least one other party, or
  (iii) an individual's public cyber interactions.

In some embodiments of the foregoing combination, the universal operating system further includes programming that provides or enables processes or procedures that provide for interoperable use of at least one member selected from the group consisting of
  (a) at least one cyber program,
  (b) at least one cyber file, or
  (c) at least one cyber device,
that does not operate utilizing at least one member selected from the group consisting of
  (i) universal operating system standard processes,
  (ii) universal operating system standard procedures, or
  (iii) universal operating system standard formats,
by providing at least one process or at least one procedure that is utilizable for converting the operations of at least one member selected from the group consisting of
  (A) the at least one cyber program,
  (B) the at least one cyber file, and
  (C) the at least one cyber device,
to or from the operations of at least one member selected from the group consisting of
  (1) universal operating system standard processes,
  (2) universal operating system standard procedures, and
  (3) universal operating system standard formats.

In some embodiments of the foregoing combination, the universal operating system further includes programming that provides or enables processes or procedures that require or provide for the use of at least one member selected from the group consisting of
  (a) at least one unique process,
  (b) at least one unique procedure,
  (c) at least one unique protocol,
  (d) at least one unique code, or
  (e) at least one unique format,
to be used for at least one member selected from the group consisting of
  (i) at least one cyber program,
  (ii) at least one cyber application,
  (iii) at least one cyber activity, or
  (iv) at least one cyber interaction,
that are utilized for different or differing purposes.

In some embodiments of the foregoing combination, the universal operating system further includes programming that provides or enables processes or procedures for enabling an individual to have exclusive control of at least one setting selected from the group consisting of
  (a) at least one administrative setting,
  (b) at least one operational setting, or
  (c) at least one access control setting,
of at least one member selected from the group consisting of
  (i) the individual's at least one point of cyber access computer,
  (ii) the individual's at least one private computer,
  (iii) the individual's at least one public computer,
  (iv) the individual's at least one cyber device manager,
  (v) the individual's at least one cyber telephone system,
  (vi) the aid individual's at least one cyber vault,
  (vii) the individual's at least one cyber asset, or
  (viii) the individual's at least one cyber resource.

In some embodiments of the foregoing combination, the universal operating system further includes programming that provides or enables processes or procedures that utilize a combination of
  (a) a virtual equivalent of at least one projector, in conjunction with,
  (b) a virtual equivalent of at least one projection display screen that receives and displays the virtual equivalent of at least one image output from the virtual equivalent of at least one projector, and
  (c) a virtual equivalent of at least one recorder or capture device that provides the virtual equivalent of at least one recording of at least one image from the at least one projection screen, or the virtual equivalent of at least one recording of at least one part of the audio output from the at least one projector,
all of which may be configured and utilized for providing at least one member selected from the group consisting of
  (i) interoperability conversion of at least one member selected from the group consisting of
    (A) cyber content,
    (B) cyber programming,
    (C) cyber interactions,
    (D) cyber activities, or
    (E) human or cyber device interactions,
  to or from universal operating system-standard processes or procedures,
  (ii) security,
  (iii) at least one malicious content trap,
  (iv) altering the size of at least one cyber image,
  (v) altering the resolution of at least one cyber image,
  (vi) altering the visual presence of image-based cyber content,
  (vii) interactive utilization of image-based cyber content, or
  (viii) the converging of two or more sources of image-based cyber content into at least one converged source of image-based cyber content.

In some embodiments of the foregoing combination, the universal operating system further includes programming that provides or enables processes or procedures that enable at least one action selected from the group consisting of
  (a) adding architectural components to,
  (b) adding programming to,
  (c) adding cyber devices to,
  (d) removing architectural components from,
  (e) removing programming from,
  (f) removing cyber devices from,
  (g) altering architectural component of,
  (h) altering programming of, or
  (i) altering cyber devices of,
the at least one point-of-cyber-access cyber system.

In some embodiments of the foregoing combination, the universal operating system further includes programming that provides or enables processes or procedures that enable at least one action selected from the group consisting of
  (a) adding processes or procedures to,
  (b) removing processes or procedures from, or
  (c) altering processes or the procedures of,
at least one component of the at least one point-of-cyber-access cyber system.

In some embodiments of the foregoing combination, the universal operating system further includes programming that provides or enables processes or procedures that enable at least one action selected from the group consisting of (a) adding at least one member selected from the group consisting of
  (i) at least one component,
  (ii) at least one process, or
  (iii) at least one procedure,
to at least one cyber device,
(b) removing at least one member selected from the group consisting of
  (i) at least one component,
  (ii) at least one process, or
  (iii) at least one procedure,
from at least one cyber device, or
(c) altering at least one member selected from the group consisting of
  (i) at least one component,
  (ii) at least one process, or
  (iii) at least one procedure,
of at least one cyber device.

In some embodiments of the foregoing combination, the universal operating system further includes system-standard processes or system-standard procedures that are utilized for minimizing the number of differing processes or procedures that are used by others by providing the system standard processes or procedures for use by others.

In some embodiments of the foregoing combination, the universal operating system further includes programming that provides or enables processes or procedures that enables at least one individual to request or require that at least one other party provide the at least one individual with the at least one individual's at least one preference for at least one member selected from the group consisting of
  (i) at least one cyber interaction,
  (ii) cyber content, or
  (iii) privacy.

In some embodiments of the foregoing combination, the universal operating system further includes programming that provides or enables processes or procedures that enable at least one individual to selectively grant or to selectively deny at least one member selected from the group consisting of
  (a) the at least one individual's at least one device-based cyber asset,
  (b) the at least one individual's at least one device-based cyber resource, or
  (c) at least one other party,
access to all or part of the at least one individual's at least one cyber asset or at least one cyber resource, the all or part being selected by the at least one individual.

In another aspect in combination with a point-of-cyber-access cyber system, a tangible, non-transient medium having sufficient programming instructions recorded therein which, when executed by at least one computer processor, performs the step of:
  establishing a universal operating system which provides or enables processes or procedures that are utilizable for at least one part of at least one operation of at least one component of the point-of-cyber-access cyber system,
  wherein the point-of-cyber-access cyber system may be utilized by at least one person, at least one entity or at least one cyber device, wherein the point-of-cyber-access cyber system includes at least one member selected from the group consisting of
    (a) at least one cyber communications network,
    (b) at least one cyber portal,
    (c) at least one point of cyber access computer,
    (d) at least one private computer,
    (e) at least one public computer,
    (f) at least one cyber telephone system,
    (g) at least one cyber device manager,
    (h) at least one operating system,
    (i) at least one cyber asset, or
    (j) at least one cyber resource,
  wherein the universal operating system may be configured in at least one configuration, and
  wherein the universal operating system may be scaled to include universal operating system resources that fall at one point in the range of from a minimum to a maximum, wherein at the minimum the universal operating system is scaled to provide the resources that are needed to provide for the least complex of all needs for universal operating system resources, and wherein at the maximum the universal operating system is scaled to include all of the universal operating system resources that are needed to provide for every universal operating system resource need from the spectrum of needs for universal operating system resources; and
  providing or enabling, with the established universal operating system, at least one part of at least one member selected from the group consisting of
    (a) processes or procedures that provide for accurately testing the identity of at least one individual,
    (b) processes or procedures that provide for accurately testing the identity at least one cyber device,
    (c) processes or procedures that require at least one individual pass at least one accurate identity test prior to or immediately prior to at least one step or every step that at least one cyber interaction of the at least one individual carries out throughout the point-of-cyber-access cyber system,
    (d) processes or procedures that require at least one cyber device pass at least one accurate identity test prior to or immediately prior to at least one step or every step that at least one cyber interaction of the at least one cyber device carries out throughout the point-of-cyber-access cyber system,
    (e) processes or procedures that provide for at least one individual to pass at least one accurate identity test prior to or immediately prior to at least one step or every step that at least one cyber interaction of the at least one individual carries out throughout the point-of-cyber-access cyber system,
    (f) processes or procedures that provide for at least one cyber device to pass at least one accurate identity test prior to or immediately prior to at least one step or every step that at least one cyber interaction of the at least one cyber device carries out throughout the point-of-cyber-access cyber system,
    (g) processes or procedures that provide for the operations of or the use of at least one cyber communications network,
    (h) processes or procedures that provide for the operations of or the use of at least one cyber portal,
    (i) processes or procedures that provide for the operations of or the use of at least one point of cyber access computer,
    (j) processes or procedures that provide for the operations of or the use of at least one private computer,
    (k) processes or procedures that provide for the operations of or the use of at least one public computer,
    (l) processes or procedures that provide for the operations of or the use of at least one device-based cyber asset, (m) processes or procedures that provide for the operations of or the use of at least one device-based cyber resource,
(n) processes or procedures that provide for the operations of or the use of at least one cyber device manager,
(o) processes or procedures that provide for the operations of or the use of at least one cyber telephone system,
(p) processes or procedures that provide for the operations of or the use of at least one cyber transfer packet system,
(q) processes or procedures that provide for the operations of or the use of at least one mobile or in-motion cyber device,
(r) processes or procedures that provide for the operations of or the use of at least one cyber vault,
(s) processes or procedures that provide for the operations of or the use of at least one cyber health system,
(t) processes or procedures that provide for the operations of or the use of at least one member selected from the group consisting of
  (i) at least one health care related cyber device,
  (ii) at least one health care related cyber asset, or
  (iii) at least one health care related cyber resource,
(u) processes or procedures that provide for the operations of or the use of at least one cyber rights licensing system,
(v) processes or procedures that provide for the operations of or the use of at least one cyber mail system,
(w) processes or procedures that provide for the operations of or the use of at least one cyber site system,
(x) processes or procedures that provide for the operations of or the use of at least one cyber education system,
(y) processes or procedures that provide for the operations of or the use of at least one cyber payment system,
(z) processes or procedures that provide for the operations of or the use of at least one universal operating system standard device interconnection interface that may be utilized by at least one cyber device,
(aa) processes or procedures that provide for the operations of or the use of a frames and scrolls system or format for interactive image-based cyber content,
(bb) processes or procedures that provide for the operations of or the use of at least one autonomous device,
(cc) processes or procedures that provide for at least one member selected from the group consisting of
  (i) creating,
  (ii) accessing,
  (iii) modifying,
  (iv) using,
  (v) sharing,
  (vi) storing, or
  (vii) managing,
at least one file-based cyber asset,
(dd) processes or procedures that provide for at least one member selected from the group consisting of
  (i) creating,
  (ii) accessing,
  (iii) modifying,
  (iv) using,
  (v) sharing,
  (vi) storing, or
  (vii) managing,
at least one file-based cyber resource,
(ee) processes or procedures that provide security,
(ff) processes or procedures that provide at least one historical record regarding at least one aspect of the operations of a point-of-cyber-access cyber system or its components, or
(gg) processes or procedures that enable an individual to exclusively select at least one setting of at least one member selected from the group consisting of
  (i) at least one administrative settings of the individual's at least one point-of-cyber-access cyber system or its components,
  (ii) at least one operational settings of the individual's at least one point-of-cyber-access cyber system or its components, or
  (iii) at least one access control settings of the individual's at least one point-of-cyber-access cyber system or its resources, and
wherein the universal operating system may be configured to provide programming that provides or enables processes or procedures for constantly testing, with 100% accuracy, the identity of at least one specific individual or at least one specific cyber device;
wherein these processes or procedures may be utilized for enabling zero vulnerability cybersecurity for at least one point of cyber access computer, at least one private computer, at least one public computer, at least one cyber device manager, or at least one cyber device;
and wherein the at least one point of cyber access computer, the at least one private computer, the at least one public computer, the at least one cyber device manager, or the at least one cyber device are configured to utilize operating-system-based constantly performed 100% accurate identity testing and other necessary cybersecurity processes, procedures and architecture for preventing selected people, entities, or cyber devices from gaining access to cybersecurity vulnerabilities in the programming, the processors or the devices of point of cyber access computers, private computers, public computers, cyber device managers, or cyber devices.

In yet another aspect in combination with at least one cyber system, a tangible, non-transient medium having sufficient programming instructions recorded therein which, when executed by at least one computer processor, performs the step of:
establishing a universal operating system which provides or enables processes or procedures that are utilizable for at least one operation of at least one component of the at least one cyber system;
wherein the at least one cyber system is utilizable by at least one individual or at least one cyber device;
wherein the at least one cyber system includes at least one component selected from the group consisting of
  (a) at least one cyber communications network,
  (b) at least one cyber portal,
  (c) at least one point of cyber access computer,
  (d) at least one private computer,
  (e) at least one public computer,
  (f) at least one cyber telephone system,
  (g) at least one cyber device manager,
  (h) at least one operating system,
  (i) at least one cyber asset, or
  (j) at least one cyber resource;
wherein the universal operating system is configurable and can be configured in at least one configuration;
wherein the universal operating system is scalable and can be scaled to include universal operating system resources that fall at one point in the range of from a minimum to a maximum, wherein at the minimum the universal operating system is scaled to provide for the least complex of needs for resources in regard to included universal operating system resources, and wherein at the maximum the universal operating system is scaled to include all of the universal operating system resources that are needed to provide for every need from the spectrum of needs for universal operating system resources;

wherein the universal operating system is configurable for requiring that the at least one individual or the at least one cyber device pass at least one accurate identity test prior to or immediately prior to gaining initial access to at least one resource or at least one component of or from the at least one cyber system;

wherein the universal operating system is configurable for requiring the at least one individual or the at least one cyber device constantly pass accurate identity tests during the entire period of time the at least one individual or the at least one cyber device are utilizing at least one resource or at least one component of or from the at least one cyber system;

wherein the universal operating system is further comprised of all or part of at least one member selected from the group consisting of (a) programming that provides or enables processes or procedures that accurately test the identity of any one specific individual or cyber device, (b) programming that provides or enables processes or procedures that require the at least one individual or the at least one cyber device to pass at least one accurate identity test prior to or immediately prior to at least one cyber interaction of the at least one individual or the at least one cyber device taking at least one step throughout the at least one cyber system, (c) programming that provides or enables processes or procedures that accurately identify the at least one individual or the at least one cyber device prior to or immediately prior to every step that at least one cyber interaction of the at least one individual or the at least one cyber device takes throughout the at least one cyber system, (d) programming that provides or enables processes or procedures for the operations of or the use of at least one cyber communications network, (e) programming that provides or enables processes or procedures for the operations of or the use of at least one cyber portal, (f) programming that provides or enables processes or procedures for the operations of or the use of at least one point of cyber access computer, (g) programming that provides or enables processes or procedures for the operations of or the use of at least one private computer, (h) programming that provides or enables processes or procedures for the operations of or the use of at least one public computer, (i) programming that provides or enables processes or procedures for the operations of or the use of at least one device-based cyber asset, (j) programming that provides or enables processes or procedures for the operations of or the use of at least one device-based cyber resource, (k) programming that provides or enables processes or procedures for the operations of or the use of at least one cyber device manager, (l) programming that provides or enables processes or procedures for the operations of or the use of at least one cyber telephone system, (m) programming that provides or enables processes or procedures for the operations of or the use of at least cyber transfer packet system, (n) programming that provides or enables processes or procedures for the operations of or the use of at least one mobile or in-motion cyber device, (o) programming that provides or enables processes or procedures for the operations of or the use of at least one cyber vault, (p) programming that provides or enables processes or procedures for the operations of or the use of at least one cyber health system, (q) programming that provides or enables processes or procedures for the operations of or the use of at least one member selected from the group consisting of
 (i) at least one health care related cyber device,
 (ii) at least one health care related cyber asset, or
 (iii) at least one health care related cyber resource, (r) programming that provides or enables processes or procedures for the operations of or the use of at least one cyber rights licensing system, (s) programming that provides or enables processes or procedures for the operations of or the use of at least one cyber mail system, (t) programming that provides or enables processes or procedures for the operations of or the use of at least one cyber site, (v) programming that provides or enables processes or procedures for the operations of or the use of at least one cyber education system, (w) programming that provides or enables processes or procedures for the operations of or the use of at least one cyber payment system, (x) programming that provides or enables processes or procedures for the operations of or the use of at least one universal operating system standard device interconnection interface that may be utilized by at least one cyber device, (y) programming that provides or enables processes or procedures for the operations of or the use of a frames and scrolls system or format for interactive image-based cyber content, (z) programming that provides or enables processes or procedures for the operations of or the use of at least one autonomous device, (aa) programming that provides or enables processes or procedures for at least one member selected from the group consisting of
 (i) creating,
 (ii) accessing,
 (iii) modifying,
 (iv) using,
 (v) sharing,
 (vi) storing, or
 (vii) managing,
at least one file-based cyber asset, (bb) programming that provides or enables processes or procedures for at least one member selected from the group consisting of
 (i) creating,
 (ii) accessing,
 (iii) modifying,
 (iv) using,
 (v) sharing, (vi) storing, or
(vii) managing,
at least one file-based cyber resource,
(cc) programming that provides or enables processes or procedures that provide security,
(dd) programming that provides or enables processes or procedures that provide historical records regarding at least one aspect of the operations of the at least one cyber system or at least one component of the at least one cyber system, or
(ee) programming that provides or enables processes or procedures that enable an individual to exclusively select at least one setting of at least one member selected from the group consisting of
  (i) at least one administrative setting of the individual's at least one cyber system's resources or components,
  (ii) the operational settings of the individual's at least one cyber system's resources or components, and
  (iii) the access control settings of the individual's at least one cyber system's resources or components; and
wherein the universal operating system is configurable for providing or utilizing
(a) cyber device perimeters that cannot be penetrated,
(b) programming that constantly tests, with 100% accuracy, the identity of any one specific individual or any one specific cyber device,
(c) programming that requires every one specific individual and every one specific cyber device constantly pass 100% accurate identity tests when the one specific individual or the one specific cyber device is interacting with or utilizing at least one component or at least one resource of or from the at least one cyber system,
(d) programming that constantly tests, with 100% accuracy, the identity of every one specific individual and every one specific cyber device during the entire period of time the one specific individual or the one specific cyber device interacts with or utilizes the at least one component or the at least one resource of or from the at least one cyber system,
(e) programming that enables any one specific individual to exclusively select and configure for zero vulnerability cybersecurity
  (i) the administrative settings of the one specific individual's at least one point of cyber access computer, at least one private computer, at least one public computer, at least one cyber device manager, or at least one cyber device,
  (ii) the operational settings of the one specific individual's at least one point of cyber access computer, at least one private computer, at least one public computer, at least one cyber device manager, or at least one cyber device, or
  (iii) the access control settings of the one specific individual's at least one point of cyber access computer, at least one private computer, at least one public computer, at least one cyber device manager, or at least one cyber device, or
(f) cyber system architecture and rules,
for establishing and maintaining zero cybersecurity vulnerability for at least one member selected from the group consisting of
  (i) at least one point of cyber access computer,
  (ii) at least one private computer,
  (iii) at least one public computer,
  (iv) at least one cyber device manager, or
  (v) at least one other cyber device within the at least one cyber system that is utilizable by the at least one individual or the at least one cyber device;
wherein the zero cybersecurity vulnerability cyberspace environment occurs when the at least one cyber system and its at least one component or resource utilizes cyber system architecture and rules for zero cybersecurity vulnerability that requires every zero cybersecurity vulnerability cyber device to have a perimeter that cannot be penetrated and wherein the cyber device perimeter that cannot be penetrated will include at least one 100% secure access portal that requires the constant passing of 100% accurate identity tests for preventing all individuals or cyber devices that cannot constantly pass 100% accurate identity tests from gaining access to the cybersecurity vulnerabilities of computers, computer processors, computer programming, the architecture of cyber devices and the architecture of the components of the at least one cyber system that are within the cyber device perimeters that cannot be penetrated.

BRIEF DESCRIPTION OF THE DRAWINGS

A better knowledge of the systems, components of the systems, processes and procedures of the present disclosure may be gained by referring to the drawing figures that illustrate particular non-limiting embodiments of the architectures, components, and functions of a point-of-cyber-access cyber system in accordance with the teachings herein.

DETAILED DESCRIPTION OF THE DISCLOSURE

(1) Key Definitions

Figure 1:
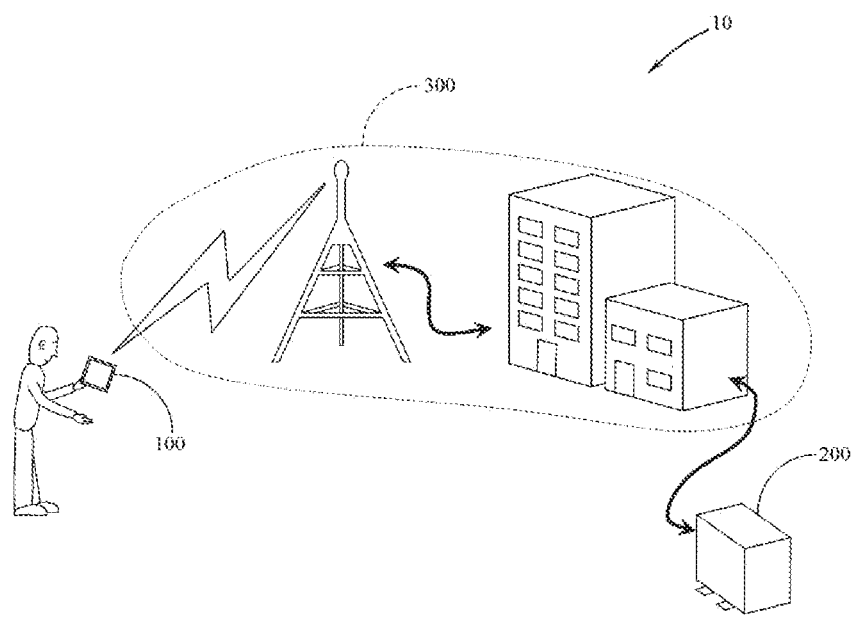
FIG. 1 is an overview diagram that illustrates a particular, non-limiting embodiment of a point-of-cyber-access cyber system in accordance with the teachings herein.

Unless otherwise specified herein, throughout this entire disclosure, each of the following will apply:

(a) the universal operating system is scalable and can be scaled to include universal operating system resources that fall at one point in the range of from a minimum to a maximum, wherein at the minimum the universal operating system may be scaled to provide for the least complex of needs for resources in regard to included universal operating system resources, and wherein at the maximum the universal operating system may be scaled to include all of the universal operating system resources that are needed to provide for every need from the spectrum of needs for universal operating system resources;

(b) the universal operating system is configurable and can be configured to be utilized in at least one configuration;

(c) the universal operating system is configurable for enabling universal utilization of all or part of its processes, procedures or resources;

(d) the universal operating system is configurable for providing selection of criteria, wherein criteria are selected from the spectrum of criteria that are utilizable by the universal operating system; and (e) the operational goal of the universal operating system is to preferably provide a best performing blend of as simple, concise and efficient operating system resources as possible.

The following meanings and definitions for key words and key phrases shall be used when key words and phrases from this list occur throughout this disclosure.

Accurate identity test: a cyber identity test that may be passed at any selected percentage of accuracy up to and including 100% accuracy.

Accurately identified: one specific individual or one specific cyber device that has passed at least one identity test or has constantly passed identity tests at a selected percentage of accuracy, up to and including 100% accuracy, can be considered to be accurately identified.

Confirm identity: at least one individual or at least one cyber device from within a cyber system may confirm the identity of at least one specific other individual or at least one specific other cyber device after the one the one specific other individual or the one specific other cyber device has passed at least one selected accurate identity test.

Constant/constantly: without stopping or interrupting and at intervals of time that would not result in inaccuracies of outcomes.

Cyber: activities, devices, systems, processes, procedures, programs, or files that use non-biological processing of programming for at least one purpose.

Cyber activities: the use by a person, entity or a cyber device of components or resources of cyber systems.

Cyber assets: the cyber devices or cyber files associated with a person or an entity.

Cyber content: cyber files or programming that may be utilized by a person or an entity through the person's or the entity's use of components of a cyber system.

Cyber device: a physical or virtual device, or a combination thereof, that directly or indirectly uses non-biological processing of programming to achieve at least one selected purpose or function.

Cyber resource: all or part of the cyber assets of a person or an entity that have been made available by the person or the entity for access or use by a selected other person, entity or cyber device. The cyber assets that a person or entity makes available to the other person or entity may be considered to be the cyber resources of the other person or entity.

Device-based cyber assets: a person's or an entity's cyber devices.

Entity: any business, government, school, organization, or other group of at least one person that has its own cyber system entity identity designation.

Establish identity: one specific individual's or one specific cyber device's own identity may be established once the one specific individual or the one specific cyber device has passed at least one accurate identity test.

File-based cyber assets: a person's or an entity's cyber files, or programming.

Identity designation: The cyber system designation (name) for one specific person or entity, or the cyber system designation (name) for one specific cyber device that is a component of the cyber system. Cyber system architectural rules may require that each person or entity that uses the cyber system, and that each cyber device that is a component of the cyber system, have one, and only one, permanent cyber system identity designation. A person's or an entity's cyber system identity designation, or a cyber device's cyber system identity designation, may also be considered to be their cyber system name.

Immediately prior: occurring prior to, and at the same point in time, or within the shortest possible period of time.

Individual: a specific person or a specific entity.

Party/parties: at least one other person, at least one other entity or at least one cyber device of at least one other person or at least one other entity; a person, entity or cyber device that is not: a, the, one or one specific person, entity or cyber device.

Point-of-cyber-access cyber system: a cyber system that utilize the architecture or the rules for a point-of-cyber-access cyber system or at least one of its components.

Private cyber activities: a person's or an entity's use of at least one member from the group consisting of: (a) components, (b) cyber assets, or (c) cyber resources, of a cyber system, wherein all other people, entities and the cyber devices of all other people or entities may be excluded from access to at least one member selected from the group consisting of: (i) the person's or the entity's private cyber activities, (ii) the person's or the entity's private cyber assets, and (iii) the person's or the entity's private cyber resources.

Programming: a computer program, a computer application or a usable part thereof that serves at least one purpose. In the various embodiments disclosed herein, these programs may be disposed in tangible, non-transient media and may contain suitable instructions which, when executed by one or more computer processors, performs one or more processes or methods associated with the embodiment.

Public cyber activities: a person's or an entity's use of the person's or the entity's cyber assets, or cyber resources, wherein the person or the entity selects to temporarily or permanently share all or part of the person's or the entity's cyber assets, or cyber resources with a selected other person, other entity, or a selected cyber device of a selected other person or entity.

Verify/verified identity: after one specific person, entity or cyber device has passed at least one accurate identity test, the device that performed the at least one accurate identity test may then verify the identity of the one specific person, entity or cyber device that has passed the accurate identity test.

Zero vulnerability cybersecurity: a state of cybersecurity that occurs when a properly configured cyber device has a perimeter that cannot be penetrated, and wherein the perimeter that cannot be penetrated includes at least one 100% secure access portal that requires at least one specific individual or at least one specific cyber device to constant pass 100% accurate identity tests to gain initial and to have continued access to the cyber device thereby preventing all individuals and all cyber devices that cannot constantly pass 100% accurate identity tests from gaining access.

(2) General Definitions

The following meanings and definitions for words or phrases shall be used when words or phrases from this list occur throughout this disclosure.

Administrative access: accessing a cyber device for the purpose of interacting with the administrative functions or settings of the cyber device.

Computer: a physical device or a virtual device or a combination thereof that includes at least one member selected from the group consisting of: (a) processors, (b) memory, (c) storage, (d) user interfaces, or (e) interconnection structures, that may be utilized to perform at least one action selected from the group consisting of: (i) processing, (ii) accessing, (iii) storing, (iv) modifying, (v) running, (vi) using, (vii) sharing, (viii) deleting, or (ix) copying, at least one member selected from the group consisting of: (1) cyber programming, (2) cyber files, (3) cyber code, or (4) cyber data.

Cyber access: access, in at least one form, to at least one member selected from the group consisting of: (a) cyber devices, (b) cyber assets, (c) cyber resources, or (d) cyber activities.

Cyber asset manager: cyber device manager.

Cyber communications: communications that are made through the use of at least one member selected from the group consisting of: (a) cyber system telephone services, (b) cyber system video telephone services, (c) cyber system mail services, (d) cyber system message services, or (e) cyber system cyber interaction or file transfer services.

Cyber communications network: a communications network (including communications nodes and paths) in a cyber system. The cyber communications network may be configured to provide for safe and secure cyber interactions between cyber devices within a cyber system.

Cyber files: at least one file that (a) requires non-biological processing of content or programming, or (b) may be utilized by at least one cyber device.

Cyber identity: at least one cyber file that contains at least one cyber characteristic of one specific person, one specific entity, or one specific cyber device that may be used during at least one identity test to safely, securely, and accurately test the identity of the one specific person, the one specific entity or the one specific cyber device.

Cyber interaction: an exchange of cyber activity among at least one member selected from the group consisting of: (a) at least one cyber device, (b) at least one components of at least one cyber device, or (c) at least one component of at least one cyber system.

Cyber portal: a cyber device that may be configured to perform at least one action selected from the group consisting of:
  (a) sending input from a person who is using a cyber portal, through a cyber communications network and to the person's point of cyber access computer,
  (b) receiving output for a person that was sent from the person's point of cyber access computer and through a cyber communications network to a cyber portal that is being used by the person, (c) providing information from sensor observations that enables a specific person's point of cyber access computer to accurately test the identity of the person that is using a cyber portal, or (d) providing output that provides a person who is using a cyber portal with the ability to: (i) perceive cyber interactions, or (ii) interact with cyber interactions that were sent to the person by the person's point of cyber access computer.

Cyber site: a cyber system equivalent of a prior art internet web site.

Cyber system: a physical or virtual system or a combination thereof that uses non-biological processing of programming to achieve at least one purpose or function.

Cyber system address: a cyber system's designation for the location of a cyber device.

Cyber telephone device: a cyber portal that is configured to send or to receive cyber telephone communication interactions or video telephone communication interactions.

Cyber vault: a construct which is structured to enable a specific person or a specific entity to exclude all other people or entities and the cyber devices of the all other people or entities from gaining access to the contents thereof. Cyber files and cyber devices, including computers, may be contained within the constructs of a cyber vault. The cyber contents of a specific person's or a specific entity's cyber vault may include all or part of the person's or the entity's: (a) cyber assets, (b) cyber resources, (c) cyber activities, or (d) personal or private information. A person's or an entity's private computer may be configured to form the person's or the entity's cyber vault. A person or an entity may utilize at least one cyber vault.

Device: a mechanical or a cyber device, or a combination thereof. A cyber device may be a virtual device or a physical device, or a combination thereof.

Frame: interactive cyber image content that has a pixel grid size that is equal to or less than both the height and the width of the pixel grid size of an image display device that the image will be displayed upon.

Frames and scrolls format or system: a format or system for creating or using interactive image-based cyber content that utilizes the (x, y) pixel grid location of a cursor from a specific frame formatted image or the (x, y) pixel grid location of a cursor from a specific scroll formatted image to identify the location of a person's interaction with a specific image.

Input output device: cyber portal.

Input output/cyber telephone device: cyber portal/cyber telephone device.

Manage: the performance, on cyber files, of at least one action selected from the group consisting of: (a) storing, (b) accessing, (c) using, (d) modifying, (e) sharing with other people, entities or devices, (f) copying, (g) deleting, (h) moving, (i) naming, or (j) renaming.

Operational access: accessing a cyber device for the purpose of operating the cyber device.

Point of cyber access: the point where an individual, after passing an accurate identity test, gains further access to cyber resources.

Point of cyber access computer: a combination of devices and programming that are configured to provide a specific individual with a point of cyber access. A specific individual's point of cyber access computer provides the specific individual with accurate identity test-based access controls for: (a) the specific individual, (b) the specific individual's cyber devices, or (c) other parties, and proper routing thereafter. The specific individual's point of cyber access computer may perform at least one action selected from the group consisting of: (i) testing the identity of the specific individual prior to granting the specific individual further access to all or part of the specific individual's cyber assets or cyber resources, (ii) testing the identity of one specific cyber device of the specific individual prior to granting the specific cyber device further access to all or part of the specific individual's cyber assets or cyber resources, (iii) testing the identity of another party that is the sender of at least one cyber interaction prior to providing the cyber interaction of the other party with further access to all or part of the specific individual's cyber assets or cyber resources. The specific individual's locally or remotely accessible point of cyber access computer provides the specific individual with accurate-identity-testing-based cyber access control services for at least one cyber asset selected from the group consisting of: (a) cyber assets that provide processing or support for at least one member selected from the group consisting of: (i) the specific individual's private cyber activities, (ii) the specific individual's private cyber assets, and (iii) the specific individual's private cyber resources, and (b) separate and different cyber assets that provide processing or support for at least one member selected from the group consisting of: (i) the specific individual's public cyber activities, (ii) the specific individual's publicly available cyber assets, and (iii) the specific individual's publicly available cyber resources.

Pre-processed cyber interaction: a cyber interaction whose content has been processed to a state in which it may be used without the further processing of content.

Private computer: A specific individual's locally or remotely accessible computer that may be an integral part of, or work in conjunction with, the specific individual's point of cyber access computer. A specific individual's private computer may be configured to where it may only be accessed through utilization of the accurate-identity-test-based cyber access control services of the individual's point of cyber access computer. A specific individual's private computer may be configured to where it may only be accessed by the specific individual's or the specific individual's selected device-based cyber assets.

Public computer: A specific individual's locally or remotely accessible computer that may be an integral part of, or work in conjunction with, the specific individual's point of cyber access computer. A public computer may be configured to where it may be accessed by cyber interactions of selected other parties. The specific individual's public computer may be configured to where it may only be accessed through utilization of the accurate-identity-test-based cyber access control services of the specific individual's point of cyber access computer.

Scroll: cyber image content that has a pixel grid height or a pixel grid width that is larger in size than the corresponding pixel grid height or pixel grid width of a device the image will be displayed upon.

System: processes, procedures, or devices that are configured together to perform or provide selected functions.

Thin device: a cyber device that is purposefully configured to provide for limited functionality. For example, a thin cyber portal may only provide the minimum functions and resources that are needed for: (a) the operation of the thin cyber portal, or (b) providing for limited specific use of the thin cyber portal. A thin cyber portal may rely on a sender of a cyber interaction to provide the thin cyber portal with cyber interactions that are pre-processed and ready for use without any further processing of interaction content by the thin cyber portal.

Transfer packet: labeled data, activities, interactions or programming that are transferred across communications networks.

User: a person or entity that utilizes resources of a cyber system.

(3) Advantages

Prior art cyber systems have many significant infirmities. One of the most significant of the infirmities is that prior art cyber systems cannot provide adequate and reasonable levels of safety, security, and privacy.

To that point, it is important to recognize that prior art cyber systems are not capable of accurately and reliably identifying one single person while that person is using cyber assets or resources. This, in turn, leads to the prior art cyber system's inability to accurately and reliably hold at least one specific person or any one specific entity accountable for their own cyber activities.

Further, if an individual's cyber assets are unable to accurately and reliably identify the individual as always being one, and only one, specific and unique individual, then the individual's cyber assets are also unable to accurately and reliably keep impostors from gaining access to the individual's personal and private cyber information, cyber assets, and cyber resources.

The point-of-cyber-access cyber system of the present disclosure, use of its processes, procedures, architecture, programming, and devices, may be configured to incorporate the use of accurate and reliable identity testing as a tool to provide an individual with not only extremely high levels of cyber safety, security, and privacy while using cyber assets or cyber resources, but also with absolute cyber safety, security, and privacy for individual's own personal and private cyber activities, cyber assets, and cyber resources. Suitable systems and methodologies for implementing such identity testing are disclosed in commonly owned:

(a) U.S. patent application Ser. No. 16/891,088 (Aronson), filed on Jun. 3, 2020, entitled "IDENTITY TESTING MACHINE", now pending, having the same inventor, which is incorporated herein by reference in its entirety; which application is a continuation-in-part application of U.S. patent application Ser. No. 16/583,257, filed Sep. 26, 2019, issued as U.S. Pat. No. 10,708,271 on Jul. 7, 2020, entitled "SCALABLE CONFIGURABLE UNIVERSAL FULL SPECTRUM CYBERSPACE IDENTITY VERIFICATION TEST", having the same inventor, which is incorporated herein by reference in its entirety; which application is a continuation-in-part application of U.S. patent application Ser. No. 15/456,542, filed Mar. 12, 2017, issued as U.S. Pat. No. 10,462,139 on Oct. 29, 2019, entitled "SCALABLE UNIVERSAL FULL SPECTRUM CYBER DETERMINING PROCESS", having the same inventor, which is incorporated herein by reference in its entirety; which application is a continuation-in-part application of U.S. patent application Ser. No. 15/071,075, filed Mar. 15, 2016, issued as U.S. Pat. No. 9,635,025 on Apr. 25, 2017, entitled "SCALABLE UNIVERSAL FULL SPECTRUM CYBER DETERMINING MACHINE", having the same inventor, which is incorporated herein by reference in its entirety; which application is a continuation-in-part application of U.S. patent application Ser. No. 14/857,445, filed Sep. 17, 2015, issued as U.S. Pat. No. 9,319,414 on Apr. 19, 2016, entitled "SCALABLE FULL SPECTRUM CYBER DETERMINATION PROCESS", having the same inventor, which is incorporated herein by reference in its entirety; which application is a continuation-in-part application of U.S. patent application Ser. No. 14/316,196, filed Jun. 26, 2014, issued as U.S. Pat. No. 9,166,981 on Oct. 20, 2015, entitled "FULL SPECTRUM CYBER IDENTIFICATION DETERMINATION PROCESS", having the same inventor, which is incorporated herein by reference in its entirety; which application is a continuation of U.S. patent application Ser. No. 13/784,277, filed Mar. 4, 2013, issued as U.S. Pat. No. 8,769,649 on Jul. 1, 2014, entitled "FULL SPECTRUM CYBER IDENTIFICATION DETERMINATION PROCESS", having the same inventor, which is incorporated herein by reference in its entirety; which application is a continuation of U.S. patent application Ser. No. 13/688,925, filed Nov. 29, 2012, issued as U.S. Pat. No. 8,434,136 on Apr. 30, 2013, entitled "FULL SPECTRUM CYBER IDENTIFICATION DETERMINATION PROCESS", having the same inventor, which is incorporated herein by reference in its entirety, and (b) U.S. patent application Ser. No. 16/891,080, filed Jun. 3, 2020, entitled "CONCISE DATASETS PLATFORM", now pending, having the same inventor, and which is incorporated herein by reference in its entirety; which application is a continuation-in-part application of U.S. patent application Ser. No. 15/981,785, filed May 16, 2018, entitled "SCALABLE CONFIGURABLE UNIVERSAL FULL SPECTRUM CYBER PROCESS THAT UTILIZES MEASURE POINTS FROM SENSOR OBSERVATION-DERIVED REPRESENTATIONS OR ANALYTICALLY RICH SPARSE DATA SETS FOR MAKING CYBER DETERMINATIONS REGARDING OR UTILIZING SENSOR OBSERVATIONS OR SENSOR OBSERVATIONS SUBJECTS", now pending, having the same inventor, and which is incorporated herein by reference in its entity.

The use of accurate and reliable identity testing alone will not provide the highest attainable levels of cyber safety, security, and privacy.

The unbelievably complex environments and ecosystems of prior art cyber systems also contribute greatly to the inability of these systems to provide each individual with adequate and reasonable levels of cyber safety, cyber security, and cyberspace privacy.

The point-of-cyber-access cyber system of the present disclosure may be configured to utilize a strategy of using a best performing blend of: (a) as simple as possible, (b) as concise as possible, and (c) as efficient as possible. This strategy may preferably be applied to all aspects of the point-of-cyber-access cyber system and its components and resources.

Use of a best performing blend of as simple, as concise, and as efficient as possible enables the point-of-cyber-access cyber system of the present disclosure to be configured to achieve the highest levels of cyber safety, cyber security, and cyberspace privacy that may be obtained. Through use of the point-of-cyber-access cyber system, the unbelievably complex environments that have always plagued prior art cyber systems may soon be eliminated.

One example of the point-of-cyber-access cyber system's use of as simple, as concise, and as efficient as possible, is its architecture. This architecture may be configured to integrate at least one member selected from the group consisting of: (a) cyber activities, (b) utilization of cyber assets, or (c) utilization of cyber resources, into the operation of a single computer. This computer may provide for at least one member selected from the group consisting of: (i) telephones, (ii) televisions, (iii) computing devices, (iv) remote device integration devices, (v) personal health devices, or (vi) at least one other type of cyber device, to operate as a part of one cyber system that may be configured to utilize a universal operating system that also is a best performing blend of as simple, as concise, and as efficient as possible.

Perhaps the greatest benefit a person may gain from his or her use of cyber assets and available cyber resources is the benefit that may be derived by collecting and using the person's own personal and private information. This cyber function may be configured to privately provide a person with technology-based augmentation of the person's own natural cognitive and perceptive capabilities. A person's use of cyber assets and cyber resources for the purpose of privately augmenting his or her own natural cognitive and perceptive capabilities is similar in concept to a person's use of an automobile to augment the person's own natural ability to move from one location to another.

Further, each person may also derive benefit from use of his or her own body of collected information, wherein the person's cyber assets use that information to predict, and be prepared to provide for, whatever cyber assets or cyber resources the person may want or need, both now and in the future.

The universal operating system of the present disclosure may be configured to provide each person with absolute safety, security, and privacy for all of his or her personal and private cyber activities, cyber assets, and cyber resources.

To achieve the highest levels of cyber safety, security, and privacy for a person, it is essential and of utmost importance that no others ever gain access to the person's: (a) personal and private cyber activities, or (b) personal and private cyber assets.

The following six concepts, may be embodied in a non-limiting configuration of the point-of-cyber-access cyber system. The six concepts may be configured to solve many of the existing problems with prior art cyber systems.

1. Each individual and each cyber device that uses a point-of-cyber-access cyber system should be required to be accurately identified prior to or immediately prior to each step that the cyber interactions of the individual, or the cyber device, takes throughout the point-of-cyber-access cyber system.
2. Each individual that uses a point-of cyber-access cyber system should constantly have their identity accurately tested by the individual's remotely accessible point of cyber access computer.
3. Each individual that uses a point-of-cyber-access cyber system should gain access to the point-of-cyber-access cyber system exclusively through the individual's point of cyber access computer.
4. The point of cyber access computer of each individual should utilize: (a) a separate and different computer that is exclusively utilized for the processing or support for one member or a combination of two or more members selected from the group consisting of: (i) the individual's private cyber activities, (ii) the individual's private cyber assets, and (iii) the individual's private cyber resources, and (b) a separate and different computer that is exclusively used for the processing or support for one member or the combination of two or more members selected from the group consisting of: (i) the individual's public cyber activities, (ii) the individual's publicly available cyber assets, and (iii) the individual's publicly available cyber resources.
5. Each individual should have exclusive access to the individual's own private computer that provides processing and support for the individual's private cyber activities, private cyber assets, and private cyber resources.
6. A point-of-cyber-access cyber system should provide for seamless interoperable use of any cyber content, cyber programming, and cyber devices that are being utilized as a part of the point-of-cyber-access cyber system.

(4) Short Overview

A simplified graphic representation of a non-limiting embodiment of the disclosed point-of-cyber-access cyber system appears in FIG. 1, wherein a person is shown using a cyber portal. Through use of the cyber portal, a cyber interaction from the person is transferred through, the cyber communications network, and to the person's point of cyber access computer. There, the person passes at least one accurate identity test prior to the person's cyber interaction being granted further access to the person's point of cyber access computer. After having been granted access to the person's point of cyber access computer, the person, through the person's interactions with the cyber portal, may engage in at least one activity selected from the group consisting of: (a) private cyber activities, and (b) public cyber activities. Private cyber activities may be configured to be for the person's exclusive use. Public cyber activities involve at least one other party. By use of a properly configured version of the disclosed point-of-cyber-access cyber system, the person may have complete control over access by cyber interactions from other parties. Further, utilizing a properly configured version of the disclosed point-of-cyber-access cyber system, the person may have complete control over the selected cyber resources that he or she makes available to share with selected other parties. When utilizing a properly configured version of the disclosed point-of-cyber-access cyber system, interoperability resources may enable interactions with any cyber devices.

A non-limiting embodiment of the disclosed universal operating system may be configured to require that each individual pass an accurate identity test prior to or immediately prior to the individual's cyber interactions being allowed to take at least one step throughout the point-of-cyber-access cyber system. The disclosed universal operating system may further be configured to require that each cyber device pass an accurate identity test prior to or immediately prior to the cyber interactions of the cyber device being allowed to take at least one step throughout the point-of-cyber-access cyber system. The requirement for each individual and each cyber device to pass an accurate identity test immediately prior to their cyber interactions being allowed to take a step throughout the point-of-cyber-access cyber system may provide a safe, secure cyber environment for all that use a properly configured versions of the universal operating system and the point-of-cyber-access cyber system. Continuous utilization of the passing of accurate identity tests requirements for all individuals and for all cyber devices may be necessary to enable the disclosed point-of-cyber-access cyber system to provide every individual with the ability to have a full range of cyber rights.

A non-limiting embodiment of the disclosed point-of-cyber-access cyber system provides a point of cyber access computer where an individual that constantly passes an accurate identity test is allowed to gain and have continued access to at least one member selected from the group consisting of: (a) cyber interactions, (b) cyber communications, (c) the individual's cyber assets, or (d) the individual's cyber resources. An individual may enjoy significant security, privacy, and utility advantages over prior art cyber systems and prior art communications systems through the individual's use of a point of cyber access computer that is configured to provide for safe and secure access to at least one member selected from the group consisting of: (a) cyber interactions, (b) cyber communications, (c) cyber activities, (d) cyber assets, or (e) cyber resources.

A non-limiting embodiment, the universal operating system disclosed herein may be configured to include a standard set of cyber processes and cyber procedures for interconnected cyber interactions with cyber devices. This feature of the universal operating system may provide any cyber device with the ability to easily be configured to be used as a component of the point-of-cyber-access cyber system.

The architectures, devices, processes, and procedures of a point-of-cyber-access cyber system may be configured to provide a private, safe, secure cyber system for use by at least individual. Providing a private, safe, secure cyber system for an individual's cyber activities, cyber assets, and cyber resources is essential in order for cyber rights to be provided for the individual.

As compared to prior art cyber systems, where most computer programs use their own unique processes, procedures, and programming, a non-limiting embodiment of the universal operating system of the present disclosure may be configured to provide all individuals and all parties with the use of standard universal operating system processes, procedures, and programming that may be utilized as a part of their computer programs. The individuals' or the other parties' use of standard universal operating system processes, procedures, and programming may provide enormous advantages over the use of the processes, procedures, and programming of prior art cyber systems in the areas of cyber system security, cyber system safety, cyber system interoperability, cyber system interconnectivity, and overall cyber system simplicity.

Through an individual's exclusive use of the individual's private computer that is properly configured to work in conjunction with the individual's point of cyber access computer, the disclosed point-of-cyber-access cyber system may provide the individual with the ability to safely, securely, and privately store, access, modify, use, share, and manage the individual's cyber-based information, file-based cyber assets, and file-based cyber resources. This use of the individual's properly configured private computer may create a cyber environment where cyber-based information, file-based cyber assets, and file-based cyber resources may be absolutely safe, secure, and exclusively at the individual's control.

The disclosed point-of-cyber-access cyber system may be configured to enable an individual to selectively, safely, securely, and privately share at least one part of, the individual's cyber-based information, cyber assets, or cyber resources, with at least one selected other party. Utilization of features of at least one possible configuration of the point-of-cyber-access cyber system may provide an individual with the ability to have full control over access by other parties to at least one selected part of, the individual's cyber-based information, cyber assets, or cyber resources.

The point-of-cyber-access cyber system may be configured to require that cyber interactions be sent to a recipient as pre-processed content. This may drastically reduce the recipient's need for the inbound content processing resources or the cyber communications network resources that are used for the transfer of interconnected cyber activities and cyber interactions.

The disclosed or point-of-cyber-access cyber system's use of pre-processed image-based cyber interactions may eliminate the recipient's risk of receiving malicious content in a cyber file that need to be processed into ready to use content by the recipient.

The disclosed point-of-cyber-access cyber system may include at least one thin cyber portal for use by at least one person. A thin cyber portal provides a person with the ability to gain safe and secure remote access to the person's point of cyber access computer. The person's point of cyber access computer may be configured to where the person may gain further access to the person's cyber assets and cyber resources only after having passed at least one accurate identity test. The thin cyber portal may be used to provide the person with interconnected cyber interactions with the person's local or remotely located point of cyber access computer.

The thin cyber portal may be configured to provide maximum utility and mobility for a person's use of the point-of-cyber-access cyber system. This is because the thin cyber portal may be configured to provide a person with the ability to locally or remotely gain safe, secure, and private access to at least one device selected from the group consisting of: (a) the person's point of cyber access computer, (b) the person's private computer, (c) the person's public computer, (d) the person's device-based cyber assets, or (e) device-based cyber resources that are available for use by the person. Furthermore, the thin cyber portal may be configured to provide for the use of the minimum possible amount of device componentry at the location of the person.

The disclosed point-of-cyber-access cyber system may be scaled and configured to provide for a complete and full-featured cyber system that is nonetheless far less complex than prior art cyber systems. This alters the need found in prior art cyber systems for more computer processing capabilities for use with future cyber system enhancements and improvements. Use of the disclosed point-of-cyber-access cyber system may eliminate the need for the development of bigger, better, faster, and more capable computer processors. Encryption is the backbone of prior art cyber security. This is important because bigger, better, faster, more capable cyber processors may eventually have capabilities to regularly open encrypted cyber files without the benefit of encryption keys, thereby overcoming encryption-based prior art cybersecurity and cyber privacy measures.

The universal operating system derived ability to convert cyber content or cyber interactions to, and from, a universal operating system-standard format provides any cyber device, cyber content, cyber interaction, or cyber activity that does not use the universal operating system with the interoperable ability to interact with or be utilized by devices that uses the universal operating system.

As an example, the cyber processes and cyber procedures of the universal operating system, through use of captured video images, may translate a very old and generally obsolete form of communication (such as, for example, video of Native American Indian smoke signals) into text messages, voice messages, system commands, or cyber files.

As a further example, digital photos that were stored in cyber files using a prior art format from the late 1980's may be converted for interoperable use by the universal operating system component of the point-of-cyber-access cyber system. The converted digital photos may then be useable by a person as long as the universal operating system is available for use by the person.

(5) Expanded Overview

In a preferred, non-limiting embodiment, the point-of-cyber-access cyber system disclosed herein is a scalable configurable combination of processes, procedures, programs, system architecture, device architecture, and cyber devices that together may be scaled and configured to provide a safe and secure cyber environment for an individual. In this environment, the individual may have interoperable access to desired and available cyber functions. In addition, the disclosed point-of-cyber-access cyber system may be configured to provide the individual with complete cyber privacy for the individual's personal and private cyber activities. Also, the disclosed point-of-cyber-access cyber system may be configured to provide the individual with varying levels of cyber privacy as specified by the individual for the individual's public cyber activities.

As shown in FIG. 1, one, a non-limiting configuration of the point-of-cyber-access cyber system 10 includes three primary components. These primary components are: (a) a cyber portal 100, (b) a point of cyber access computer 200, and (c) a cyber communications network 300.

Figure 2:
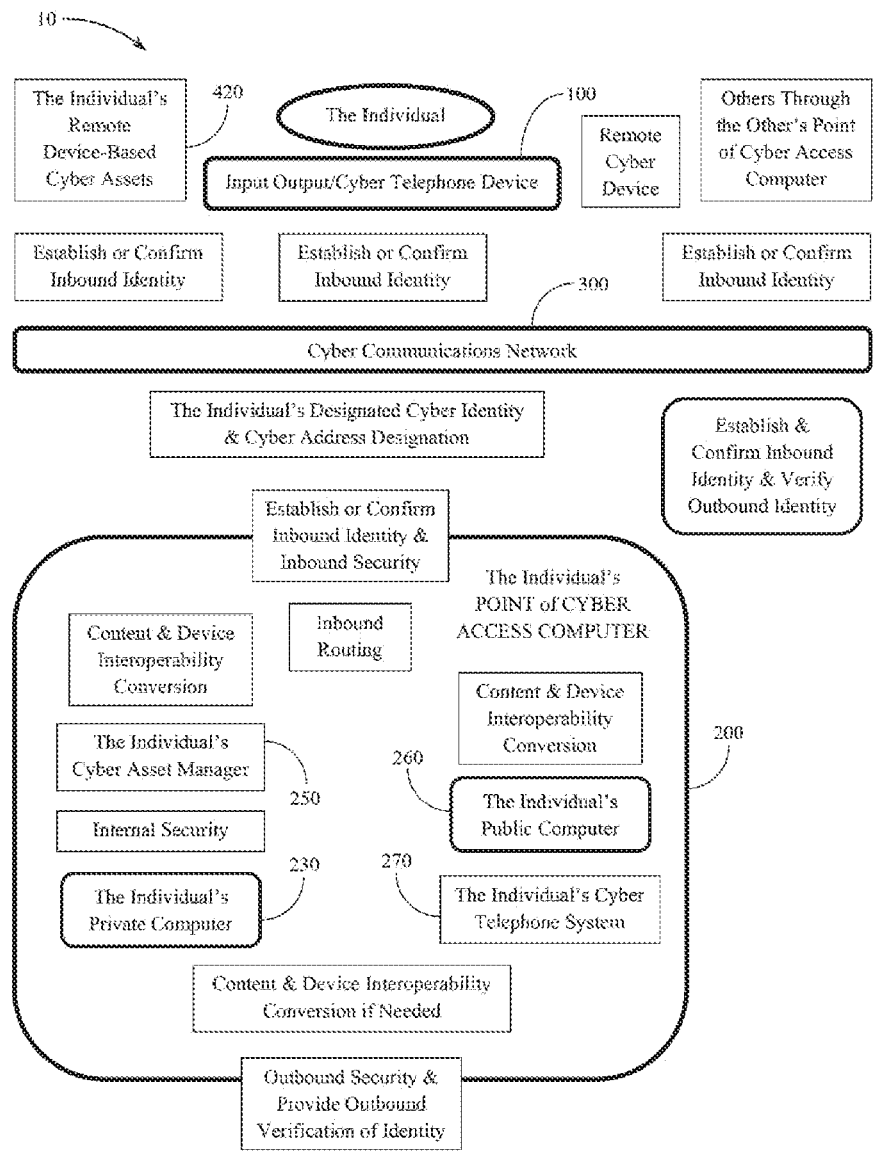
FIG. 2 is a schematic block diagram that illustrates a particular, non-limiting embodiment of an architecture (and components thereof) of a point-of-cyber-access cyber system in accordance with the teachings herein.

One non-limiting embodiment of the architecture of the point-of-cyber-access cyber system 10 shown in FIG. 2 is configured to provide a simple, concise, safe, and secure array of efficient paths for cyber interactions among at least two members selected from the group consisting of: (a) at least one individual, (b) at least one entity, (c) at least one cyber asset, (d) at least one cyber resource, or (e) at least one other party.

Significant cyber device architectural features and cyber system architectural features that may be used to make up one non-limiting embodiment of the point-of-cyber-access cyber system 10 include:
 (a) integration of an individual's private and public interconnected cyber activities into a safe and secure point-of-cyber-access cyber system;
 (b) integration of an individual's private and public cyber activities and cyber interactions into the operations of one configuration of a point of cyber access computer 200; or
 (c) at least one point of cyber access computer 200.

Figure 13:
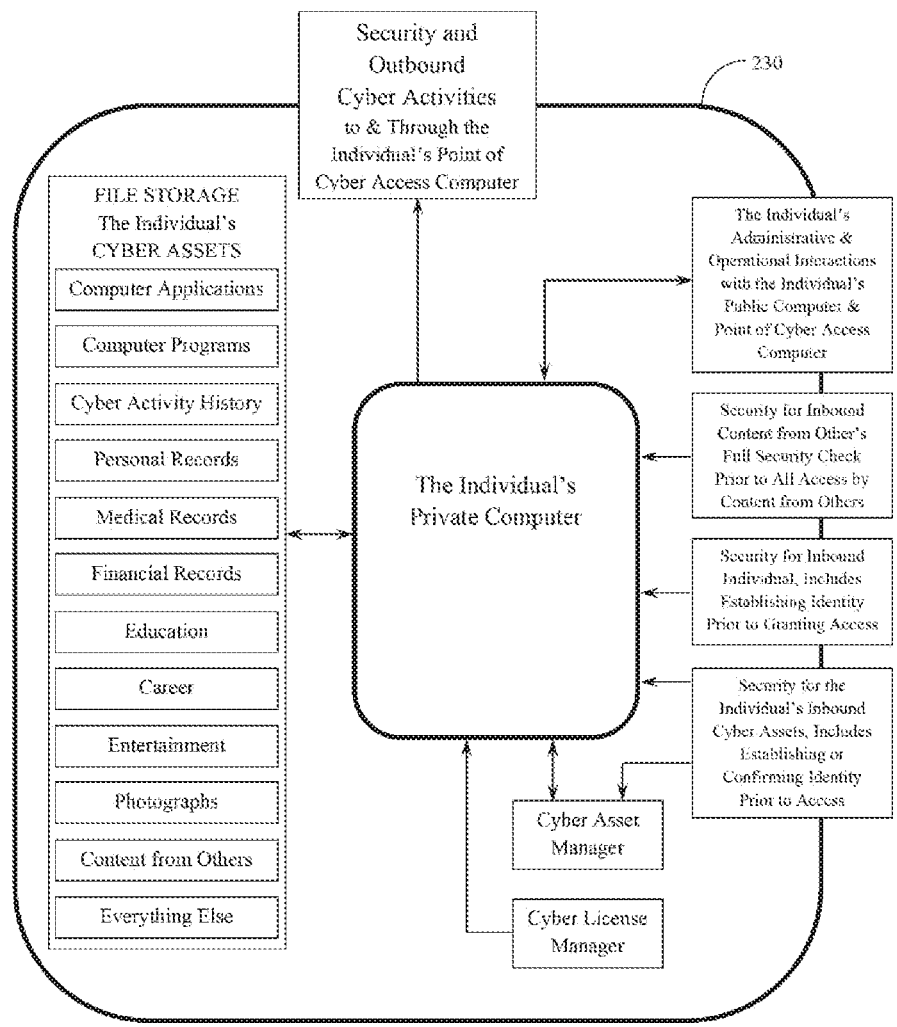
FIG. 13 is a schematic diagram that illustrates a particular non-limiting embodiment of the person's or the entity's private computer in accordance with the teachings herein, as well as components, interconnections, and associated cyber activities that may occur within the person's or the entity's private computer.
Figure 14:
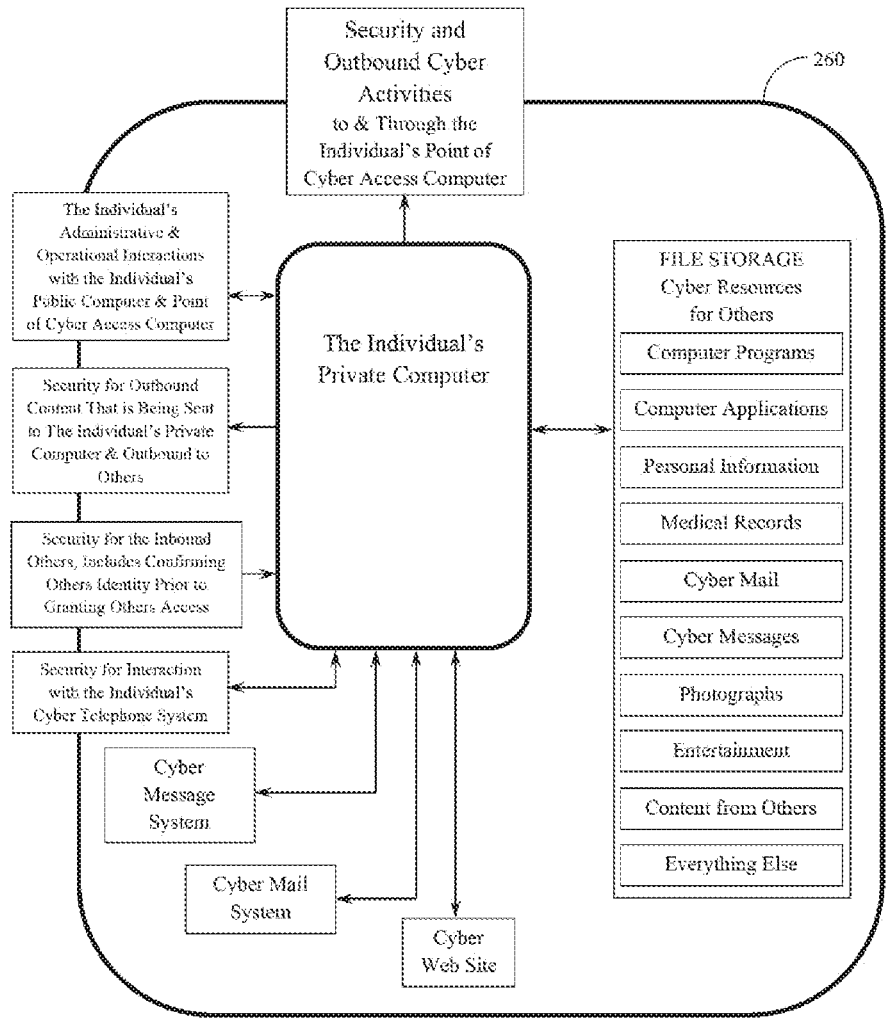
FIG. 14 is a schematic diagram that illustrates a particular non-limiting embodiment of the person's or the entity's public computer in accordance with the teachings herein as well as components, interconnections, and associated cyber activities that may occur within the person's or the entity's public computer.
Figure 15:
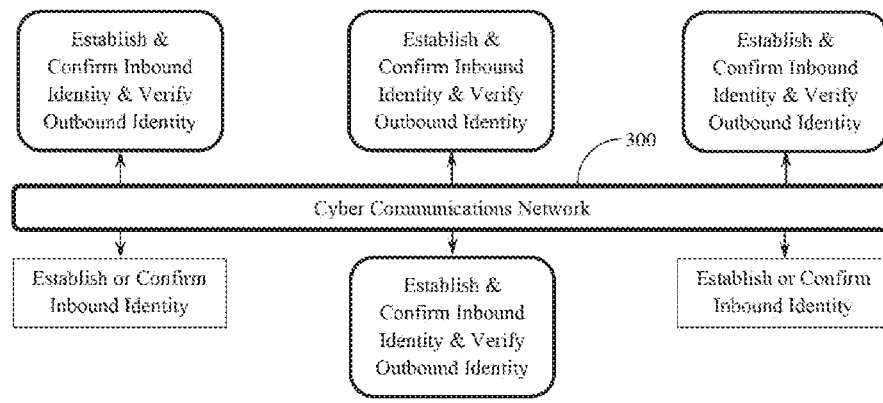
FIG. 15 is a schematic diagram that illustrates a particular non-limiting embodiment of a cyber communications network of a point-of-cyber-access cyber system in accordance with the teachings herein.

A still better understanding of the systems and devices of one non-limiting embodiment of the point-of-cyber-access cyber system disclosed herein may be gained by appreciating that an individual's point of cyber access computer may be configured to work in conjunction with a separate private computer 230 shown in more detail in FIG. 13 or a separate public computer 260 (shown in more detail in FIG. 14). The individual's point of cyber access computer may be configured to require that every person, entity or cyber device pass at least one accurate identity test prior to granting the selected people, entities, other parties and the selected cyber devices further access to the individual's point of cyber access computer. The individual's point of cyber access computer may also be configured to provide routing and security between the individual's point of cyber access computer and the individual's private computer or the individual's public computer.

A separate private computer 230 may be configured to provide separate unique and different processing and support for a combination of an individual's private cyber activities, private cyber assets, and private cyber resources.

A separate public computer 260 may be configured to provide separate, unique and different processing and support for a combination of an individual's public cyber activities, publicly available cyber assets, and publicly available cyber resources.

An individual's separate private computer 230 may also be configured to serve as a cyber vault. By functioning as a cyber vault, the individual's private computer 230 may provide the individual with safety, security, and privacy for: (a) the individual's personal and private cyber activities, (b) the individual's private cyber assets, or (c) the individual's private cyber resources that are within the constructs of a properly configured cyber vault.

An individual's public computer 260 may be configured to provide for cyber interactions between the individual and another party.

As shown in FIGS. 1 and 2, a non-limiting embodiment of the point-of-cyber-access cyber system 10 may be scaled and configured to include at least one secure thin cyber portal 100. A thin cyber portal 100 may provide for remote cyber interactions between a person and the person's point of cyber access computer 200.

The point-of-cyber-access cyber system 10 may provide for storage of the entire collection of an individual's file-based cyber assets.

The primary processes, procedures, and programs that may be utilized to make up at least one configuration of a non-limiting embodiment of the point-of-cyber-access cyber system 10 are:
 (a) a system-wide requirement that each cyber device, each person and each entity that is using the disclosed point-of-cyber-access cyber system pass at least one accurate identity test prior to or immediately prior to at least one step or each step that the cyber interactions of the cyber device, person or entity carries out throughout the point-of-cyber-access cyber system;
 (b) a universal operating system;
 (c) processes or procedures for creating or using interactive cyber content;
 (d) processes or procedures for providing cyber content interoperability by translating cyber content to or from a universal operating system-standard cyber content format;
 (e) processes or procedures that provide for a sender to send only pre-processed image-based cyber content to a recipient;
 (f) interoperability processes or procedures that translate cyber interactions or cyber content to or from at least one universal operating system-standard format;
 (g) separate processing or support by a separate private computer for the private cyber activities of an individual, and separate and different processing or support by a separate public computer for the public cyber activity of the individual;
 (h) processes or procedures that exclude cyber interactions from all other parties and cyber interactions from the cyber devices of all other parties from gaining access to an individual's private computer;
 (i) processes or procedures that provide one specific individual with exclusive and complete administrative control, operational control, or access control of at least one member selected from the group consisting of: (i) the individual's point of cyber access computer, (ii) the individual's public computer, (iii) the individual's private computer, (iv) the individual's device-based cyber assets, or (v) the individual's device-based cyber resources; or (vi) processes or procedures for enabling an individual to selectively grant or selectively deny at least one specified other party access to all or part of at least one member selected from the group consisting of: (i) the individual's point of cyber access computer, (ii) the individual's cyber telephone system, (iii) individual's public computer, (iv) the individual's cyber assets, or (v) the individual's cyber resources.

Figure 3:
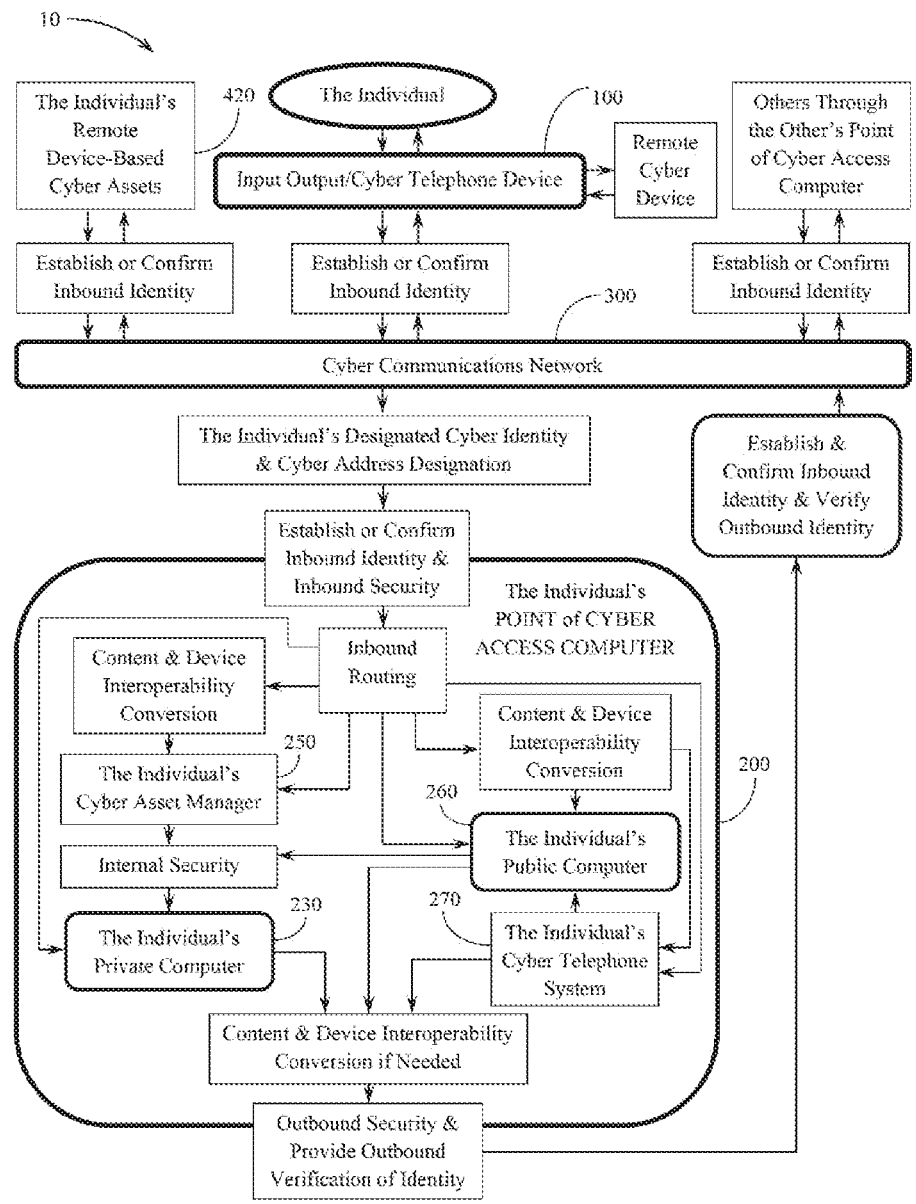
FIG. 3 is a schematic block diagram that illustrates some particular non-limiting embodiments of interconnections and cyber activities that may occur within the architecture of a point-of-cyber-access cyber system in accordance with the teachings herein.
Figure 4:
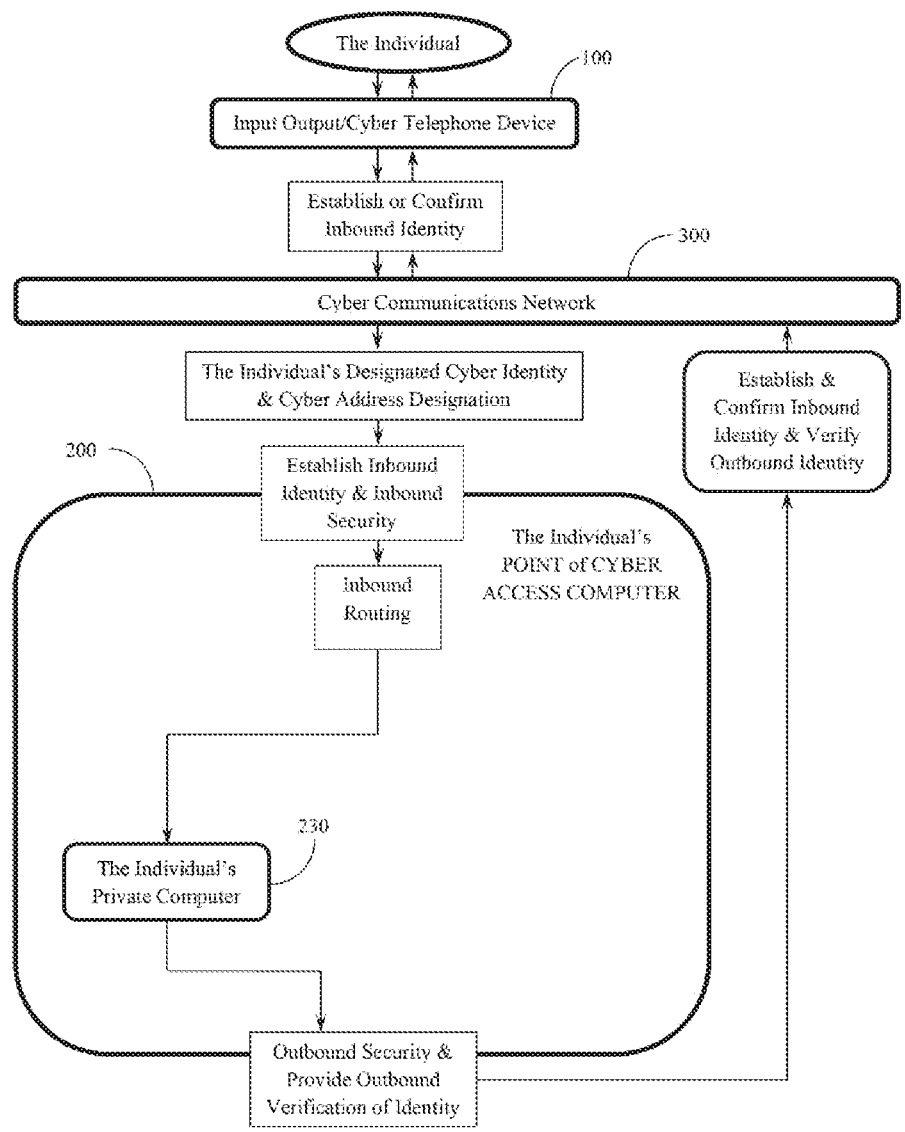
FIG. 4 is a schematic block diagram that illustrates a particular, non-limiting embodiment of a point-of-cyber-access cyber system in accordance with the teachings herein, and the cyber activities of a person or an entity which may be associated with such a system.
Figure 5:
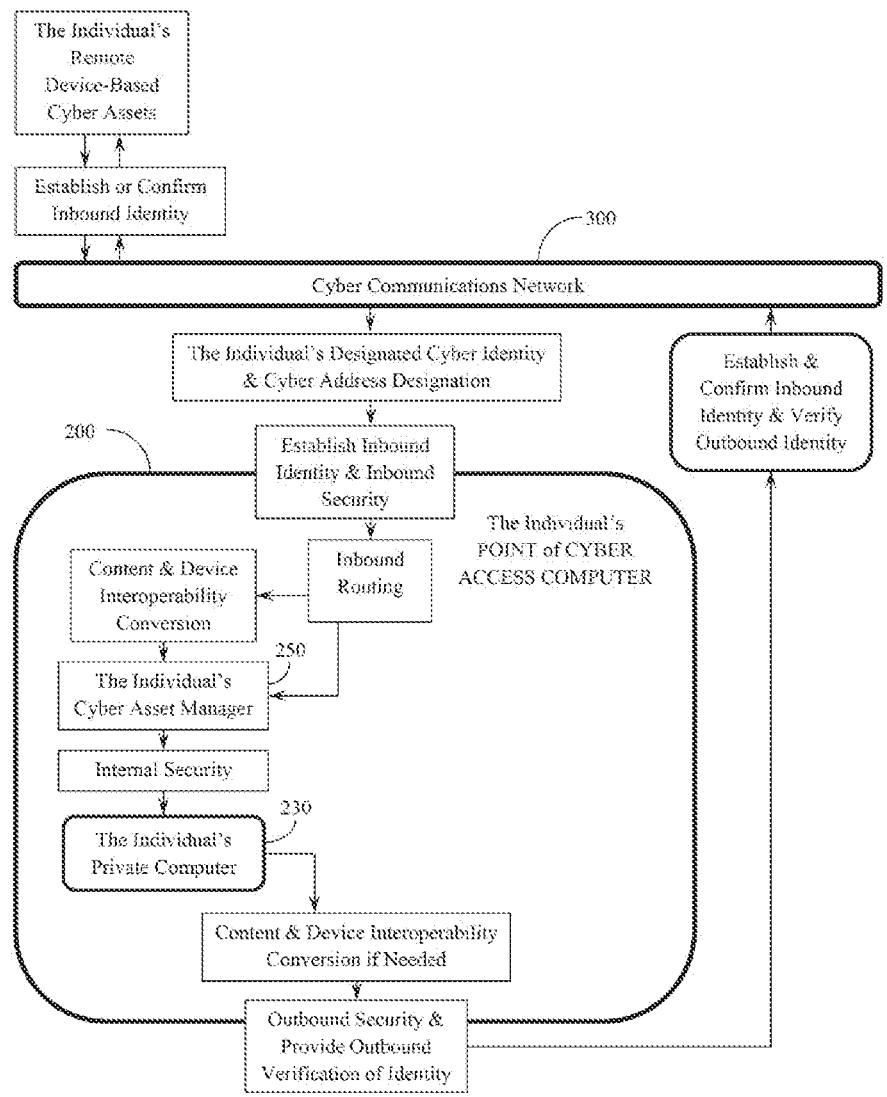
FIG. 5 is a schematic block diagram that illustrates particular, non-limiting embodiments of cyber activities which may be associated with the utilization of a person's or an entity's device-based cyber assets in accordance with the teachings herein.
Figure 6:
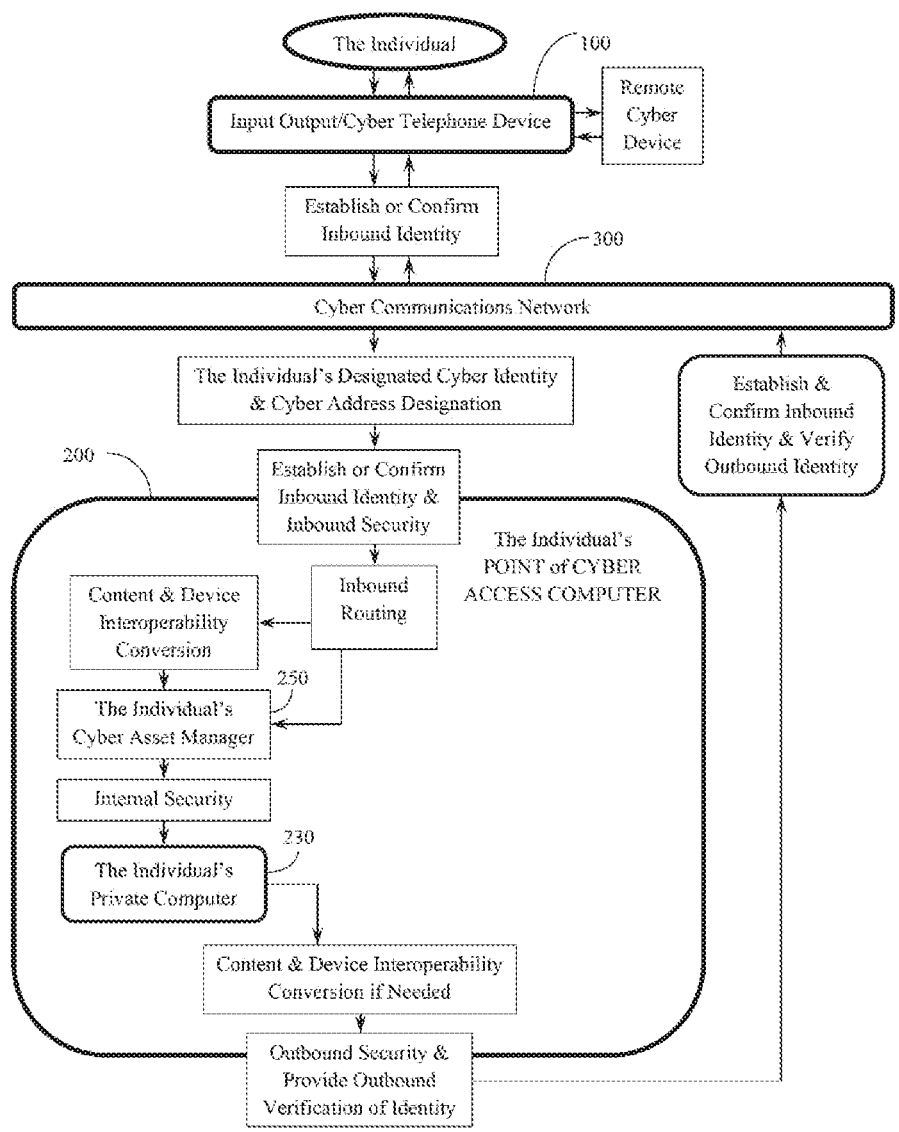
FIG. 6 is a schematic block diagram that illustrates particular, non-limiting embodiments of cyber activities which may be associated with an individual and cyber activities which may be associated with utilization of a remote cyber device in the systems and methodologies disclosed herein.
Figure 7:
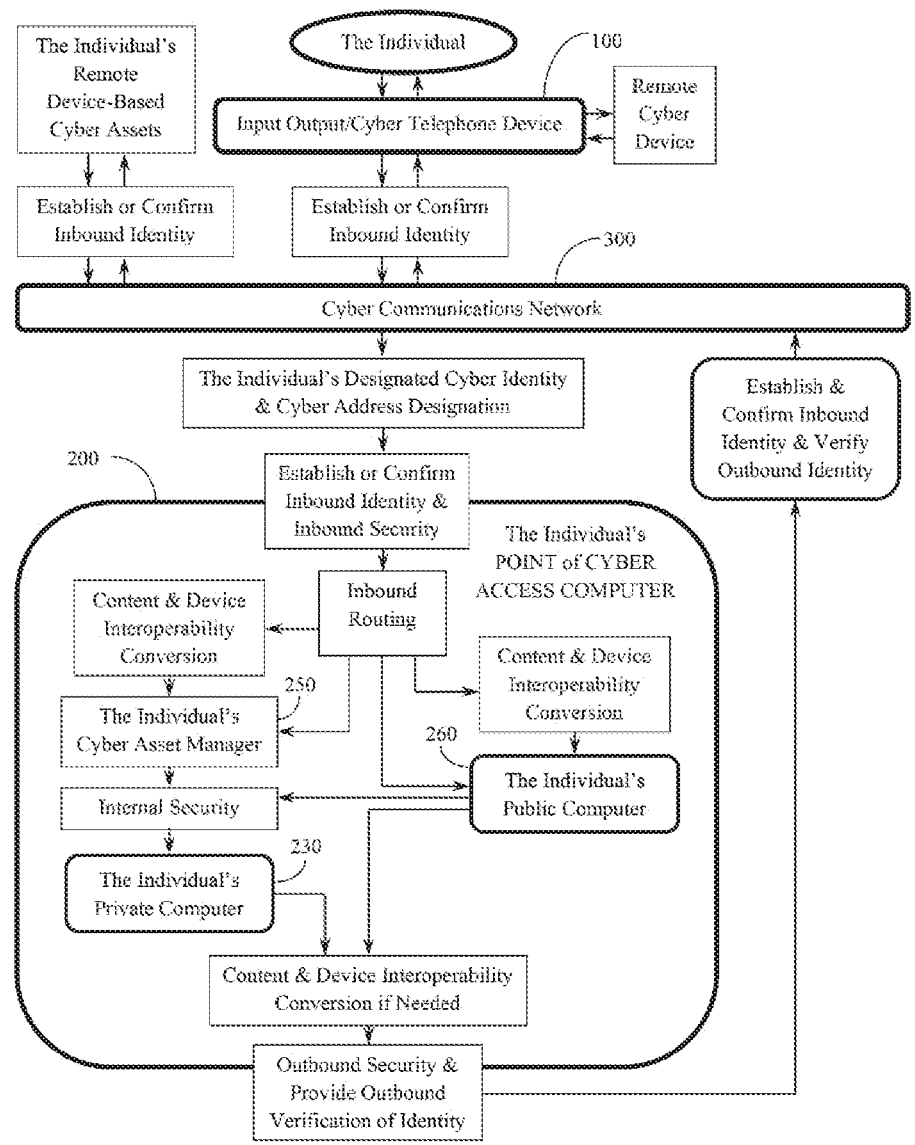
FIG. 7 is a schematic diagram that illustrates particular non-limiting embodiments of cyber activities which may be associated with the utilization of a person's or an entity's device-based cyber assets in the systems and methodologies disclosed herein, as well as cyber activities which may be associated with the person or the entity, and cyber activities which may be associated with utilization of a remote cyber device in the systems and methodologies disclosed herein.
Figure 8:
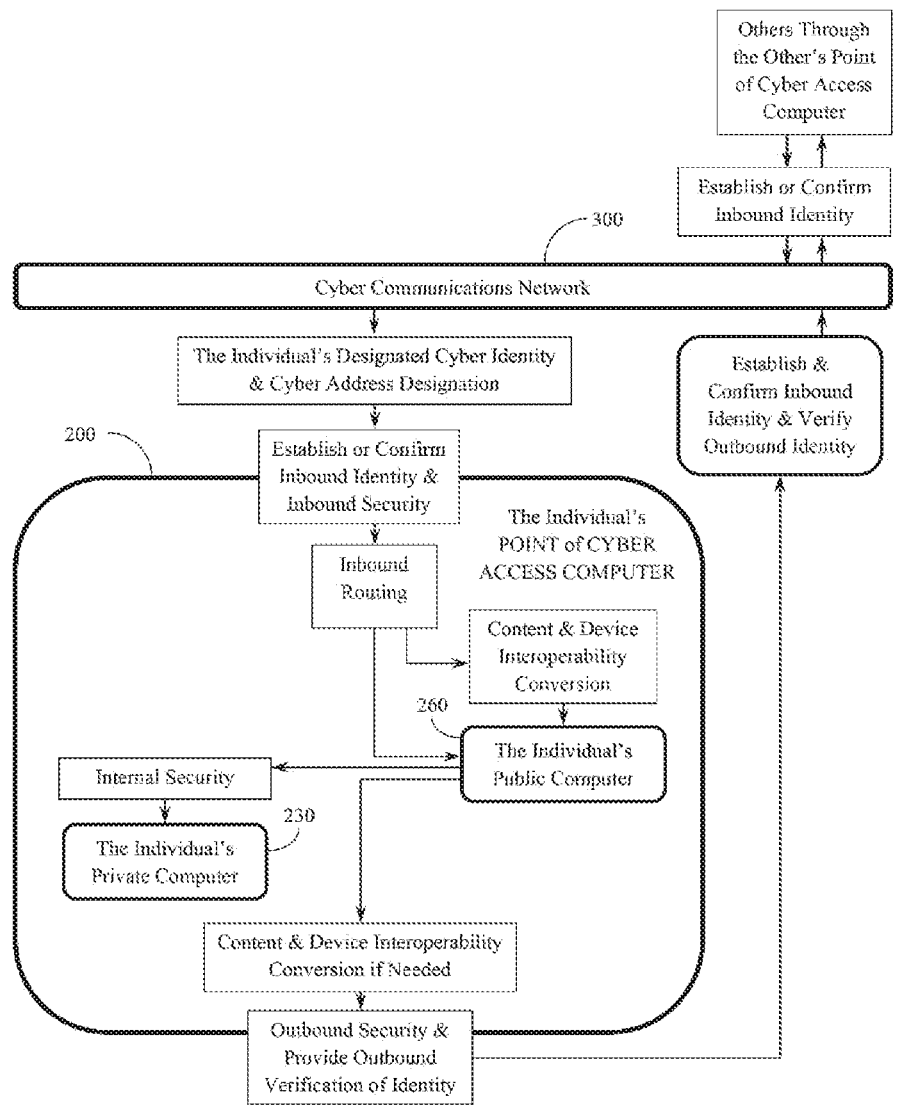
FIG. 8 is a schematic diagram that illustrates particular non-limiting embodiments of cyber activities which may occur between another person or another entity and the person's or the entity's public cyber resources in the systems and methodologies described herein.
Figure 9:
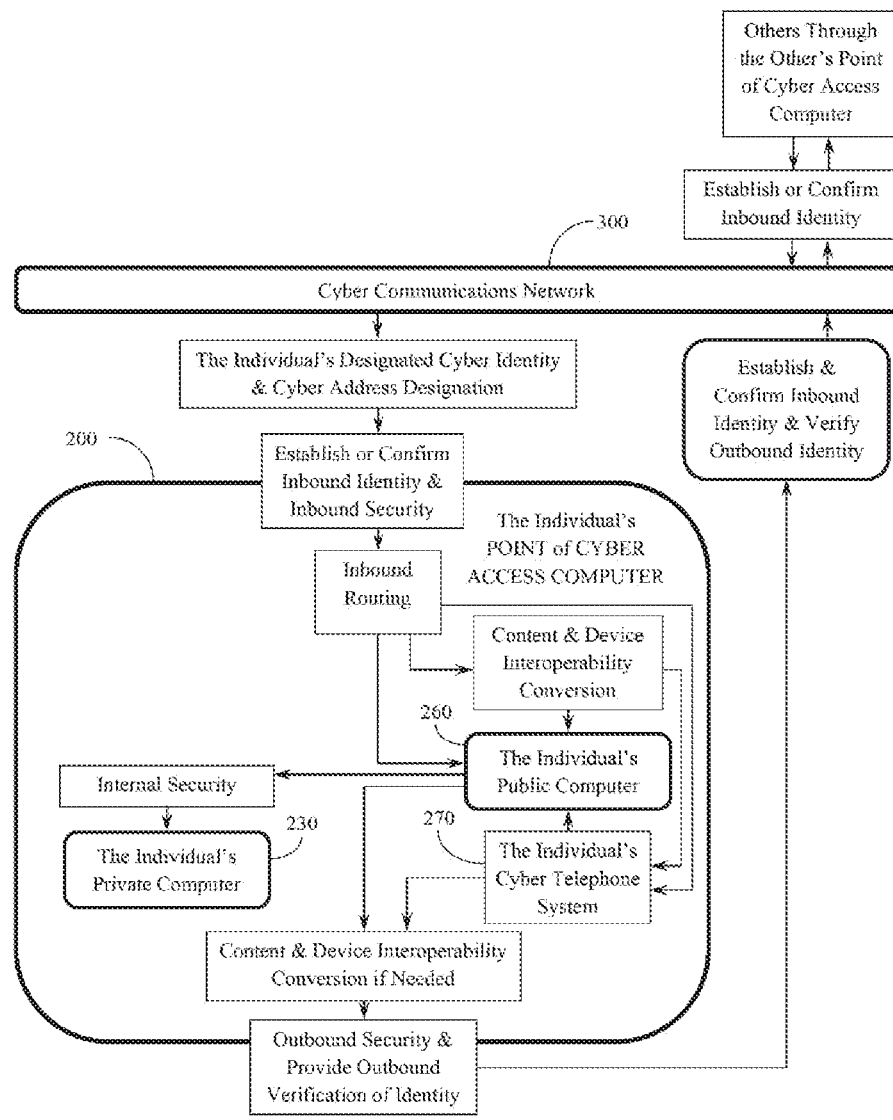
FIG. 9 is a schematic diagram that illustrates particular non-limiting embodiments of cyber activities which may occur between another person or another entity, and the person's or the entity's public cyber resources, or the person's or the entity's cyber telephone system in the systems and methodologies disclosed herein.
Figure 10:
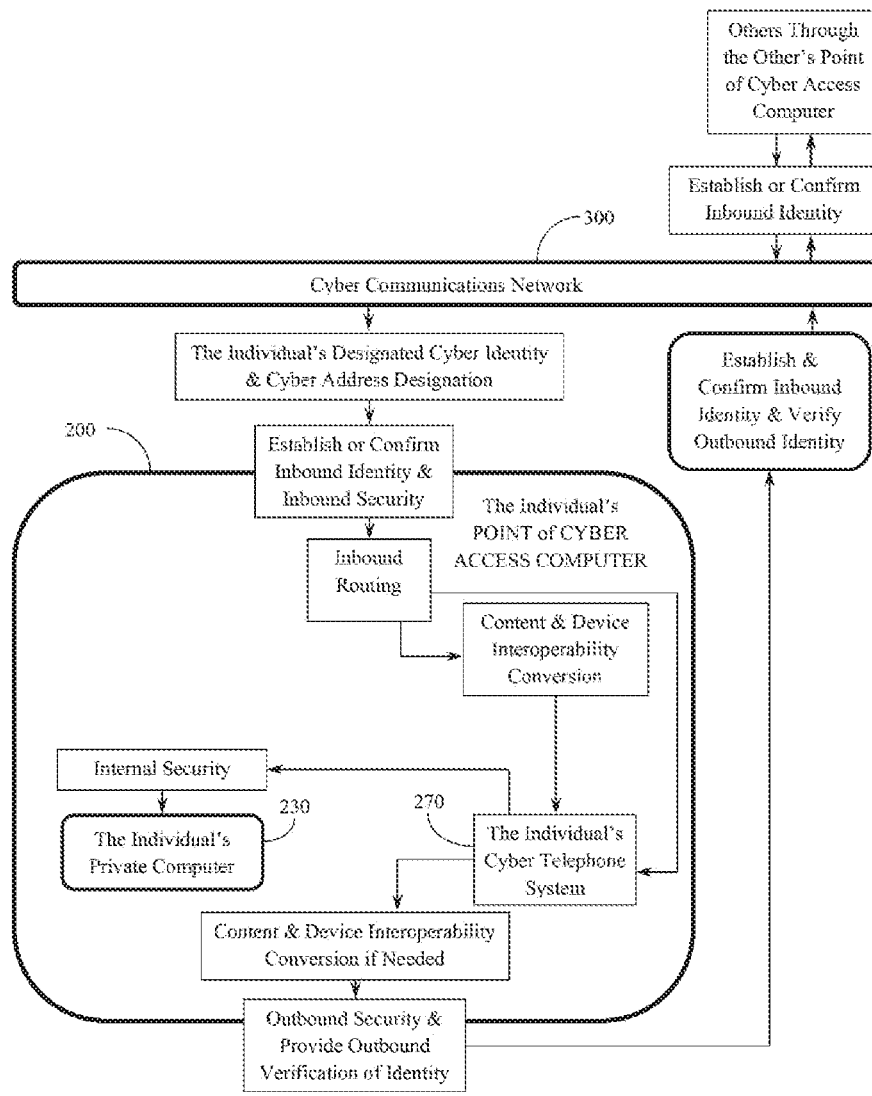
FIG. 10 is a schematic diagram that illustrates particular non-limiting embodiments of cyber activities which may occur between another person or another entity and the person's or the entity's cyber telephone system in the systems and methodologies disclosed herein.

The foundation for a non-limiting safe, secure, and private embodiment of the disclosed point-of-cyber-access cyber system 10, as shown in FIG. 3, is the requirement that each person, each entity and each cyber device pass at least one accurate identity test prior to or immediately prior to at least one step or each step the cyber interactions of the person, entity or cyber device takes throughout the point-of-cyber-access cyber system.

This foundational requirement for every person, entity, or cyber device to pass at least one accurate identity test as a condition of gaining further access may be used to provide a safe and secure cyber environment that provides a level of cyber safety, cyber security, and cyber privacy that far exceeds what is found in prior art cyber systems. This foundational requirement also establishes a framework that supports cyber personal rights, cyber privacy rights, and cyber property rights for every person or entity.

The point-of-cyber-access cyber system provides any one specific person or any one specific entity with only one unique lifelong point-of-cyber-access cyber system identity designation. This unique lifelong identity designation, when combined with the point-of-cyber-access cyber system address designation of an individual's point of cyber access computer 200 provides all that other parties need to know to contact the individual for cyber interactions or cyber activities.

As shown in FIG. 1, the point-of-cyber-access cyber system 10 may also include a cyber portal 100. A cyber portal 100 may be configured to provide a person with the ability to use the cyber portal 100 for secure remote cyber interactions with the person's point of cyber access computer 200. An example of a group of embodiments of a cyber portal 100 appears in FIGS. 16A-16F.

Figure 16A:
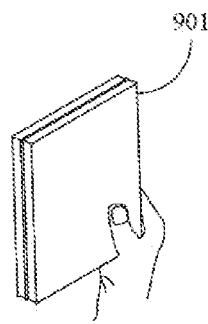
FIGS. 16A-16F are illustrations of a particular non-limiting embodiment of a two-screen cyber portal that may be configured for use in multiple forms in accordance with the teachings herein.
Figure 16B:
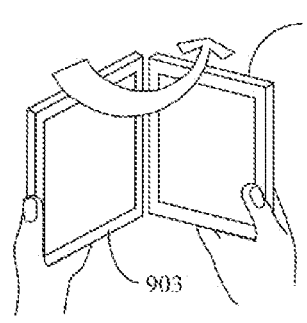
Figure 16C:
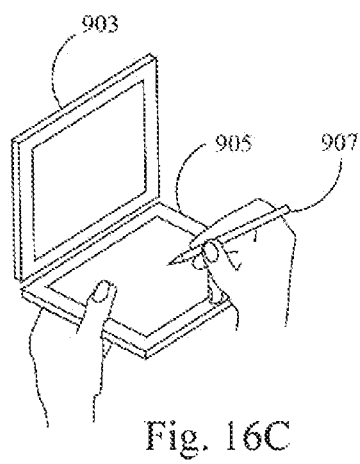

As shown in FIG. 16B, for example, the cyber portal 901 may include two screens 903 and 905 hinged together like a book. As shown in FIG. 16C, a stylus 907 may be used by a person for input interaction with one or both of the image display screens 901 of the cyber portal. Further adaptability of the cyber portal appears in FIG. 16D, where screen 905 may be rotated with respect to screen 903. Once rotated, screens 903 and 905 may be folded back together as shown in FIG. 16E. When folded together as in FIG. 16F, a person may again use a stylus 907 to interact with the one accessible image display screen of the cyber portal 901. Each configuration of the cyber portal 901 provides a different functionality to a person.

Those skilled in the art will appreciate that the cyber portal 901 shown in FIGS. 16A-16F is but one of many different types of devices that may serve as a cyber portal 100 that may be used as a component of the point-of-cyber-access cyber system 10 disclosed herein.

As shown in FIG. 3, a person, through use of a cyber portal 100, communicates information derived from sensor observations to the person's point of cyber access computer 200. This communication first enables the person's point of cyber access computer 200 to accurately test the person's identity. After the person passes the accurate identity test the person's point of cyber access computer 200 may be further configured to provide the person with access to cyber assets or cyber resources that are available to the person through the person's point of cyber access computer 200.

Once the person passes the identity test, the person's point of cyber access computer 200 may be configured to provide the person with an array of functionalities including, but not limited to, at least one member selected from the group consisting of: (a) computing capabilities, (b) computer programs, (c) computer applications, (d) cyber telephone services, (e) cyber video telephone services, (f) cyber messaging services, (g) cyber mail services, (h) cyber television, (i) cyber video entertainment, (j) cyber radio, (k) cyber music, (l) verification of the person's identity as needed for the person's public cyber activities, (m) cyber interactions with the person's cyber assets, (n) cyber interactions with other parties, or (o) cyber interactions with the cyber resources of other parties. Further, the person may be provided with the option to have exclusive control of: (i) operational functions, (ii) system access functions, (iii) systems management functions, or (iv) systems configuration functions of the person's cyber assets.

An individual's point of cyber access computer 200 may be configured to work in conjunction with at least one of two additional and separate types of computers, each providing for separate and different areas of operation, namely:

(a) an individual's private computer 230, or (b) an individual's public computer 260.

One particular, non-limiting embodiment of a possible configuration of an individual's private computer 230 is shown schematically in FIG. 13. The embodiment may be configured to only be accessed by the cyber interactions of the individual or the individual's selected device-based cyber assets or selected device-based cyber resources.

One particular embodiment of a possible configuration of one specific individual's public computer 260 is shown schematically in FIG. 14. The particular non-limiting embodiment depicted therein may be configured to provide any one specified other party that has passed at least one accurate identity test with access to specified cyber resource that have been made available to the specified other party by the one specific individual.

A private computer 230 that works in conjunction with the individual's point of cyber access computer 200 may be configured to establish a new dimension for a person's or an entity's cyber activities. This new dimension includes a high level of privacy, safety, and security that is not provided by prior art cyber systems.

An individual's private computer may be configured to where only the cyber interactions of the individual or the cyber interactions of the individual's selected device-based cyber assets or cyber resources may gain access to the individual's private computer 230. Only after the individual's device-based cyber assets or cyber resources have passed at least one accurate identity test will the individual's specified device-based cyber assets, or cyber resources each be granted access to the individual's private computer 230. The individual's private computer 230 may be configured to deny access thereto by the cyber interactions of all other parties. This feature of the point-of-cyber-access cyber system 10 may provide the individual with absolute privacy, safety, and security for the individual's cyber activities that occur within the individual's private computer 230.

An individual's point of cyber access computer 200 may contain the entire collection of the individual's file-based cyber assets or file-based cyber resources.

Through use of a properly configured private computer 230, an individual may have access to at least one member selected from the group consisting of: (a) computing capabilities, (b) computer programs, (c) computer applications, (d) cyber telephone services, (e) cyber video telephone services, (f) cyber messaging services, (g) cyber mail services, (h) cyber television, (i) cyber video entertainment, (j) cyber radio, (k) cyber music, (l) cyber interactions with available cyber resources of other parties, or (m) at least one cyber interaction or cyber service of at least one other type. Further, through use of the individual's own properly configured private computer 230, the individual may be provided with the option to have exclusive operational control of at least one: (i) system management function, (ii) system configuration function, or (iii) system access control function. Any of the foregoing functions may be functions of: (A) the individual's point of cyber access computer, (B) the individual's private computer, or (C) the individual's public computer. The individual may also be provided with operational control of the access control functions of the individual's cyber assets or cyber device manager.

An individual's cyber assets include all of the individual's cyber devices, programs, applications, processes, procedures, and files that use non-biological processing of programming in any way.

Cyber assets are the property of one specific individual. An individual may share all or part of the individual's cyber assets with specified other parties. When the individual makes copies of the individual's file-based cyber assets available for specified other parties, such copies may be made available through the individual's public computer 260. Copies of the individual's cyber assets that are made available to specified other parties are considered to be the cyber resources of the specified other parties.

An individual's file-based cyber assets may include, but are not limited to, at least one member selected from the group consisting of: (a) personal records, (b) financial records, (c) health records, (d) cyber historical records, (e) photographs, (f) cyber books, (g) cyber magazines, (h) music, (i) videos, (j) computer programs, (k) computer applications, or (l) cyber files of any other type.

An individual's device-based cyber assets, at a minimum, consist of the individual's point of cyber access computer 200. The individual's device-based cyber assets may also include at least one member selected from the group consisting of: (a) a cyber portal, (b) a private computer, (c) a public computer, (d) an audio output/image display device, (e) a cyber telephone device, (f) a health monitoring device, (g) a vehicle, (h) a cyber file backup or restore, device, (i) a video camera, (j) a home or office cyber automation device that may control or monitor lights, locks, security systems, thermostats, refrigerators, lawn sprinkler systems, water heater operations, water or electric consumption, garage door openers, dog doors, printers, private weather stations, (k) global position locating devices, (l) robots, or (m) other device-based cyber assets that an individual may interact with.

As shown in FIG. 3, an individual's private computer 230 may be configured to allow security processes or procedures to be used for all inbound cyber activities, for all inbound cyber interactions, and for all inbound cyber content that is transferred to the individual's private computer 230 from the individual's point of cyber access computer 200, or from the individual's public computer 260.

As also shown in FIG. 3, the individual's public computer 260 may be configured to be used as the individual's point of access to: (a) cyber activities, (b) cyber interactions, or (c) the transfer of cyber content to or from other parties.

An individual's point of cyber access computer 200 may be configured to require the individual pass at least one accurate identity test for an outbound cyber activity or for an outbound cyber interaction.

The point-of-cyber-access cyber system may be configured to mandate that the cyber device within the cyber communications network that comes into first contact with a sender's point of cyber access computer and the cyber portal a person is using must pass at least one accurate identity test prior to further access being granted to the sender's cyber interactions. The device within the cyber communications network 300 that comes into first contact with cyber interactions from the sender's point of cyber access computer may subsequently require the sender's point of cyber access computer 200 to pass at least one accurate identity test prior to or immediately prior to at least one step or every step that the sender's cyber interactions take throughout the point-of-cyber-access cyber system 10.

An individual's point of cyber access computer 200 may be configured to require that any other party pass at least one accurate identity test prior to or immediately prior to allowing cyber interactions from the other party to gain further access to the individual's point of cyber access computer 200. The individual's point of cyber access computer 200 may be further configured such that once another party has passed at least one accurate identity test, the cyber interaction from the specified other party may then be granted specified access to the individual's point of cyber access computer 200.

Other parties may gain access to an individual's point of cyber access computer 200 or to an individual's public computer 260 for the purposes of cyber activities or cyber interactions.

An individual may have the ability, through use of the access or management functions of the individual's properly configured private computer 260, to specify to whom the individual grants or denies access to at least one member selected from the group consisting of:

(a) the individual's point of cyber access computer 200;
(b) the individual's cyber telephone system 270;
(c) the individual's public computer 260; or
(d) the individual's private computer.

Further, the individual may grant or deny each specified other party access to the cyber resources that the individual makes available to the specified other party through the specified other party's cyber interactions with the individual's properly configured public computer 260.

Other parties that are granted access to at least one member selected from the group consisting of: (a) all or part of an individual's cyber resources, (b) all or part of an individual's cyber telephone system 270, or (c) all or part of an individual's public computer 260, may only request a response be made by at least one member selected from the group consisting of: (i) the individual, (ii) the individual's point of cyber access computer 200, (iii) the individual's public computer 260, (iv) the individual's cyber telephone system, (v) the individual's cyber device manager, or (vi) the individual's private computer 230.

Other parties may be excluded from gaining operational access or administrative control of an individual's cyber resources. Further, other parties may be excluded from gaining operational access or administrative control of the individual's public computer 260.

Cyber interactions from a person's point of cyber access computer 200 to a cyber portal 100 that is being used by the person as shown in FIG. 3 may be pre-processed as image-based or audio-based content prior to being sent as opposed to being sent as cyber interaction files that will need to be processed into image-based or audio-based content by the recipient.

A recipient may respond to an interaction received from a sender, and formatted by the point-of-cyber-access cyber system of the sender, by communicating to the sender:
(a) the recipient's specific cyber interaction;
(b) the specific point on the specific image or soundtrack where the recipient's cyber interaction was made; or
(c) the identification of the sender's specific content that was perceived by the recipient at the point in time when the recipient's cyber interaction was made.

Embodiments of the systems and processes disclosed herein may provide or utilize a frames and scrolls format or system for interactive image-based cyber content. Using the frames and scrolls format or system, as shown in greater detail in the array of images in FIGS. 18A-18G for image-based content, a recipient may respond to a cyber interaction from the sender by communicating the recipient's specific input, at the specific point on the specific image that the recipient perceives.

Figure 18A:
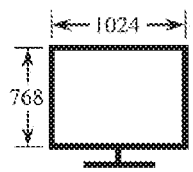
FIGS. 18A-18G are illustrations depicting particular non-limiting embodiments of cyber images in accordance with the teachings herein, shown in both frames format and scrolls format.
Figure 18B:
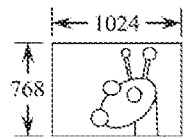
Figure 18C:
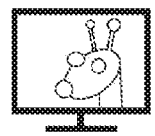
Figure 18D:
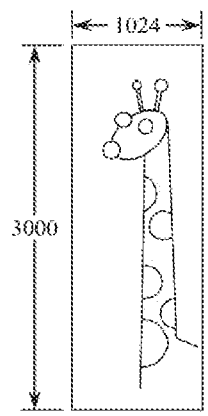
Figure 18E:
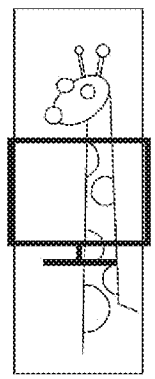
Figure 18F:
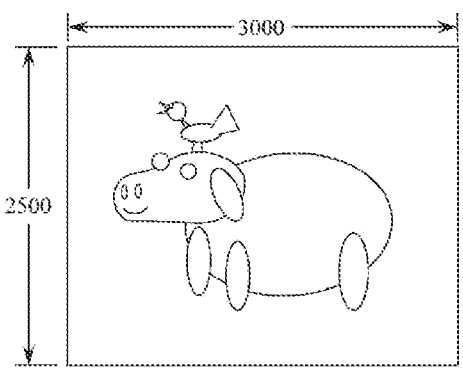
Figure 18G:
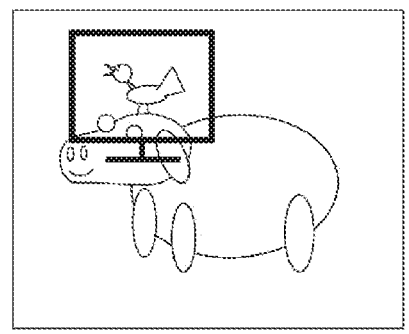

For example, FIG. 18A depicts a screen that is similar to screens 903 and 905 shown in FIGS. 16A-16 F. The screen is 1024 pixels wide by 768 pixels high. An image to be displayed that has a dimension greater than 1024 pixels wide×768 pixels high, such as the 1024 pixels wide by 3000 pixels high image shown in FIG. 18D, will not appear in its entirety on a 1024 pixels wide×768 pixels high image display screen. Rather, only a portion of the image shown in FIG. 18D will appear at one time on a screen such as shown in FIG. 18E or in FIG. 18G using the disclosed frames and scrolls format or system. As shown in FIGS. 18E and 18G, the disclosed scrolls format may be used when one or both of the two image dimensions are larger than what may be presented at one time on an image display screen.

As shown in FIG. 3, an individual's point of cyber access computer 200 may also include a cyber telephone system 270. The cyber telephone system 270 may provide for any or all aspects of the individual's needs or desires for cyber telephone services. The individual's cyber telephone system 270 may be configured to perform at least one of the following steps:
(a) provide at least one historical record of at least one cyber telephone system activity;
(b) grant or deny at least one other party access to: (i) cyber telephone communication interactions with the individual, or (ii) at least one resource of the individual's cyber telephone system;
(c) route cyber telephone communications interactions and related cyber alerts to a cyber portal/cyber telephone device that is on or near a specific person or that is specified for use as a cyber telephone contact device by an individual;
(d) record messages from inbound cyber telephone communications interactions;
(e) deliver messages to specified other parties; or
(f) provide at least one other cyber telephone service or function that the individual needs or desires.

A key security feature of one non-limiting embodiment of the disclosed point-of-cyber-access cyber system 10 is that the point-of-cyber-access cyber system may be configured to have differences among at least one member selected from the group consisting of: (a) operations, (b) processes, (c) code, (d) transfer packets, or (e) formats that are utilized for at least one member selected from the group consisting of: (i) cyber interactions, (ii) cyber telephone communications, (iii) cyber mail, (iv) cyber messages, (v) cyber television, (vi) cyber video entertainment, (vii) cyber music, (viii) file transfers, (ix) computer programs, (x) computer applications, (xi) operational controls, or (xii) at least one other required, or desired, function. The reason for the use of differences among operations, processes, code, transfer packets, or formats, is: (A) to provide for security between different processes, (B) to assure proper routing, or (C) to assure that cyber interaction for one specific purpose cannot or will not be used for a different purpose.

A cyber communications network 300 that is utilized by a point-of-cyber-access cyber system may be configured to require that one specific individual pass at least one accurate identity test prior to or immediately prior to at least one step or each step that the one specific individual's cyber interactions carry out throughout the cyber communications network 300.

A cyber communications network that is utilized by a point-of-cyber-access cyber system may be configured to require that each cyber device pass at least one accurate identity test prior to or immediately prior to at least one step or each step that the interactions of the cyber device take throughout the cyber communications network 300.

The point-of-cyber-access cyber system 10 may require a cyber activity to be properly formatted. Further, the point-of-cyber-access cyber system 10 may require that a cyber activity keep a historical record of one step or each step, that a cyber activity carries out throughout the cyber communications network 300, or throughout the point-of-cyber-access cyber system 10.

The point-of-cyber-access cyber system 10 may include policies, procedures, and devices that may be used for cyber interaction among: (a) people, (b) entities, (c) an individual's point of cyber access computer 200, (d) an individual's private computer 230, or (e) an individual's device-based cyber assets 420 (see FIG. 2). These policies, procedures, and devices may be configured to provide for safe and secure cyber interactions between the individual's device-based cyber assets 420 and the individual or the individual's private computer 230 or the individual's point of cyber access computer 200. In addition, these policies, procedures, and devices may be configured to exclude all other parties from gaining access to the individual's cyber assets or cyber resources.

Another key feature of the disclosed point-of-cyber-access cyber system 10 is that the point-of-cyber-access cyber system may be configured to include utilization of a universal operating system. The universal operating system provides programming that provides or enables processes and procedures. The processes and procedures may be configured to provide an interoperable interconnected point-of-cyber-access cyber system. Within that point-of-cyber-access cyber system at least one individual or at least one cyber device may use the safety and security of properly configured point-of-cyber-access cyber system components or resources for safe, secure and private interconnected cyber interactions or cyber activities.

The systems and methodologies disclosed herein may be configured to be agnostic to the operating system that is used by the sender of a cyber interaction, or the operating system that is used by the recipient of a cyber interaction, as long as the cyber interaction between the sender and the recipient use the interoperability processes or procedures of the disclosed universal operating system for interoperable interconnected interactions.

The disclosed universal operating system that may be utilized as a component of a point-of-cyber-access cyber system has interoperability processes that translate cyber interactions, cyber activities, and cyber content to and from standard universal operating system formats.

An individual's point of cyber access computer 200, the individual's private computer 230, and the individual's public computer 260, may each be configured to keep historical records of cyber activities from within the cyber domain of the individual.

Figure 17:
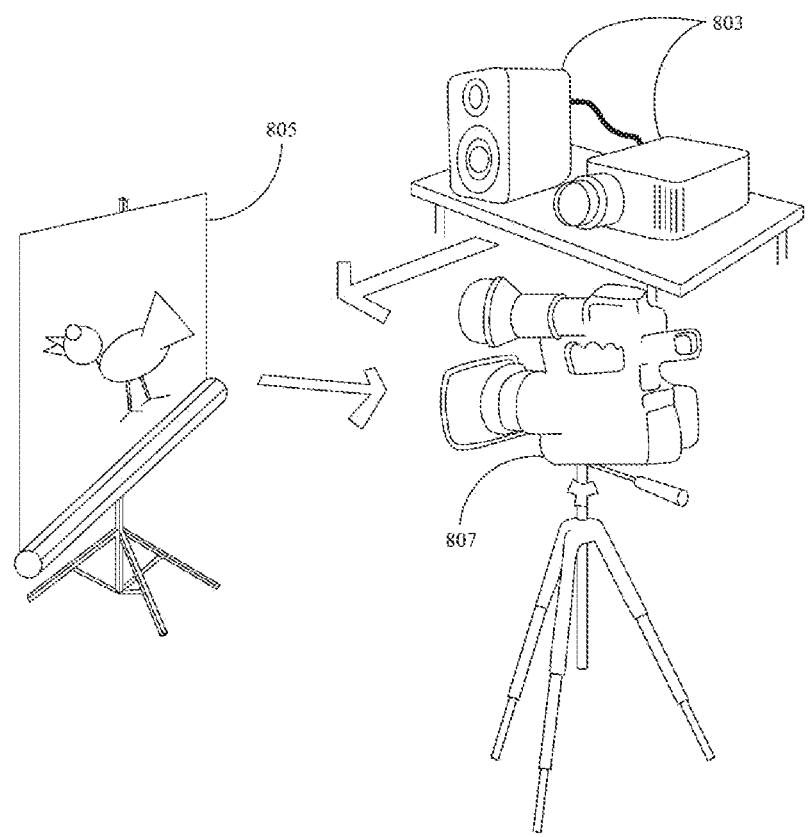
FIG. 17 is an illustration of a particular non-limiting embodiment of a group of virtual equivalents of devices and processes in accordance with the teachings herein that may be used for at least one purpose selected from the group consisting of (a) security, (b) interoperability conversion, and (c) altering or merging cyber images.

As shown in FIG. 17, the universal operating system may include resource-efficient processes and procedures that use: (a) a virtual equivalent of at least one projector 803, (b) a virtual equivalent of at least one projection display screen 805, and (c) a virtual equivalent of at least one recorder or capture device 807, to perform at least one activity selected from the group consisting of: (i) providing cybersecurity, (ii) converting cyber content for interoperability, (iii) converting cyber interactions for interoperability, (iv) altering images, (v) altering audio, or (vi) converging two or more sources of image-based cyber content into at least one converged source of image-based cyber content.

(6) Point-of-Cyber-Access Cyber System Architecture

As shown in FIG. 2, the architecture of the disclosed point-of-cyber-access cyber system 10 defines the interrelationship of the components of one non-limiting embodiment of the point-of-cyber-access cyber system 10. The architecture of the point-of-cyber-access cyber system 10 also defines its components. Specifically, at a minimum, the components of the point-of-cyber-access cyber system 10 include: (a) point-of-cyber-access cyber system architectural rules, (b) point-of-cyber-access cyber system structure, (c) point of cyber access computers 200, (d) cyber portals 100, (e) cyber devices, (f) cyber communications networks 300, and (g) operating systems.

The components of a point-of-cyber-access cyber system 10 may further include at least one member selected from the group consisting of: (a) cyber device managers, 250, (b) cyber telephone systems 270, (c) cyber vaults, (d) private computers, (e) public computers, (f) cyber rights licensing systems, or (g) other components.

The architecture of the disclosed point-of-cyber-access cyber system 10 may be configured to provide for an interconnected cyber system in which: (a) point of cyber access computers 200, (b) cyber portals 100, or (c) cyber devices, may have cyber interactions using cyber communications networks 300, and all utilizing operating systems.

The device architecture of the disclosed point-of-cyber-access cyber system 10 provides for at least one member selected from the group consisting of: (a) point of cyber access computers 200, (b) private computers 230, (c) public computers 260, or (d) cyber devices, to each be at least one member selected from the group consisting of: (i) physical devices, (ii) virtual devices, or (iii) a combination thereof.

The architecture of the disclosed point-of-cyber-access cyber system 10 provides for at least one member selected from the group consisting of: (a) the addition of, (b) the removal from, (c) the alteration of, or (d) the reconfiguration of, the cyber processes or the cyber procedures of the point-of-cyber-access cyber system 10.

The architecture of the disclosed point-of-cyber-access cyber system 10 provides for at least one member selected from the group consisting of: (a) the addition of, (b) the removal from, (c) the alteration of, or (d) the reconfiguration of, cyber components or cyber devices that are components of a point-of-cyber-access cyber system 10.

The architecture of the disclosed point-of-cyber-access cyber system 10 includes device architecture. The device architecture, in turn, may provide for at least one member selected from the group consisting of: (a) unique, separate and different processing and support be used for: (i) an individual's private cyber activities, (ii) an individual's private cyber assets, or (iii) an individual's private cyber resources, and (b) separate and different unique processing and support be used for: (i) an individual's public cyber activities, (ii) an individual's publicly available cyber assets, or (iii) an individual's publicly available cyber resources.

The device architecture of the disclosed point-of-cyber-access cyber system 10 further provides for at least one point of cyber access computer 200 that may be configured to work in conjunction with one or both of two additional separate types of computers. These two types of computers are: (a) private computers 230, and (b) public computers 260. At least two of the three foregoing computer types may be integrated into at least one single device, or at least one of the three foregoing computer types, may be a physically separate computer that may also be at one or more locations.

The device architecture of the disclosed point-of-cyber-access cyber system 10 provides for at least one member selected from the group consisting of: (a) the addition of, (b) the removal from, (c) the alteration of, or (d) the reconfiguration of, at least one member selected from the group consisting of: (i) the components, (ii) the cyber processes, or (iii) the cyber procedures, of at least one cyber device.

The architecture of the disclosed point-of-cyber-access cyber system 10 is configurable for providing for the use of system-standard interface or interaction cyber processes or cyber procedures. The system-standard interface or interaction cyber processes or cyber procedures may be configured to provide a cyber system of cyber interoperability wherein any cyber device may be seamlessly used as a component of the point-of-cyber-access cyber system 10.

An individual's point of cyber access computer 200 may be configured to require the individual or a cyber device of the individual pass at least one accurate identity test prior to or immediately prior to providing further point of cyber access computer access to at least one cyber interaction from the accurately identified individual or the individual's accurately identified cyber device.

The architecture of the disclosed point-of-cyber-access cyber system 10 may be configured to provide for or require that each individual, cyber device or other party pass at least one accurate identity test prior to or immediately prior to at least one step or each step that the cyber interactions of the individual, cyber device or other party takes throughout the point-of-cyber-access cyber system 10.

The architectural rules and requirements of the point-of-cyber-access cyber system may require that one specific person's private computer 230 may only be accessed by cyber interactions from a cyber portal 100 that is being used by the one specific person wherein the one specific person is required to constantly pass accurate identity tests for the one specific person. Further, the architectural rules and requirements of the point-of-cyber-access cyber system may require that the specific person's private computer 230 may only be accessed through the one specific person's point of cyber access computer 200.

The architectural rules and requirements of the point-of-cyber-access cyber system may require that an individual's public computer 260 may only be accessed by cyber interactions from a specific party that has been selected to be granted access by the individual. Further, the individual's public computer 260 may be configured such that it may only be accessed through use of the individual's point of cyber access computer 200.

The architecture of the disclosed point-of-cyber-access cyber system 10 may be configured to provide at least one member selected from the group consisting of:
- (a) an interconnected cyber system for use by an individual for the individual's cyber interactions or cyber activities;
- (b) a set of standard cyber processes or cyber procedures for requiring and providing for each individual, cyber device or other party that uses the point-of-cyber-access cyber system to: (i) initially, (ii) intermittently, or (iii) constantly pass at least one accurate identity test;
- (c) a remotely accessible point of cyber access computer for use by an individual; or
- (d) a person with the ability to utilize a cyber portal to locally or remotely access the person's cyber assets or cyber resources.

The architecture of the disclosed point-of-cyber-access cyber system 10 may be configured to provide at least one zero cybersecurity vulnerability device or environment when the point-of-cyber-access cyber system and its at least one component or resource utilizes cyber system architecture and rules for zero cybersecurity vulnerability.

Wherein a cyber system is configurable for providing or utilizing
- (a) cyber device perimeters that cannot be penetrated,
- (b) programming that constantly tests, with 100% accuracy, the identity of any one specific individual or any one specific cyber device,
- (c) programming that requires every one specific individual and every one specific cyber device to constantly pass 100% accurate identity tests when any one specific individual or any one specific cyber device interacts with or utilizes at least one component or at least one resource of or from the cyber system,
- (d) programming that constantly tests, with 100% accuracy, the identity of any one specific individual or any one specific cyber device during the entire period of time the one specific individual or the one specific cyber device interacts with or utilizes at least one component or at least one resource of or from the cyber system,
- (e) programming that enables any one specific individual to exclusively select and configure for zero cybersecurity vulnerability:
  - (i) the administrative settings of the one specific individual's at least one point of cyber access computer, at least one private computer, at least one public computer, at least one cyber device manager, or at least one cyber device,
  - (ii) the operational settings of the one specific individual's at least one point of cyber access computer, at least one private computer, at least one public computer, at least one cyber device manager, or at least one cyber device, or
  - (iii) the access control settings of the one specific individual's at least one point of cyber access computer, at least one private computer, at least one public computer, at least one cyber device manager, or at least one cyber device, and
- (f) cyber system architecture and rules, for establishing and maintaining zero cybersecurity vulnerability for at least one member selected from the group consisting of
  - (i) at least one point of cyber access computer,
  - (ii) at least one private computer,
  - (iii) at least one public computer,
  - (iv) at least one cyber device manager, or
  - (v) at least one other cyber device from within a cyber system that is utilizable by at least one individual or at least one cyber device, wherein zero cybersecurity vulnerability occurs when a cyber system or its at least one component or resource utilizes cyber system architecture and rules for zero cybersecurity vulnerability that require every zero cybersecurity vulnerability cyber device to have a perimeter that cannot be penetrated and wherein the cyber device perimeter that cannot be penetrated will include at least one 100% secure access portal that requires the constant passing of 100% accurate identity tests for preventing all individuals or cyber devices that cannot constantly pass its 100% accurate identity tests from gaining access to the cybersecurity vulnerabilities of computers, computer processors, computer programming, the architecture of cyber devices and the architecture of components of the cyber system that are within the safe and secure confines of the cyber device perimeters that cannot be penetrated.

(7) Universal Operating System

The universal operating system may be a primary, secondary or the only operating system that is used by components of a cyber system.

The universal operating system may be configured to provide programming that provides processes or procedures that enable at least one cyber system, wherein cyber activities of every type may be integrated into an interconnected cyber system.

The universal operating system may be configured to provide programming that provides or enables processes or procedures that enable an individual to consolidate access to all or part of the individual's cyber activities into a safe and secure remotely accessible device. The safe and secure remotely accessible device may include the individual's point of cyber access computer.

The universal operating system may be configured to provide programming that provides or enables the processes or procedures that enables a cyber system wherein cyber activities and cyber devices of every type may be accessed and used by a person through the person's use of a cyber portal that works in conjunction with the person's point of cyber access computer.

The universal operating system may be configured to minimize the number of same or similar function or purpose operational processes or procedures that are used by others. This minimization of the number of same or similar operational processes or procedures may be accomplished by providing or requiring the use of the universal operating system's standard operational processes or procedures by others.

The universal operating system may be configured to provide programming for device operating systems for at least one member selected from the group consisting of:
- (a) point of cyber access computers;
- (b) private computers;
- (c) public computers;
- (d) cyber portals;

(e) cyber telephone devices;
(f) cyber communications network devices;
(g) cyber device managers; or
(h) any other device that requires the use of an operating system.

The universal operating system may be configured to provide programming that provides or enables the processes or procedures that assure that each individual, cyber device or other party passes at least one accurate identity test prior to or immediately prior to each step or every step that the cyber interactions of that individual, cyber device or other party takes throughout a cyber system.

The universal operating system may be configured to provide programming that provides or enables the processes or procedures that enable a cyber device to accurately test the identity of an individual, cyber device or other party.

The universal operating system may be configured to provide programming that provides or enables the processes or procedures that provide a safe and secure cyber system. Within this safe and secure cyber system at least one cyber device that is a component of the cyber system may be required to pass at least one accurate identity test prior to or immediately prior to having further cyber interactions with a cyber communications network, person, entity or cyber device.

The universal operating system may be configured to provide programming that provides or enables processes or procedures for accurately testing the identity of a specific person, entity or cyber device. These processes or procedures may be utilized by a point of cyber access computer or a cyber device.

The universal operating system may be configured to provide programming that provides or enables processes or procedures that enable a person's point of cyber access computer to require the person pass at least one accurate identity test prior to or immediately prior to granting further access to cyber interactions from a cyber portal that is being used by the person.

The universal operating system may be configured to provide programming that provides or enables processes or procedures that require or provide for an individual's point of cyber access computer to provide another cyber device with verification that the individual has passed at least one accurate identity test. Such verifications may occur prior to or immediately prior to one step or each step that the individual's cyber interactions take throughout a cyber system.

The universal operating system may be configured to provide programming that provides or enables processes or procedures that require an individual's point of cyber access computer to require that the individual's device-based cyber assets pass at least one accurate identity test prior to or immediately prior to entering in to further cyber interaction between the individual's point of cyber access computer.

The universal operating system may be configured to provide programming that provides or enables processes or procedures that enable an individual's point of cyber access computer to verify that a person, entity or the cyber device have passed at least one accurate identity test prior to or immediately prior to its entering in to further cyber interaction with the person, entity or cyber device.

The universal operating system may be configured to provide programming that provides or enables processes or procedures that require or provide for a cyber device within the cyber communications network to verify that a specific person, entity or cyber device has passed at least one accurate identity test upon the specific person's, entity's or cyber device's first interaction with a cyber communications network device.

The universal operating system may be configured to provide programming that provides or enables processes or procedures that require the device within a cyber communications network that comes in first contact with the cyber interactions of one specific person, entity or cyber device to provide verification that the one specific person, entity or cyber device has passed at least one accurate identity test prior to or immediately prior to at least one step or each step that the person's, entity's or cyber device's cyber interactions take throughout a cyber system.

The universal operating system may be configured to provide programming that provides or enables processes or procedures that enable at least one cyber portal to sensor observe a person for the purpose of testing the person's identity. This sensor observation information may then be transferred, as a cyber interaction, to the person's point of cyber access computer, wherein the cyber interaction containing sensor observed identity information regarding the person may be used by the person's point of cyber access computer to accurately test the person's identity.

The universal operating system may be configured to provide programming that provides or enables processes or procedures that enable an individual to use the cyber system identity designation of one specific other individual, or the cyber system identity designation of one device-based cyber asset of one specific other individual to obtain additional information about the one specific other individual, or to obtain additional information about the one specific other individual's device-based cyber asset.

The universal operating system may be configured to provide programming that provides or enables the processes or procedures that require or assure that: (a) each person, (b) each entity, and (c) each cyber device, has one and only one unique lifelong cyber system identity designation.

The universal operating system may be configured to provide programming that provides or enables processes or procedures that require and provide for an individual to constantly pass accurate identity tests for the entire time the individual is using the individual's point of cyber access computer.

The universal operating system may be configured to provide programming that provides or enables processes or procedures that require and provide for an individual to constantly pass accurate identity tests for the entire time the individual is using the resources of an individual's public computer.

The universal operating system may be configured to provide programming that provides or enables processes or procedures that provide operating-system-based cybersecurity functions or services for use throughout all or part of a cyber system.

The universal operating system may be configured to provide programming that provides or enables processes or procedures for constantly and accurately testing the identity of one specific person, one specific entity or one specific cyber device. These processes or procedures may be utilized for enabling zero vulnerability cybersecurity for: a point of cyber access computer, a private computer, a public computer or a cyber device manager. Wherein the point of cyber access computer, the private computer, the public computer or the cyber device manager may be configured to utilize operating-system-based constantly performed accurate identity testing and other necessary cybersecurity processes, procedures, architecture and architectural rules for preventing selected people, entities, or cyber devices from gaining access to cybersecurity vulnerabilities in the programming, the processors or the devices of point of cyber access computers, private computers, public computers, or cyber device managers.

The universal operating system may be configured to provide programming that provides or enables processes or procedures that require or provide cybersecurity measures for all inbound cyber interactions or for all inbound cyber activities that have been sent to an individual's point of cyber access computer.

The universal operating system may be configured to provide programming that provides or enables processes or procedures that require or provide security measures for all cyber interactions or for all cyber activities within an individual's point of cyber access computer.

The universal operating system may be configured to provide programming that provides or enables processes or procedures that require or provide security for all outbound cyber interactions or all outbound cyber activities from an individual's point of cyber access computer.

The universal operating system may be configured to provide programming that provides or enables processes or procedures that provide an individual with the ability to manage security at the individual's device-based cyber assets including at least one device-based cyber asset selected from the group consisting of: (a) an individual's point of cyber access computer, (b) an individual's private computer, (c) an individual's public computer, (d) an individual's remote cyber devices, (e) an individual's cyber device manager, or (f) an individual's cyber telephone system.

The universal operating system may be configured to provide programming that provides or enables processes or procedures that provide differences among at least one member selected from the group consisting of: (a) cyber operations, (b) processes, (c) codes, (d) transfer packets, or (e) formats for cyber interactions for at least one member selected from the group consisting of: (i) cyber telephone communications, (ii) cyber mail, (iii) cyber messages, (iv) cyber television, (v) cyber video entertainment, (vi) cyber music, (vii) cyber file transfers, (viii) computer programs, (ix) computer applications, (x) operational controls, or (xi) at least one other needed or desired operation of a cyber system. The differences among (A) cyber operations, (B) cyber processes, (C) cyber codes, (D) cyber transfer packets, or (E) cyber formats for cyber interactions may provide for security between different processes, may assure proper routing, and may assure that a cyber interaction for one specific purpose may not be used for a different purpose.

The universal operating system may be configured to provide programming that provides or enables processes or procedures that inspect at least one inbound cyber interaction to determine if an inbound cyber interaction contains at least one member selected from the group consisting of: (a) dangerous content, (b) malicious content, (c) inappropriate content, (d) improperly or inadequately labeled content, or (e) unwanted content.

The universal operating system may be configured to provide programming that provides or enables processes or procedures that deny further access to inbound cyber interactions that contain at least one member selected from the group consisting of: (a) dangerous content, (b) malicious content, (c) inappropriate content, (d) improperly or inadequately labeled content, or (e) unwanted content.

The universal operating system may be configured to provide programming that provides or enables the processes or procedures that provide at least one member selected from the group consisting of:
(a) safe and secure cyber interactions between an individual's private computer and the same individual's point of cyber access computer;
(b) safe and secure cyber interactions between an individual's private computer and the same individual's public computer;
(c) safe and secure cyber interactions between an individual's private computer and the same individual's at device-based cyber assets;
(d) safe and secure cyber interactions between an individual's private computer and the same individual's cyber device manager; or
(e) safe and secure cyber interactions between an individual's private computer and the same individual's individual cyber telephone system.

The universal operating system may be configured to provide programming that provides or enables processes or procedures that require or provide security for at least one member selected from the group consisting of:
(a) cyber interactions between an individual and the individual's device-based cyber assets;
(b) cyber interactions between an individual and the individual's file-based cyber assets; or
(c) cyber interactions between an individual and the individual's cyber resources.

The universal operating system may be configured to provide programming that provides or enables processes or procedures that provide for security-based cyber interactions to occur between cyber devices as an integral part of corresponding non-security-based cyber interactions that are being transferred between the same cyber devices.

The universal operating system may be configured to provide programming that provides or enables processes or procedures that provide a cyber system-wide protocol. The cyber system-wide protocol may be utilized to require another party to only have the ability to request that an individual provide the other party with a requested cyber interaction. The system-wide protocol may be utilized to further require that an individual may either directly, or through automated interaction from the individual's cyber device, have the exclusive ability to send cyber interactions to a requesting party from at least one member selected from the group consisting of: (a) the individual's point of cyber access computer, (b) the individual's private computer, (c) the individual's public computer, (d) the individual's cyber device manager, or (e) the individual's cyber telephone system. A cyber system may be configured to where no other parties may send cyber interactions from at least one member selected from the group consisting of: (i) one specific individual's point of cyber access computer, (ii) one specific individual's private computer, (iii) one specific individual's public computer, (iv) one specific individual's cyber device manager, or (v) one specific individual's cyber telephone system.

The universal operating system may be configured to provide programming that provides or enables processes or procedures that provide for the deletion of cyber interactions from a sender that cannot pass at least one accurate identity test.

The universal operating system may be configured to provide programming that provides or enables processes or procedures that provide for the identification of, or the deletion of, a cyber interaction that contains at least one instance of content selected form the group consisting of: (a) dangerous content, (b) malicious content, (c) inappropriate content, (d) unwanted content, (e) improperly labeled content, or (f) inadequately identified content.

The universal operating system may be configured to provide programming that provides or enables processes or procedures that use (see FIG. 17) the combination of: (a) a virtual equivalent of at least one projector 803, (b) a virtual equivalent of at least one projection display screen 805, and (c) a virtual equivalent of at least one recorder or capture device 807, to provide cyber security by converting cyber content from a cyber interaction that is not in universal operating system-standard format to a safe and secure cyber interactions that is in universal operating system-standard format.

The universal operating system may be configured to provide programming that provides or enables processes or procedures that provide encryption or any other cyber security process or cyber security procedure for use with selected cyber interactions or cyber activities.

The universal operating system may be configured to provide programming that provides or enables processes or procedures that require that encryption or other cyber security processes or cyber security procedures be used for cyber interactions that uses radio frequency signals for cyber communication.

The universal operating system may be configured to provide programming that provides or enables processes and procedures that back up stored information from, or restore backed up information to at least one member selected from the group consisting of:

(a) an individual's point of cyber access computer;
(b) an individual's private computer;
(c) an individual's public computer;
(d) an individual's cyber telephone system;
(e) an individual's cyber device manager; or
(f) an individual's device-based cyber assets.

The universal operating system may be configured to provide programming that provides or enables processes or procedures that provide for safety, security, and privacy for at least one member selected from the group consisting of: (a) cyber financial interactions, (b) cyber financial transactions, (c) cyber payment transactions, or (d) operations or use of cyber-based financial record keeping systems.

The universal operating system may be configured to provide programming that provides or enables processes or procedures that provide safe, secure, and private cyber interactions between a person, through the person's use of a cyber portal, and the person's own point of cyber access computer and at least one member selected from the group consisting of: (a) health care related cyber devices that are being relied upon by the person, or (b) health care related cyber resources that are being relied upon by the person.

The universal operating system may be configured to provide programming that provides or enables processes or procedures that enable a specific individual to use varying levels of security for access to, or the operations of at least one cyber device or cyber system.

The universal operating system may be configured to provide programming that provides or enables processes or procedures that enable an individual to selectively grant, or to selectively deny cyber interactions from a specified other party, access to at least one member selected from the group consisting of: (a) the individual's point of cyber access computer, (b) the individual's cyber telephone system, (c) the individual's cyber device manager, or (d) the individual's public computer.

The universal operating system may be configured to provide programming that provides or enables processes or procedures that enable an individual to make at least one copy of at least one of the individual's file-based cyber asset available for use by a specified party as a cyber resource of the specified other party. The cyber resource may be made available to the specified other party through the interactions of the specified other party with the individual's point of cyber access computer or the individual's public computer.

The universal operating system may be configured to provide programming that provides or enables processes or procedures that enable an individual to selectively grant, or to selectively deny cyber interactions from a specified party to gain access to the cyber resources that have been made available for the specified other party through the interactions of the specified other party with the individual's public computer or with the individual's point of cyber access computer.

The universal operating system may be configured to provide programming that provides or enables processes or procedures that enables an individual to safely and securely provide a specified other party with at least one member selected from the group consisting of: (a) specified administrative control, (b) specified access control, or (c) specified operational access to at least one part of at least one member selected from the group consisting of: (i) the individual's point of cyber access computer, (ii) the individual's private computer, (iii) the individual's public computer, (iv) the individual's device-based cyber assets, (v) the individual's file-based cyber assets, (vi) the individual's cyber vault, (vii) the individual's cyber device manager, or (viii) the individual's cyber telephone system.

The universal operating system may be configured to provide programming that provides or enables processes or procedures that enable an individual to provide a specified other party with at least one member selected from the group consisting of: (a) selected specified cyber resources, (b) selected specified cyber content, or (c) selected specified cyber services.

The universal operating system may be configured to provide programming that provides or enables processes or procedures that provide for converting cyber interaction output from a cyber device that requires the use of an operating system that is not the universal operating system into cyber interaction output that interacts seamlessly with cyber devices that utilize the universal operating system.

The universal operating system may be configured to provide programming that provides or enables processes or procedures that provide for converting cyber interaction output from cyber devices that uses the universal operating system into one cyber interaction output that interact seamlessly with cyber devices that use operating systems that are not the universal operating system.

The universal operating system may be configured to provide programming that provides or enables processes or procedures that provide for converting cyber content that is not in a format that may directly be used by the universal operating system into cyber content that is in the universal operating system-standard format.

The universal operating system may be configured to provide programming that provides or enables processes or procedures that provide for converting cyber content that is in universal operating system-standard format into cyber content that is in a format that may be used by cyber devices that are using operating systems that are not the universal operating system. The combination of this process and procedure and the previous three processes and procedures immediately above are one reason why the disclosed operating system may be described as being a "universal" operating system.

The universal operating system may be configured to provide programming that provides or enables processes or procedures that enable interoperable use of any cyber asset or any cyber resource. Cyber interoperability enables an individual to utilize the universal operating system to access or interact with any available cyber devices or any available cyber content.

The universal operating system may be configured to provide programming that provides or enables processes or procedures that use (see FIG. 17): (a) a virtual equivalent of at least one projector 803, (b) a virtual equivalent of at least one projection display screen 805, and (c) a virtual equivalent of at least one recorder or capture device 807, to convert inbound image-based cyber content that may not be useable as system-standard content by the universal operating system into image-based cyber content that may seamlessly be used as universal operating system-standard content.

The universal operating system may be configured to provide programming that provides or enables processes or procedures that enable safe and secure cyber interactions with content or device interoperability conversion processes.

The universal operating system may be configured to provide programming that provides or enables processes or procedures that enable safe and secure cyber interaction with output from content or device interoperability conversion process.

The universal operating system may be configured to provide programming that provides or enables processes or procedures that convert at least one member selected from the group consisting of: (a) administrative cyber interactions, or (b) systems configuration cyber interactions between cyber devices, to or from universal operating system-standard format.

The universal operating system may be configured to provide programming that provides or enables processes or procedures that identify inbound or outbound cyber interactions that require content or device interoperability conversion.

The universal operating system may be configured to provide programming that provides or enables processes or procedures that enable an individual or a cyber device to use an operating system that is not the universal operating system. The individual or the cyber device may require the use of the operating system that is not the universal operating system for the purpose of converting cyber content or cyber interactions that may be used by the operating system that is not the universal operating system into cyber content or cyber interactions that may be seamlessly used by the universal operating system. Further, the individual or the cyber device may require the use of an operating system that is not the universal operating system for the purpose of using computer programs or computer applications that require the use of operating systems that are not the universal operating system.

The universal operating system may be configured to provide programming that provides or enables processes or procedures that exclude other parties from gaining at least one member selected from the group consisting of: (a) operational control, (b) administrative control, or (c) access control, of at least one member selected from the group consisting of: (i) an individual's point of cyber access computer, (ii) an individual's private computer, (iii) an individual's public computer, (iv) an individual's cyber device manager, or (v) an individual's device-based cyber assets.

The universal operating system may be configured to provide programming that provides or enables processes or procedures that enables an individual's to exclude other parties from gaining administrative control or access control of the individual's public computer or cyber telephone system.

The universal operating system may be configured to provide programming that provides or enables processes or procedures that enable the use of outbound cyber interactions that have been pre-processed by a sender. The pre-processed cyber interactions of the sender are ready to be used with no further processing of content required by a thin cyber portal.

The universal operating system may be configured to provide programming that provides or enables processes and procedures that enable a sender to pre-process an outbound cyber interaction so that the outbound cyber interaction is ready to be used with no further processing of content required.

The universal operating system may be configured to provide programming that provides or enables processes or procedures that enable the pre-processing of cyber interactions that are sent from a person's or an entity's point of cyber access computer to a cyber portal that is being used by a person. In particular, these processes and procedures may require that such cyber interactions are pre-processed cyber interactions that require no further processing of content prior to use by a thin cyber portal.

The universal operating system may be configured to provide programming that provides or enables processes or procedures that utilize at least one cyber system address designation or at least one cyber system identity designation for a specific person, entity or cyber device prior to or immediately prior to a cyber interaction of the specific person, entity or cyber device making at least one step or every step throughout a cyber system.

The universal operating system may be configured to provide programming that provides or enables processes or procedures that enable an individual to request or to require that another party only provide the individual with cyber interactions or cyber content that comply with the individual's preferences or requirements for cyber interactions or for cyber content.

The universal operating system may be configured to provide programming that provides or enables processes or procedures that enable an individual to request or to require that another party provides the individual with varying levels of privacy, as defined by the individual, for the other party's cyber interactions with the individual.

The universal operating system may be configured to provide programming that provides or enables processes or procedures that enable an individual to perform at least one member selected from the group consisting of: (a) add component or cyber devices to a cyber system, (b) remove components or cyber devices from a cyber system, (c) alter components or cyber devices that are part of a cyber system, or (d) change the configuration of components or cyber devices that are part of a cyber system.

The universal operating system may be configured to provide programming that provides or enables the processes or procedures that enable an individual to perform at least one action selected from the group consisting of:

(a) add processes or procedures to a cyber system;
(b) remove processes or procedures from a cyber system;

(c) alter processes or procedures that are part of a cyber system; or
(d) change the configuration of processes or procedures that are part of a cyber system.

The universal operating system may be configured to provide programming that provides or enables processes or procedures that enable an individual to perform at least one action selected from the group consisting of:
  (a) add to cyber devices, at least one member selected from the group consisting of: (i) cyber processes, (ii) cyber procedures, or (iii) cyber components;
  (b) remove from cyber devices, at least one member selected from the group consisting of: (i) cyber processes, (ii) cyber procedures, or (iii) cyber components;
  (c) alter at least one member selected from the group consisting of: (i) cyber processes, (ii) cyber procedures, or (iii) cyber components that are a part of cyber devices; or
  (d) change the configuration of at least one member selected from the group consisting of: (i) cyber processes, (ii) cyber procedures, or (iii) cyber components that are a part of cyber devices.

The universal operating system may be configured to provide programming that provides or enables processes or procedures that enable an individual's cyber system architecture, cyber devices, cyber components, cyber processes, and cyber procedures to be configured in at least one configuration. Providing an individual with the ability to configure, in at least one way, the individual's cyber system architecture, cyber devices, cyber components, cyber processes, and cyber procedures provides for the varying needs and desires of different and unique people or entities. Further, entities such as businesses, or schools, or governments, or any other type of entity that uses a cyber system entity identity designation, may have many vastly different and specific needs for cyber devices, cyber components, cyber processes, cyber procedures, and configurations for cyber systems.

The universal operating system may be scaled to where a universal operating system may be configured, in regard to included universal operating system resources, to fall at one point in a range of from a minimum to a maximum, wherein at the minimum the universal operating system is scaled to include only the resources that are needed to provide for the smallest and least complex, in regard to included necessary universal operating system resources, of all needs for universal operating system resources, and wherein at the maximum the universal operating system is scaled to include all of the universal operating system resource that are needed to provide for every operating system need from the spectrum of needs for universal operating system resources.

The universal operating system may be configured to provide programming that provides or enables processes or procedures that provide cyber interoperability processes or cyber interoperability procedures that enable an individual or cyber device to seamlessly use at least one member selected from the group consisting of: (a) non-universal operating system-standard cyber activities, (b) non-universal operating system-standard cyber processes, or (c) non-universal operating system-standard cyber devices.

The universal operating system may be configured to provide programming that provides or enables processes or procedures that provide for the interrelationship between any combination of members selected from the group consisting of: (a) a cyber component, (b) a cyber device, (c) a cyber process, or (d) a cyber procedure, of a cyber system.

The universal operating system may be configured to provide programming that provides or enables processes or procedures that provide for cyber interactions between any combination of members selected from the group consisting of: (a) a cyber component, (b) a cyber device, (c) a cyber process, or (d) a cyber procedure, of a cyber system.

The universal operating system may be configured to provide programming that provides or enables processes or procedures that enable one specific person to operationally access the one specific person's point of cyber access computer. Such access may be enabled by the use of a cyber portal that provides sensor observation-derived identity information regarding the one specific person to the one specific person's point of cyber access computer. The sensor observation-derived identity information may be utilized to enable the one specific person's point of cyber access computer to: (a) accurately test the one specific person's identity prior to granting the one specific person access to his or her point of cyber access computer, or (b) constantly and accurately test the one specific person's identity during the entire period of time the one specific person accesses his or her point of cyber access computer.

The universal operating system may be configured to provide programming that provides or enables processes or procedures that provide seamless cyber interactions when at least two cyber portals are simultaneously used for a cyber activity.

The universal operating system may be configured to provide programming that provides or enables processes or procedures that provide for cyber interactions utilizing an input device of at least one type, or an output device of at least one type.

The universal operating system may be configured to provide programming that provides or enables processes or procedures that provide a graphic user interface (GUI). The GUI may utilize frames and scrolls formatted image-based cyber content in conjunction with the processes that use: (a) a virtual equivalent of at least one projector, (b) a virtual equivalent of at least one projection display screen, and (c) a virtual equivalent of at least one recorder or capture device, for at least one member selected from the group consisting of: (i) conversion of, (ii) alteration of, or (iii) convergence of multiple sources of, image-based cyber content.

The universal operating system may be configured to provide programming that provides or enables processes or procedures that make up all or part of a device operating system for a point of cyber access computer.

The universal operating system may be configured to provide programming that provides or enables processes or procedures that enable a point of cyber access computer to work in conjunction with a separate private computer or to work in conjunction with a separate public computer. The separate private computer and the separate public computer may at least one member selected from the group consisting of: (a) one or the other be an integral part of a point of cyber access computer, (b) both be an integral part of a point of cyber access computer, (c) be combined as a separate device, or (d) each be separate devices.

The universal operating system may be configured to provide programming that provides or enables processes or procedures that route or transfer cyber interactions or cyber activities (a) within a point of cyber access computer, (b) between a point of cyber access computer and a private computer, (c) between a point of cyber access computer and a public computer, or (d) between a public computer and a private computer.

The universal operating system may be configured to provide programming that provides or enables processes or procedures that enables a person to locally or remotely use a cyber portal for interacting with the person's point of cyber access computer.

The universal operating system may be configured to provide programming that provides or enables processes or procedures that enable an individual's point of cyber access computer to independently have cyber interactions with another party based upon at least one member selected from the group consisting of: (a) predetermined operational settings, (b) predetermined administrative settings, or (c) predetermined access control settings.

The universal operating system may be configured to provide programming that provides or enables processes or procedures that make up at least one part of a device operating system for a private computer.

The universal operating system may be configured to provide programming that provides or enables processes or procedures that provide an individual with a private computer that may be configured to only be accessed by one specific individual or the one specific individual's selected device-based cyber assets.

The universal operating system may be configured to provide programming that provides or enables processes or procedures that exclude all other parties from having cyber interactions with an individual's private computer. Since all other parties are excluded from having cyber interactions with the individual's private computer, the individual's private computer may provide the individual with a cyber environment that may be absolutely safe, secure, private, and free from intrusion by other parties as described above. An individual's private computer may be configured to be the individual's cyber vault.

The universal operating system may be configured to provide programming that provides or enables processes or procedures that provide safe and secure cyber interactions between an individual's private computer and all cyber activities or all cyber interactions from within the individual's point of cyber access computer.

The universal operating system may be configured to provide programming that provides or enables processes or procedures that enable an individual to use the individual's private computer to run or use computer programs or computer applications.

The universal operating system may be configured to provide programming that provides or enables processes and procedures that enable an individual to perform at least one action selected from the group consisting of: (a) storing, (b) accessing, (c) using, (d) sharing, or (e) managing, at least one part of the individual's file-based cyber assets from within the individual's private computer.

The universal operating system may be configured to provide programming that provides or enables processes or procedures that make up at least one part of a device operating system for a public computer.

The universal operating system may be configured to provide programming that provides or enables the processes or procedures that enable individual's public computer to participate in cyber interactions with specified other parties. Such participation may be based upon at least one member selected from the group consisting of: (a) predetermined operational settings, (b) predetermined administrative settings, or (c) predetermined access control settings.

The universal operating system may be configured to provide programming that provides or enables processes or procedures that enable an individual to perform at least one action selected from the group consisting of: (a) using, (b) receiving, or (c) storing, cyber interactions or cyber content from another party through use of the storage capabilities or other resources of the individual's public computer.

The universal operating system may be configured to provide programming that provides or enables processes or procedures that enable an individual to selectively grant, or to selectively deny a specific other party access to the individual's public computer.

The universal operating system may be configured to provide programming that provides or enables processes or procedures that enable an individual to selectively grant, or to selectively deny one specific other party access to all or part of the individual's cyber resources through the one specific other party's cyber interactions with the individual's public computer.

The universal operating system may be configured to provide programming that provides or enables processes or procedures that provide for at least one aspect of the operations of, or interaction with, a cyber telephone system.

The universal operating system may be configured to provide programming that provides or enables processes or procedures that enable an individual's cyber telephone system to independently interact with other parties based upon at least one member selected from the group consisting of: (a) predetermined operational settings, (b) predetermined administrative settings, or (c) predetermined access control settings.

The universal operating system may be configured to provide programming that provides or enables processes or procedures that are utilized for at least one part of the operations of a cyber device manager.

The universal operating system may be configured to provide programming that provides or enables processes or procedures that exclude an individual's device-based cyber assets from having cyber interactions with other parties.

The universal operating system may be configured to provide programming that provides or enables processes or procedures that exclude other parties from having cyber interactions with one specific individual's device-based cyber assets.

The universal operating system may be configured to provide programming that provides or enables processes or procedures that provide an interoperable cyber system wherein an interconnected cyber device of any type may be seamlessly used as a component of the cyber system.

The universal operating system may be configured to provide programming that provides or enables processes or procedures that are utilized to provide at least one system-standard interconnection interface for use by cyber devices.

The universal operating system may be configured to provide programming that provides or enables processes or procedures that provide for utilization of at least one member selected from the group consisting of:
   (a) one or more lines of cyber communications;
   (b) one or more types of lines of cyber communications; or
   (c) one or more providers of lines of cyber communications.

The universal operating system may be configured to provide programming that provides or enables processes or procedures require or provide for all devices within a cyber communications network to exclude all people, entities or non-communications network devices from interacting with cyber interactions while the interactions are being transferred through the cyber communications network.

The universal operating system may be configured to provide programming that provides or enables processes or procedures that enable each stream of cyber interactions to use a separate line of cyber communications whereby no two streams of cyber interactions may use the same line of cyber communications at the same time.

The universal operating system may be configured to provide programming that provides or enables processes or procedures that are utilized to enable a sender's cyber interactions to move one way only through a cyber communications line and for the recipient's cyber interactions to move one way only and to be sent through a separate cyber communications line.

The universal operating system may be configured to provide programming that provides or enables processes or procedures that enable safe and secure cyber interactions from a cyber device that is sent to and through a cyber portal that is being used by a person and to the person's point of cyber access computer. Further, the universal operating system may be configured to provide programming that provides or enables processes or procedures that enable safe and secure cyber interactions from a person's point of cyber access computers, to and through a cyber portal that is being used by the person to a cyber device.

The universal operating system may be configured to provide programming that provides or enables the processes or procedures for routing or transferring cyber interactions through a cyber communications network.

The universal operating system may be configured to provide programming that provides or enables processes or procedures that make up at least one part of at least one operation of a transfer packet system.

The universal operating system may be configured to provide programming that provides or enables processes or procedures that require or provide for the use of transfer packet labels. The transfer packet labels may be used to provide for at least one member selected from the group consisting of (a) security, (b) determining identity, (c) routing, (d) communicating a sender's requirements or requests, or (e) any other required or desired utility that may be provided by information from a transfer packet label.

The universal operating system may be configured to provide programming that provides or enables processes or procedures that compare a transfer packet's label to the contents of the transfer packet.

The universal operating system may be configured to provide programming that provides or enables processes or procedures that provide for safe and secure deletion of transfer packets that have packet contents that do not match the transfer packet's label.

The universal operating system may be configured to provide programming that provides or enables processes or procedures that enable safe and secure use of mobile or in-motion cyber devices such as, for example, a vehicle or a mobile cyber portal.

The universal operating system may be configured to provide programming that provides or enables processes or procedures that provide or make use of cyber system address designations for mobile or in-motion cyber devices.

The universal operating system may be configured to provide programming that provides or enables processes or procedures that enable the use of cyber communications networks by mobile or in-motion cyber devices.

The universal operating system may be configured to provide programming that provides or enables processes or procedures that enable the use of global position locating devices either as independent cyber devices or in conjunction with other cyber devices.

The universal operating system may be configured to provide programming that provides or enables processes or procedures that provide menus or other user-perceptible outputs that provide a person with knowledge of, and access to, choices of cyber interactions with at least one member selected from the group consisting of: (a) cyber assets, or (b) cyber resources.

The universal operating system may be configured to provide programming that provides or enables processes or procedures that make up a voice recognition-operated user interface.

The universal operating system may be configured to provide programming that provides or enables processes and procedures that enable an individual to perform at least one operation on a file-based cyber asset or a file-based cyber resource, wherein the operation may be at least one member selected from the group consisting of: (a) storing, (b) accessing, (c) modifying, (d) using, (e) sharing, or (f) managing, such file-based assets or file-based resources.

The universal operating system may be configured to provide programming that provides or enables processes or procedures that enable an individual to perform at least one operation on all or part of the individual's file-based cyber assets, wherein the at least one operation may be at least one member selected from the group consisting of: (a) storing, (b) accessing, (c) modifying, (d) sharing, (e) using, or (f) managing, the file-based cyber assets.

The universal operating system may be configured to provide programming that provides or enables processes or procedures that provide an individual with an absolutely safe and secure location for performing at least operation on at least one part of the at least one individual's file-based cyber assets, wherein the at least one operation may be at least one member selected from the group consisting of: (a) storing, (b) accessing, (c) modifying, (d) sharing, (e) using, or (f) managing, the file-based cyber assets.

The universal operating system may be configured to provide programming that provides or enables processes or procedures that provide historical records of an individual's cyber activities or historical records of a cyber device's cyber activities.

The universal operating system may be configured to provide programming that provides or enables processes or procedures that utilize a combination of: (a) at least one virtual equivalent of at least one projector, (b) at least one virtual equivalent of at least one projection display screen, and (c) at least one virtual equivalent of at least one recorder or capture device, to converge at least one plurality of sources of image-based cyber content into at least one converged source of image-based cyber content.

The universal operating system may be configured to provide programming that provides or enables processes or procedures that utilize a combination of: (a) at least one virtual equivalent of at least one projector, (b) at least one virtual equivalent of at least one projection display screen, and (c) at least one virtual equivalent of at least one recorder or capture device, to alter aspects of image-based cyber content.

The universal operating system may be configured to provide programming that provides or enables the universal operating system's set of standard cyber processes and standard cyber procedures for at least one member selected from the group consisting of: (a) use, (b) management, or (c) alteration, of image-based cyber content.

The universal operating system may be configured to provide programming that provides or enables processes or procedures that provide for creation of or use of frames and scrolls formatted image-based cyber content.

The universal operating system may be configured to provide programming that provides or enables processes or procedures that provide for frames and scrolls formatted interactive image-based cyber content wherein, such content may use the total pixel width by total pixel height size of a target image display output device to determine the total pixel width by total pixel height size of images that are to be transferred to the image display device.

The universal operating system may be configured to provide programming that provides or enables processes or procedures that provide for or enable the use of image-based cyber content that has both total pixel width and total pixel height that are smaller than or equal to the pixel width and the pixel height of a target image display device. Such content is considered to be cyber content in frame format as shown in FIGS. 18B and 18C.

The universal operating system may be configured to provide programming that provides or enables processes or procedures that provide for or enable the use of image-based cyber content that has a total pixel width that is greater than the pixel width of a target image display device or a total pixel height that is greater than the pixel height of the target image display device. Such content is considered to be a scroll formatted cyber content as shown in FIGS. 18E and 18G.

The frames and scrolls format for image-based cyber content provides a person with ability to scroll through a scroll formatted cyber image so that an entire scroll formatted cyber image may be displayed, although not simultaneously.

Figure 16D:
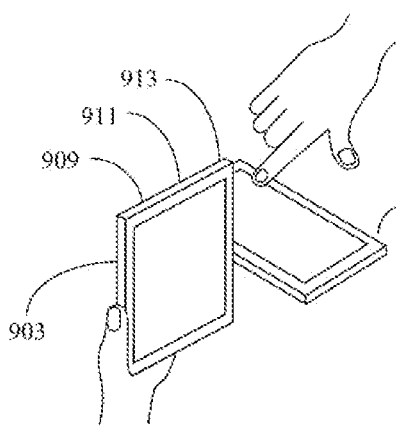
Figure 16E:
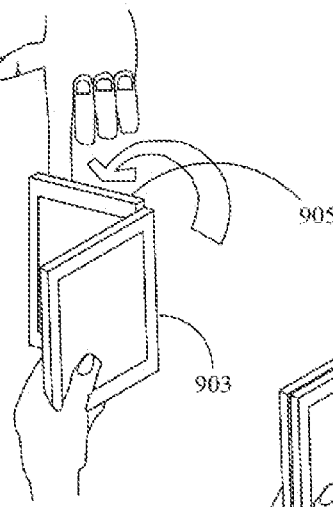
Figure 16F:
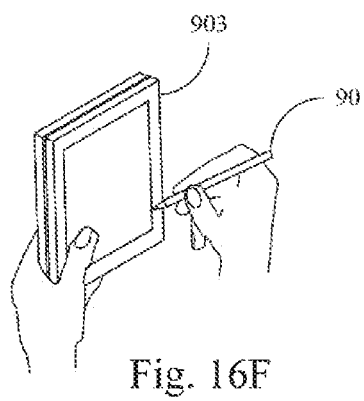

Further, the frames and scrolls format for image-based cyber content uses a pixel width by pixel height grid to identify the point on a frame-formatted or a scroll-formatted cyber image where an input interaction was made by a person as shown in FIGS. 16C and 16F.

The universal operating system may be configured to provide programming that provides or enables processes or procedures that provide for at least one aspect of the operations or use of at least one part of a cyber rights licensing system.

Utilizing a cyber rights licensing system that is enabled by the universal operating system, a licensee may be required to provide a licensor with at least one member selected from the group consisting of:
(a) the licensee's cyber system identity designation;
(b) the licensee's cyber system address designation;
(c) the designation of the licensed cyber resources that the licensee is requesting; and
(d) the rights that the licensee has to the requested cyber resources.

The universal operating system may be configured to provide programming that provides or enables processes or procedures that provide for at least one aspect of the operations or the use of a cyber mail system.

The universal operating system may be configured to provide programming that provides or enables processes or procedures that provide for at least one aspect of the operations or the use of a cyber message or cyber alert, system.

The universal operating system may be configured to provide programming that provides or enables processes or procedures that provide for at least one aspect of the operations or the use of a cyber site system.

The universal operating system may be configured to provide programming that provides or enables processes or procedures that provide a sender with the option to receive a cyber acknowledgement of a recipient's receipt of a cyber interaction.

The universal operating system may be configured to provide programming that provides or enables processes or procedures that provide a system generated status message when an activity does not execute properly.

The universal operating system may be configured to provide programming that provides or enables processes or procedures that enable an individual to send to themselves, or to send to another party a system-generated cyber message or system-generated cyber alert.

The universal operating system may be configured to provide programming that provides or enables processes or procedures that enable safe, secure, and private interaction between at least one member selected from the group consisting of: (a) a person, (b) an entity, (c) a person's private computer, (d) an entity's private computer, (e) a person's point of cyber access computer, (f) an entity's point of cyber access computer, or (g) at least one member selected from the group consisting of (i) health care related cyber devices, (ii) health care related cyber assets, or (iii) health care related cyber resources.

The universal operating system may be configured to provide programming that provides or enables processes or procedures that provide job management for the operations of the universal operating system or task management for the operations of the universal operating system.

The universal operating system may be configured to provide programming that provides or enables processes or procedures that are utilized to provide management for or of cyber devices.

The universal operating system may be configured to provide programming that provides or enables processes or procedures that accurately and reliably test the identity of any one specific and unique person through use of sensor observed changes to the specific person that occur with movement of the person or that occur over time.

(8) Cyber Communications Network

The purpose of a cyber communications network 300 (see FIGS. 2-15) is to safely, securely, and efficiently transfer properly formatted and properly identified transfer packets from a sender to a recipient.

Transfer packets may be the only cyber system vehicles that are used to transfer cyber interactions from a sender to a recipient.

A point-of-cyber access cyber system may use many different and unique transfer packet formats. The different and unique transfer packet formats may be used for different types of cyber activities or for cyber activities that are for different purposes.

A point of cyber access computer may use differences in transfer packet formats to aid in providing security for inbound cyber activities. A point of cyber access computer may also use differences in transfer packet formats to aid in the proper routing of cyber activities or cyber interactions.

The packet portion of a transfer packet may contain all or part of, a sender's cyber interaction.

A sender's cyber interaction requires at least one transfer packet. A cyber interaction that requires more than one transfer packet uses transfer packets that may be identified as being a specific part of a group of transfer packets.

Each transfer packet, at a minimum, has a label that may provide at least one member selected from the group consisting of:
- (a) the cyber system address designation of the recipient's point of cyber access computer;
- (b) the recipient's cyber system identity designation;
- (c) the sender's cyber system identity designation;
- (d) verification that the sender has passed at least one accurate identity test;
- (e) the cyber system identity designation of the sender's point of cyber access computer;
- (f) verification that the sender's point of cyber access computer has passed at least one accurate identity test;
- (g) information about the contents of the transfer packet including information regarding if the transfer packet is one in a series of transfer packets, that together, in proper sequence, make up one single cyber interaction from a sender;
- (h) information about the contents of a transfer packet that may aid the recipient in determining if the sender's cyber interaction conforms with the recipient's requirements or preferences for privacy, or the recipient's requirements or preferences for cyber interaction content;
- (i) the cyber interaction; or
- (j) a historical record of cyber interactions that the transfer packet had with cyber system cyber devices.

A transfer packet label may include any information about the sender or any information about the contents of the transfer packet that were required or desired by the sender or the recipient of the cyber transfer packet.

Recipients of transfer packets may require that transfer packets include specific label information that may include any information about the sender or about the contents of the transfer packet that may aid the recipient in determining if the sender's cyber interaction will be allowed to gain further access to the recipient's point of cyber access computer.

An example of a recipient's requirements for additional transfer packet label information about the sender or about the contents of a transfer packet would occur if a recipient required all business senders to identify the sender as being a business. The recipient may further require cyber interactions from a business to identify if the business was making an unsolicited marketing cyber interaction. In such a case the recipient has the ability to exclude all unsolicited business marketing cyber interactions from gaining further access to the recipient's point of cyber access computer.

A cyber communications network (see FIG. 15), may require that an individual pass at least one accurate identity test prior to or immediately prior to at least one step or each step that the individual's cyber interaction takes throughout the cyber communications network. Further, the cyber communications network may require that a cyber device pass at last one accurate identity test prior to or immediately prior to at least one step or each step that the cyber device's cyber interactions take throughout the cyber communications network. Cyber interactions from an improperly or inadequately identified person, entity or cyber device may not be transferred through the communications network.

The cyber devices that make up a cyber communications network may not have the ability to alter existing information from transfer packet labels or alter transfer packet contents.

A recipient may have the ability to keep a historical record of transfer packet label information from cyber interactions. The recipient may also have the ability to keep a historical record of transfer packet label information from inbound cyber interactions that were denied access to the recipient's point of cyber access computer.

Communications between the devices within a cyber communications network may use at least one member selected from the group consisting of: (a) wires, (b) optical fibers, (c) radio frequencies, (d) any other communication means, or (e) a combination thereof. When radio frequencies are used for cyber communications, the cyber system may use encryption or other cyber security processes that may make the contents of transfer packets useless to all but the sender and the designated recipient.

A device in a cyber communications network, a cyber portal, a point of cyber access computer, and a remote device-based cyber asset may each provide separate security-based cyber interactions as an integral part of a corresponding cyber interaction that is being transferred between any of the same cyber devices. This process may be used to prevent intruders from interacting with transfer packets or the operations of the cyber communications network.

A device that is a component of a cyber communications network may keep a historical record of its own cyber activities or cyber interactions.

The device within a cyber communications network that comes in first contact with cyber interactions from an individual's point of cyber access computer may require the individual or their point of cyber access computer pass at least one accurate identity test prior to further transfer of the individual's cyber interaction. The device within the cyber communications network that comes in first contact with the individual's point of cyber access computer may use a safe, secure and accurate process or method to accurately test the identity of the individual or their point of cyber access computer.

After the individual's point of cyber access computer passes at least one accurate identity test, the device within the cyber communications network that comes in first contact with cyber interactions from the individual's point of cyber access computer may then provide verification of the identity of the individual or the individual's point of cyber access computer prior to or immediately prior to at least one step or each step that the individual's cyber interactions take throughout the point-of-cyber access cyber system.

(9) Cyber Portal

The purpose of a cyber portal 100 (referring again to FIG. 1) is to perform at least one action selected from the list consisting of:
- (a) sending input from a person using a cyber portal, through a cyber communications network, to the person's point of cyber access computer;
- (b) receiving output for a person that was sent from the person's point of cyber access computer, through a cyber communications network, to a cyber portal that is being used by the person;
- (c) providing information derived from sensor observations of a person that may enable a point of cyber access computer to accurately test the identity of the person who is using the cyber portal; and
- (d) provide output from a cyber portal that provides a person with the ability to: (i) perceive cyber interactions, or (ii) interact with cyber interactions that were sent by the person's point of cyber access computer.

As shown in FIG. 1, a cyber portal 100 uses a cyber communications network 300 to transfer at least one transfer packet between the cyber portal that is being used by a person and the person's point of cyber access computer.

The cyber portal 100 uses an operating system that provides functional and operational programming for the cyber portal.

One type of cyber portal is a thin cyber portal 100. A thin cyber portal has limited processing capabilities. A thin cyber portal relies on another device to have previously processed the content of the cyber interaction so that the cyber interaction may be used by the thin cyber portal with no further processing of the content.

As a part of its operations, one type of cyber portal 100 has the ability to store its operating system or store cyber interactions or cyber resources that are desired or required to be stored.

A cyber portal 100 may also be a cyber telephone device. When a cyber portal is also a cyber telephone device, a person's point of cyber access computer 200 may be configured to initiate cyber telephone communication interactions with the person through use of the person's cyber portal telephone device. When a person is using a cyber portal that is not a cyber telephone device, the person would need to initiate the cyber telephone communication process.

Cyber interaction from a person to the person's point of cyber access computer may originate from a cyber portal 100. The cyber portal 100 may provide the person's point of cyber access computer with sensor observation derived identity information that enables the person's point of cyber access computer to accurately test the person's identity.

Sending a cyber interaction from a person who is using a cyber portal to the person's point of cyber access computer may require that the cyber portal use properly formatted transfer packets. The properly formatted transfer packets are preferably addressed to the person as the recipient. The address may contain the person's identity designation, as well as the address designation and the identity designation of the person's point of cyber access computer that will receive the interaction.

Sending a cyber interaction from a person's point of cyber access computer to a cyber portal that is being used by the person may require that the person's point of cyber access computer send properly formatted transfer packets to the cyber portal. The to-the-cyber portal formatted transfer packets may be addressed to the identity designation and address designation of the cyber portal that is being used by the person.

Upon first contact with the person's point of cyber access computer, the person's cyber interaction's request for access may be routed to the processes or procedures for granting the person's cyber interactions access to the person's point of cyber access computer.

Following a person's request for the person's cyber interaction to gain further access to the person's own point of cyber access computer, process or procedures may be executed for requiring the person pass at least one accurate identity test prior to the cyber interactions of the person being granted further access to the person's own point of cyber access computer.

A person's point of cyber access computer, working in conjunction with the cyber portal that is being used by the person, may accurately test the person's identity through use of at least one member selected from the group consisting of: (a) a combination of sensor observed changes to the person that occur with movement of the person or that occur over time, (b) other suitable methods of accurate identity testing known to those skilled in the art, or (c) a combination thereof, to remotely and accurately test the person's identity.

Once cyber interactions from the person gain access to the person's properly configured point of cyber access computer, the cyber interactions from the person may be routed to the person's private computer. It is from within the constructs of a private computer where a person or an entity may have safe and secure operational and administrative access to at least one member selected from the group consisting of: (a) the person's private computer, (b) the person's point of cyber access computer, (c) the person's public computer, (d) the person's cyber assets, (e) the person's cyber resources, (f) the person's cyber device manager, or (g) the person's cyber telephone system.

An individual's private computer may be configured to where only cyber interactions from the individual may gain access to the individual's private computer 230 (see FIGS. 2-12). An individual's private computer may also be configured to where all cyber interactions from all other parties may be excluded from gaining access to the individual's private computer.

Once an individual's has gained access to the individual's private computer 230, the individual may be provided with options for further cyber interactions.

Referring again to FIG. 3, a person using a cyber portal 100 sends a cyber interaction through a cyber communications network to the person's private computer 230. In turn, the person's private computer 230 processes the person's cyber interaction. The cyber interaction to be processed by the person's private computer 230 may include at least one cyber activity that is available for use by the person through at least one member selected from the group consisting of: (a) the person's point of cyber access computer 200, (b) the person's public computer 260, (c) the person's cyber assets, (d) the person's cyber resources, (e) the person's cyber device manager, or (f) the person's cyber telephone system.

Cyber interactions with cyber activities, cyber interactions with cyber devices, and cyber interactions with cyber content that are available for use by a person through the person's private computer 230 may include at least one member selected from the group consisting of: (a) the person's computer programs or applications, (b) the person's cyber telephone system, (c) the person's cyber device manager, (d) the person's home automation system, (e) the person's vehicle, (f) the person's owned copies of cyber television content, (g) the person's cyber video entertainment and cyber music resources, (h) the person's cyber assets which may include cyber activity history, personal financial information, personal health information, photographs, or other cyber activities, cyber devices, or cyber content, or (i) access to cyber resources of other parties that are available for the person's use including books, magazines, newspapers, libraries, cyber educational systems, cyber services, cyber health systems, and any other cyber resource.

As a result of a person's cyber interactions, at least one member selected from the group consisting of: (a) the person's private computer 230, (b) the person's point of cyber access computer 200, or (c) the person's public computer 260, may be configured to respond to the person by sending cyber interactions through the cyber communications network to the cyber portal 100 that is being used by the person.

An example would be that the person, at a cyber portal 100, interacts with an image on a display screen of the cyber portal 100. Several images appearing on the display screen provide the person with choices for cyber interactions that are labeled for identification purposes. The person interacts with one of the images appearing on the image display screen of the cyber portal 100, thereby communicating the interaction to the person's remote point of cyber access computer. The person's point of cyber access computer, in turn, processes the person's cyber interaction, and responds by providing the cyber portal 100 that the person is using with a new image to display. The new image is the result of the person's point of cyber access computer's processing the person's immediately prior cyber interaction.

Another example would be that instead of a physical interaction with a display screen of a cyber portal, a person speaks certain words such as the instruction to "open a garage door" to the cyber portal 100. The cyber portal 100 communicates the person's spoken cyber interaction to the person's point of cyber access computer. In turn, the person's point of cyber access computer operates the person's garage door opener. The person's point of cyber access computer may or may not notify the person at the cyber portal of the status of the opening of the garage door, depending on the previously established preferences of the person.

A person's point of cyber access computer may be configured to remotely alter the functional or operational settings of a cyber portal 100 that is being used by a person.

One possible result of a person's cyber interactions with the person's point of cyber access computer may be that the person's point of cyber access computer responds in part, or in whole, to the person's cyber interactions by providing cyber interactions that alter the functional or operational settings of the cyber portal 100 that is being used by the person.

Alterations to the functional or operational settings of a cyber portal 100 may be requested by at least one member selected from the group consisting of: (a) the cyber portal 100, (b) the person (through the person's interactions with the cyber portal 100), (c) the person's point of cyber access computer, (d) at least one cyber device, (e) at least one executed cyber file, or (f) a combination thereof.

A cyber portal 100 may be configured to return to predetermined functional or operational settings upon request or upon completion of a cyber interaction that requested or required the altered functional or operational settings for the cyber portal.

A person's point of cyber access computer and a cyber portal 100 may be configured to each establish an interconnection with a cyber communications network. This cyber communications network interconnection may be an interconnection ranging from a momentary single line cyber communications network interconnection, to continuous multiple line cyber communications network interconnections.

Cyber interaction may be configured to include cyber interactions between at least one member selected from the group consisting of:
  (a) an individual's cyber assets and the individual's cyber device manager;
  (b) a person using a cyber portal 100 and the person's point of cyber access computer 200;
  (c) a cyber resources and an individual's public computer 260;
  (d) a person's private computer 230 and the person at a cyber portal 100;
  (e) an individual's point of cyber access computer 200 and a cyber device;
  (f) an individual's private computer 230 and a cyber asset; or
  (g) an individual's public computer 260 and a cyber resource.

A cyber portal 100 may be configured to be used as a cyber communications network link between a device-based cyber asset or a device-based cyber resource and a person's point of cyber access computer.

A cyber portal 100 may be configured to use at least one cyber communications line. The at least one cyber communication line may be between a cyber portal 100 and a person's point of cyber access computer, or between a cyber portal 100 and a device-based cyber assets or a device-based cyber resource.

The operations of a thin cyber portal 100 may be limited to processing only functional and operational programming. Therefore, the thin cyber portal 100 may be configured to only run the programming that is required for the operations or use of the thin cyber portal itself. When working in conjunction with a thin cyber portal, a person's point of cyber access computer must provide required processing, management, and support for the cyber interactions that are sent to the thin cyber portal 100.

Cyber interactions from a person's point of cyber access computer to a thin cyber portal 100 that a person is using should be pre-processed and made ready for use by the thin cyber portal prior to being sent through a cyber communications network.

The cyber portal 100 may be configured to, upon first cyber interaction with a person's point of cyber access computer, provide the person's point of cyber access computer with information regarding the display screen size, the type of display screen the cyber portal is equipped with, as well as information about the operational capabilities and the operational settings of the cyber portal 100.

A cyber portal's components may be configured to include at least one member selected from the group consisting of:
  (a) one point-of-cyber-access cyber system identity designation;
  (b) one point-of-cyber-access cyber system address designation;
  (c) a device that provides for the transferring of cyber transfer packets over cyber communications networks;
  (d) an interconnecting circuit;
  (e) a source of power;
  (f) a protective housing;
  (g) an image display screen;
  (h) an audio output device 909;
  (i) a camera 911;
  (j) a microphone 913;
  (k) a manual input device;
  (l) a cyber storage device;
  (m) an operating system;
  (n) an auxiliary input means for interactions with other cyber devices; or
  (o) an auxiliary output means for interaction with other cyber devices.

The universal operating system may be configured to provide at least one part of an operating system that enables a cyber device to be used as a cyber portal 100.

The universal operating system may be configured to provide at least one part of at least one program that may be utilized to provide for the interoperable use of a cyber portal 100 for engaging in cyber interactions with a cyber device that does not use the universal operating system.

The universal operating system may be configured to provide programming that provides for or enables a person to alter the operational configuration of a cyber portal 100 the person is using on a temporary or permanent basis.

The universal operating system may be configured to provide or enable at least one program that provides the identity designation of a cyber portal to the first device in a cyber communications network that the cyber portal 100 has cyber interactions with.

The universal operating system may be configured to provide or enable at least one program that enables a cyber portal to provide all necessary cyber communications functions, including use of properly formatted transfer packets for interaction with cyber devices.

A cyber portal 100 may be configured to at least one member selected from the group consisting of: (a) be an integral part of a point of cyber access computer, (b) be directly connected to a point of cyber access computer, or (c) operate as a separate remote cyber device that communicates with a remote point of cyber access computer through use of a cyber communications network 300.

Communications between a cyber portal 100 and a person's point of cyber access computer may be configured to use at least one member selected from the group consisting of: (a) radio frequencies, (b) fiber optics, (c) wires, (d) at least one other suitable method for communications known to those skilled in the art, or (e) a combination thereof.

A remote, thin cyber portal 100, working in conjunction with a point of cyber access computer may be configured to provide a person with the highest attainable level of functional utility and computing or communications mobility.

A cyber portal 100 may be configured to interact with any properly configured cyber device.

A cyber portal 100 may include at least one input means selected from the group consisting of: (a) a camera, (b) a microphone, (c) a keyboard, (d) a pointing device, (e) a touchless user interface, (f) a digital tablet enabled image display screen, (g) a sensor, (h) another type of input device, (i) a media reader, (j) a stored information link, (k) a global position locating device, (l) an interconnection for an input device, or (m) any other source of input that is known to those skilled in the art.

A cyber portal 100 may be configured to provide user perceptible output utilizing at least one member selected from the group consisting of: (a) an image display device, (b) an audio output device, (c) a tactile output device, (d) an interconnection for use with another output device, (e) a printer or (f) any other useful user perceptible output device that is known to those skilled in the art.

The size of a cyber portal's image display screen may range from the smallest usable image display screen size to the largest image display screen size available.

A cyber portal 100 may be configured to include a remote or a local connection for cyber interaction with a person's point of cyber access computer.

Each cyber portal that is not an integral part of a point of cyber access computer has a unique cyber system identity designation and a mobile or stationary cyber system address designation.

A person may use a properly configured cyber portal for cyber interactions with the person's remotely located point of cyber access computer. Cyber portals need not be user-specific. Properly configured or designated cyber portals may also be utilized as cyber telephone devices.

Computers such as smart phones, tablets, laptop computers, or desktop computers may also be used as a cyber portal. This type of cyber portal has the ability to provide the additional feature of local computing functions to a person.

A person may require the use of a cyber portal 100 for cyber interactions with the person's remote point of cyber access computer. In some embodiments, the cyber portal 100 may be configured with two 8.5"×11" touchless interaction or digital tablet-enabled image display screens that are hinged together like a book in portrait format as shown in FIG. 16B. The illustrated cyber portal 901 shown in the array of images appearing in FIGS. 16A-16F makes an excellent, lightweight, and manageable cyber book, or a cyber portal that may be used to review, modify, or create cyber-based content of any type. The cyber portal shown in the array of images in FIGS. 16A-16F is typically not a computer. Rather, the cyber portal shown in the array of images in FIGS. 16A-16F is typically a remote thin cyber portal that is used for cyber interactions with a person's point of cyber access computer or for cyber interactions with any other appropriately configured cyber device.

As shown in FIGS. 16A and 16B, if a person takes the cyber portal 901 that the person is holding in book configuration and the person places the cyber portal on a table where it is oriented as, and may be used as, an open laptop computer, then, through use of a cyber communications network interconnection with the person's point of cyber access computer, this cyber portal may become a remote secure terminal for cyber interactions with the person's point of cyber access computer.

A person may use the digital tablet enabled functions of the image display screens on the illustrated cyber portal as a keyboard, or as a tablet for drawing, or as a tablet for handwriting, or as a tablet for the marking of content.

Both of the image display screens on the illustrated cyber portal may also be arranged side-by-side to form one flat-surfaced larger image display screen.

With a 180-degree flip and a fold over of one of the image display screens of the cyber portal as shown in FIGS. 16D and 16E, the cyber portal may be transformed into a single-screen digital pad, or a single-screen digital tablet, or an interactive single-screen image display device as shown in FIG. 16F.

As shown in FIG. 16D, a cyber portal may include a camera, microphone, or speaker to provide for multimedia functions or to provide a person's point of cyber access computer with sensor observation derived identity information that may be used by the point of cyber access computer for accurately testing the identity of the person.

The previously described remotely located cyber portal may well be a commonly used mid-sized mobile cyber portal. A cyber portal such as a smartphone-sized thin cyber portal puts interpersonal cyber communications as well as all of the capabilities of a person's remote point of cyber access computer in the palm of the person's hand.

Televisions, telephones, computer monitors, computers, cell phones, tablets, vehicles, and other devices that provide audio or visual output may easily be adapted, by a person skilled in the art, for use as a cyber portal.

A cyber portal 100 may be configured to provide additional functions beyond that of a basic cyber portal. These additional functions may be used to provide for at least one member selected from the group consisting of: (a) the needs of at least one disabled person, (b) integration of the cyber portal into at least one special or single-purpose cyber system, or (c) any other purpose.

(10) Cyber Communications Network Between a Cyber Portal and a Point of Cyber Access Computer The purpose of the part of the cyber communications network 300 that is used between a cyber portal 100 and a person's point of cyber access computer is to safely and securely transfer properly formatted and properly identified transfer packets between the cyber portal 100 and the person's point of cyber access computer.

There may be unique transfer packet formats for at least one member selected from the group consisting of:
(a) cyber interactions from a person's point of cyber access computer, to and through a cyber communications network 300, and to a cyber portal that is being used by the person 100;
(b) cyber interactions from a person using a cyber portal 100, to and through a cyber communications network 300, and to the person's point of cyber access computer;
(c) cyber interactions from a person's cyber assets, to and through a cyber portal 100 that is being used by the person, to and through a cyber communications network 300, and to the person's point of cyber access computer;
(d) cyber interactions from the cyber resources of other parties, to and through a cyber portal 100 that is being used by a person, to and through, a cyber communications network 300, and to the person's point of cyber access computer; or
(e) cyber interactions from a person's point of cyber access computer, to and through a cyber communications network 300, to and through a cyber portal 100 that is being used by the person, and to at least one cyber asset or to at least one cyber resource.

Cyber interactions between a cyber portal 100 and a person's point of cyber access computer may use at least one member selected from the group consisting of:
(a) at least one line of cyber communications;
(b) at least one type of line of cyber communications; or
(c) at least one source of lines of cyber communications.

Cyber interactions that use the part of a cyber communications network 300 between a cyber portal 100 and a person s point of cyber access computer may be protected from intrusion or interference by others through the use of encryption or any other cyber security process that may render the contents of transfer packets useless to all but the sender or the intended recipient.

The part of a cyber communications network 300 between a cyber portal 100 that is being used by a person and the person's point of cyber access computer may use, for communication, at least one member selected from the group consisting of: (a) radio frequencies, (b) fiber optics, (c) wires, (d) any other suitable communications method or means, or (e) a combination thereof.

The cyber devices, cyber processes, and cyber procedures that serve the part of the cyber communications network 300 between a cyber portal 100 and a person's point of cyber access computer may be configured to provide for transfers of transfer packets that are free from intrusion and interference by others.

(11) Point of Cyber Access Computer, Public Computer, and Private Computer

A point of cyber access computer 200 may be configured to provide one individual with a safe and secure remotely accessible computer that provides the one specific individual with a point to gain accurately identified access to at least one member selected from the group consisting of: (a) computing capabilities, (b) the individual's cyber assets, (c) the individual's cyber device manager, (d) the individual's cyber telephone system, or (e) the individual's cyber resources.

The point where an individual gains cyber access to cyberspace resources may be the individual's point of cyber access computer 200. The point-of-cyber-access cyber system 10 provides a system architecture in which each individual that uses the point-of-cyber-access cyber system 10 has a point where the individual may gain accurately identified access to at least one member selected from the group consisting of: (a) cyber activities, (b) cyber telephone communications, (c) cyber assets, or (d) available cyber resources. Further, another party may have a point of cyber access where the other party may interact with this specific individual for cyber telephone communications, for cyber activities, or for cyber interactions.

The foundation for configuring a cyber system 10 in such a way as to have it provide the highest attainable levels of cyber security, privacy, and safety is to require that:
(a) each individual constantly passes 100% accurate identity tests throughout the point-of-cyber-access cyber system 10; and
(b) each cyber device constantly passes 100% accurate identity tests throughout the cyber system 10.

A person may use any cyber portal 100 for remote, or local, cyber interactions with the person's point of cyber access computer 200. A cyber portal 100 may be used to provide a person's point of cyber access computer 200 with sensor observation derived information that enables the person's point of cyber access computer 200 to accurately test the person's identity.

In one non-limiting embodiment, after an individual has passed at least one accurate identity test that was made by the individual's point of cyber access computer 200, the individual may then be granted access to the resources of the individual's point of cyber access computer 200. Further, after the individual has passed at least one accurate identity test that was made by the individual's point of cyber access computer 200, the individual's point of cyber access computer 200 may provide verification of the individual's identity prior to or immediately prior to at least one step or each step that the individual's cyber interactions take throughout a cyber system 10.

An individual's point of cyber access computer may be configured to accurately test the individual's identity and to provide identity verification after the individual has passed at least one accurate identity test.

A point of cyber access computer 200 may be configured to work in conjunction with a separate private computer 230, or a separate public computer 260. Therefore, a point of cyber access computer 200 may be configured to be a combination of two or three of these separate types of computers.

An individual's point of cyber access computer may be configured to provide the primary or only source of accurate identity test access control to at least one member selected from the group consisting of: (a) the individual's point of cyber access computer, (b) the individual's private computer, (c) the individual's public computer, (d) the individual's cyber telephone system, (e) the individual's cyber device manager, or (f) other cyber devices.

Each individual that uses a cyber system 10 may be required to pass at least one accurate identity test. An individual's point of cyber access computer 200 may be configured to accurately test an individual's identity. After an individual: (a) has passed at least one accurate identity test, or (b) constantly passes accurate identity tests, the individual may then gain access to the individual's private computer 230. Once the individual has gained access to the individual's private computer 230, the individual may have full operational access or administrative access to not only the individual's private computer 230, but also to the individual's point of cyber access computer 200 and to the individual's public computer 260 as well.

At least one configuration of the device architecture of a point of cyber access computer may solve many of the significant problems with prior art cyber systems and computers. An individual's point of cyber access computer may be optimally configured to be comprised of at least one of three separate types of computers. These types of computers include:

(a) an individual's point of cyber access computer;
(b) an individual's private computer; and
(c) an individual's public computer.

An individual's point of cyber access computer 200 may be configured to provide security, access control, and internal routing for all of the individual's point of cyber access computer's cyber activities. The individual's point of cyber access computer 200 may also provide interoperability processing or conversion, as needed, for inbound cyber activities, for outbound cyber activities, and for internal cyber activities.

Figure 11:
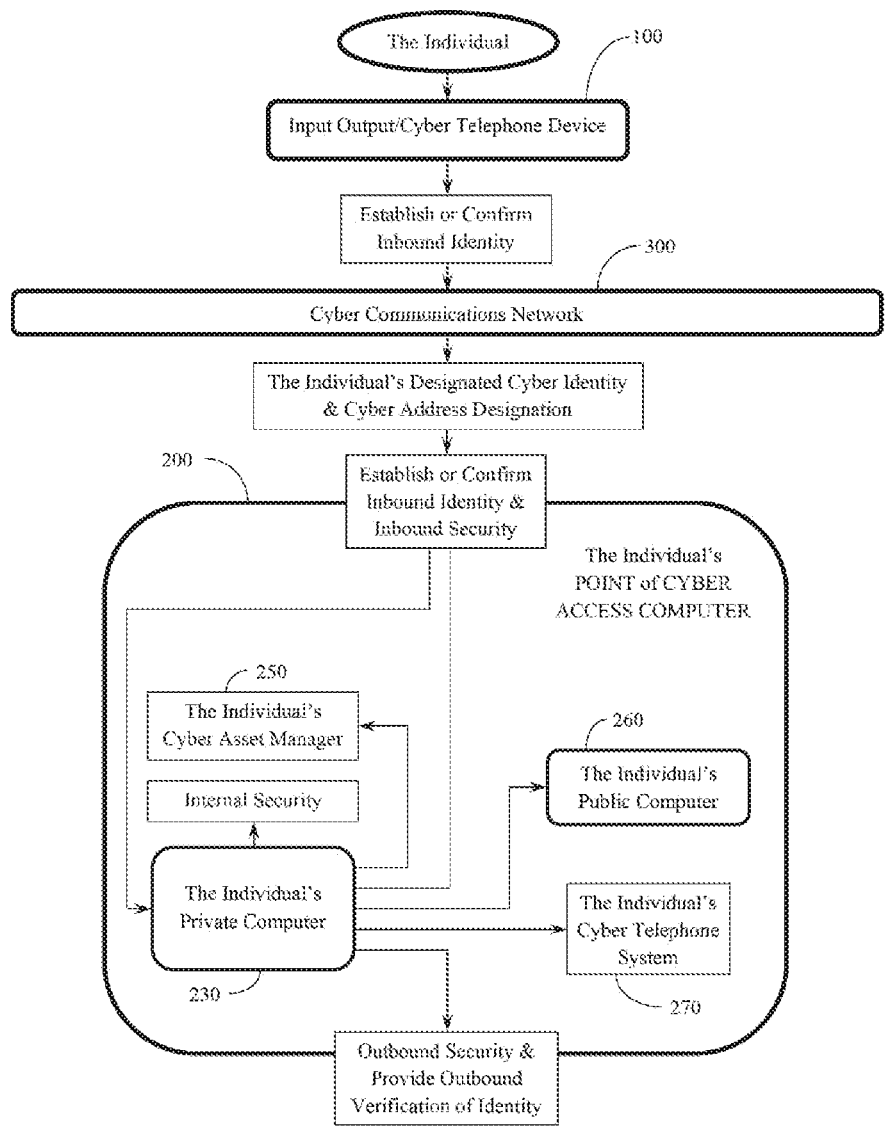
FIG. 11 is a schematic diagram that illustrates particular non-limiting embodiments of the person's or the entity's administrative-based, management-based, and operational cyber activities which may be associated with the person's or the entity's cyber assets in the systems and methodologies disclosed herein.
Figure 12:
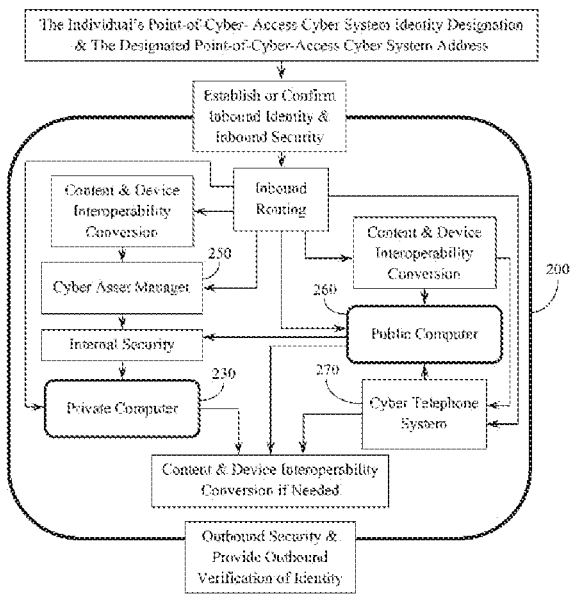
FIG. 12 is a schematic diagram that illustrates a particular non-limiting embodiment of a point of cyber access computer in accordance with the teachings herein, as well as components, interconnections, and associated cyber activities that may occur within the point of cyber access computer.

As shown in FIG. 11 an individual may gain administrative control or operational control of the individual's point of cyber access computer 200 through the individual's private computer 230.

A person may have cyber interactions with the person's private computer through the person's use of any cyber portal 100. The person's private computer 230 may be configured to provide the person with the ability to have cyber interactions with at least one member selected from the group consisting of: (a) the person's point of cyber access computer 200, (b) the person's public computer 230, (c) the person's cyber telephone system 270, (d) the person's cyber assets, (e) the person's cyber device manager, or (f) available cyber resources. The person's private computer 230 may also enable the person to have cyber interactions with any other party.

An individual's point of cyber access computer 200 may be configured to require that the individual pass at least one accurate identity test prior to the point of cyber access computer providing further access to the individual's cyber interactions. The individual's point of cyber access computer 200 may also be configured to require that at least one of the individual's device-based cyber assets pass at least one accurate identity test prior to allowing the cyber interactions of the individual's device-based cyber asset to gain further access to the individual's point of cyber access computer 200.

An individual's private computer may be configured such that access to the individual's private computer 230 may only be granted to cyber interactions from the individual, and to cyber interactions from specified cyber assets of the individual. The individual's private computer may also be configured such that cyber interactions from all other parties may be excluded from gaining access.

An individual's public computer 260 may be configured to be the only component that works in conjunction with the individual's point of cyber access computer 200 where others may participate in cyber interactions with the individual or where others may gain access to the individual's selected cyber resources. The individual's public computer and point of cyber access computer may be configured such that cyber resources may only be made available to others through the individual's public computer 260, and only with the permission of the individual.

An individual may choose to share all or part of the individual's file-based cyber assets with specified other parties. The individual may make at least one part of the individual's file-based cyber assets available to specified other parties by providing the specified other parties with copies of the individual's file-based cyber assets. These copies may be placed in the individual's properly configured public computer where they may be made available to be accessed by specified other parties through the other parties' cyber interactions with the individual's public computer 260.

File-based cyber resources are an individual's file-based cyber assets that have been copied to the individual's public computer 260 for use by at least one specified other party.

Preferably, a cyber system may be configured to require the use of at least one member selected from the group consisting of different and unique: (a) processes, (b) procedures, (c) formats, (d) transfer packets, or (e) codes, for the operations of, or for cyber interactions with or between, at least one member selected from the group consisting of: (i) one or more point of cyber access computers 200, (ii) one or more private computers 230, or (iii) one or more public computers 260. This arrangement may impart important security features of a cyber system.

A point of cyber access computer 200 may pre-process outbound cyber interactions to a cyber portal 100 so that the outbound cyber interactions may be transferred to, and used by, the cyber portal 100 with no further processing of content required.

A point of cyber access computer 200 may be configured to enable an individual to provide other parties with the individual's requests or requirements for privacy as well as the individual's preferences or requirements for inbound cyber activities or for inbound cyber content.

An individual's point of cyber access computer 200 may be configured to provide for at least one member selected from the group consisting of:

(a) a point where the individual may gain accurately identified access to the individual's cyber system;
(b) a point where other parties may gain access to the individual for cyber interactions;
(c) cyber security;
(d) the individual to have cyber interactions with a cyber communications network 300;
(e) cyber interactions with a cyber portal 100 that is being used by a person;
(f) cyber interactions using a cyber telephone device;
(g) routing of cyber activities;
(h) access to the individual's private computer 230;
(i) accurate testing of the individual's identity prior to or immediately prior to one step or each step that the individual's cyber interaction takes throughout a cyber system 10;
(j) sending outbound cyber interactions to a cyber portal or to remote cyber devices;
(k) denying access to the individual's private computer 260 by cyber interactions from all other parties;
(l) cyber interaction or security interactions between the individual's point of cyber access computer 200 and the individual's private computer 230;
(m) cyber interaction or security interactions between the individual's point of cyber access computer 200 and the individual's public computer 260;
(n) cyber interaction or security interactions between the individual's private computer 230 and the individual's public computer 260;

(o) processes or procedures that accurately test the identity of each other party prior to granting or denying the cyber interactions of each selected other party further access to the individual's point of cyber access computer 200;
(p) the individual with the ability to allow specified other parties to gain access to the individual's public computer 260 for specified purposes;
(q) the individual to send outbound cyber interactions from the individual's public computer 260;
(r) accurate testing of the individual's identity when the individual is sending outbound cyber interactions;
(s) accurate testing of the individual's identity for the individual's interactions with the individual's device-based cyber assets;
(t) accurate testing of the identity of an individual's device-based cyber asset prior to or immediately prior to allowing cyber interactions from the individual's device-based cyber assets to gain further access to the individual's point of cyber access computer 200;
(u) interoperability conversion processes or procedures that convert device operations or files to or from universal operating system-standard formats; or
(v) a cyber telephone system that provides cyber telephone or cyber video telephone services.

As shown in FIG. 13, an individual's private computer 230 may be configured to provide the individual with at least one member selected from the group consisting of:
(a) a safe, secure, and private cyber environment where no others may gain access;
(b) computing capabilities;
(c) computer programs;
(d) computer applications;
(e) historical records of cyber activities;
(f) at least one member selected from the group consisting of: (i) storage, (ii) access, (iii) alteration, (iv) use, (v) sharing, or (vi) management of the individual's file-based cyber assets that include, but are not limited to, the individual's personal information, the individual's health information, or the individual's financial information;
(g) cyber device managers;
(h) administrative control or operational control of the individual's device-based cyber assets, this may include at least one member selected from the group consisting of: (i) the individual's point of cyber access computer, (ii) the individual's private computer, (iii) the individual's public computer, (iv) the individual's cyber device manager, or (v) the individual's cyber telephone system;
(i) cyber interactions with other parties;
(j) cyber interactions with the cyber resources of other parties;
(k) the ability to specify the other parties that may have access to the individual's public computer;
(l) processes or procedures that enable the individual to share the individual's file-based cyber assets with other parties by making copies of the individual's file-based cyber assets available for specified other parties to use as their cyber resources;
(m) a system that enables the individual to designate which specific cyber resources are available for each specific other party to access through the individual's public computer;
(n) systems that enable the individual to grant, or to deny specified other parties access to all or part of the individual's public computer 260; or
(o) systems that enable the individual to grant, or to deny specified other parties access to specified cyber resources of the individual.

As shown in FIG. 14 an individual's public computer 360 may be configured to provide at least one member selected from the group consisting of:
(a) a point of cyber access where other parties may interact with the individual;
(b) cyber security;
(c) computing resources (this may be used by other parties);
(d) the use of computer programs (this may be used by other parties);
(e) the use of computer applications (this may be used by other parties);
(f) the ability to send outbound cyber interactions in response to requests from other parties (this ability is preferably provided only to the individual);
(g) access to resources of the individual's inbound cyber mail system (this may be provided to the individual or to other parties);
(h) access to resources of the individual's inbound cyber messaging system (this may be provided to the individual or to other parties);
(i) specified other parties with access to the individual's cyber resources that have been selected for the specified other parties' use by the individual;
(j) at least one member selected from the group consisting of: (i) storage, (ii) access, (iii) alteration, (iv) use, (v) sharing, or (vi) management of the individual's file-based cyber resources;
(k) the ability to grant, or to deny specified other parties access to specified parts of the resources of the individual's public computer 260 (this ability is preferably provided only to the individual); or
(l) the ability to grant or to deny, specified other parties access to all or part of the individual's cyber resources (this ability is preferably provided only to the individual).

(12) Cyber Telephone System

A cyber telephone system 270 (see FIG. 2) may be an independent device or may work in conjunction with a point of cyber access computer.

A cyber telephone system provides services for cyber telephone or cyber video telephone communications. The cyber telephone system may also be configured to send automated cyber telephone communication to other parties.

A person may utilize a cyber portal to initiate outbound cyber telephone communications through: (a) the person's point of cyber access computer, (b) the person's private computer, (c) the person's public computer, or (d) the person's cyber telephone system.

An individual may grant, or deny cyber telephone system access to the cyber telephone communication interactions from other parties or to the cyber telephone communications interactions from cyber devices.

Transfer packet label information from inbound cyber telephone communication interactions may be used to determine if an individual will grant or deny the inbound cyber telephone communication interactions access to the individual's cyber telephone system.

An individual may further grant or deny cyber telephone communication interactions from specified other parties access to all or part of the services of the individual's cyber telephone system.

An individual's cyber telephone system may be configured to provide at least one member selected from the group consisting of:
- (a) cyber security;
- (b) the ability for the individual to grant or deny access to all or part of the services of the individual's cyber telephone systems to cyber telephone communication interactions from other parties;
- (c) routing of inbound cyber telephone communication interactions or cyber alerts to cyber telephone devices that are on or near a person;
- (d) message-taking resources;
- (e) routing of cyber telephone communication interactions to the individual's cyber telephone systems' message taking resources;
- (f) messages for the senders of inbound cyber telephone communication interactions;
- (g) re-directing inbound cyber telephone communication interactions to specified recipients or to specified cyber devices; or
- (h) historical records of cyber telephone system activities.

A person, using a cyber portal, after gaining accurately identified access to the person's private computer, may have at least one member selected from the group consisting of: (a) operational control, (b) administrative control, or (c) access control of the person's cyber telephone system.

An individual may simultaneously interact with two or more members selected from the group consisting of: (a) the individual's cyber telephone system, (b) the individual's point of cyber access computer, (c) the individual's private computer, (d) the individual's public computer, or (e) the individual's device-based cyber assets.

The programming, processes, and procedures of the universal operating system may be configured to provide for or enable complete security for cyber telephone communication interactions that are transferred from the individual's cyber telephone system to the individual's private computer or to the individual's public computer.

(13) Cyber Communications Network Between a Sender's Point of Cyber Access Computer and a Recipient's Point of Cyber Access Computer The purpose of the part of a cyber communications network 300 that is used between a sender's point of cyber access computer and a recipient's point of cyber access computer is to safely and securely transfer properly formatted and properly identified transfer packets between a sender's point of cyber access computer and a recipient's point of cyber access computer.

A sender's cyber interaction that is to be directed to a recipient may originate from the sender's interactions with a cyber portal. The cyber interaction that was derived from the sender's interactions with the cyber portal goes to and through the cyber communications network, and may go to and through the sender's point of cyber access computer, to and through a cyber communications network 300, to and through a recipient's point of cyber access computer, and then to the public computer component of the recipient's point of cyber access computer.

A sender's cyber interaction to a recipient may also come from the sender's public computer and go to and through the sender's point of cyber access computer, to and through a cyber communications network, to and through a recipient's point of cyber access computer, and then to the recipient's public computer.

A sender's cyber interaction to a recipient may also come from the sender's point of cyber access computer and go to and through a cyber communications network, to and through the recipient's point of cyber access computer, and then to the recipient's public computer.

There may be many unique types of transfer packets for cyber interactions from a sender's point of cyber access computer to a recipient's point of cyber access computer. The different and unique types of transfer packets may be used to identify different types of cyber activities in order to provide a high level of security for both the sender and the recipient.

Cyber interactions between a sender's point of cyber access computer and a recipient's point of cyber access computer may use at least one member selected from the group consisting of:
- (a) least one line of cyber communications;
- (b) at least one type of line of cyber communications; or
- (c) at least one source of lines of cyber communications.

A sender may be required to pass at least one accurate identity test prior to or immediately prior one step or each step the sender's cyber interactions take throughout a cyber communications network 300.

Cyber interactions that use the part of a cyber communications network 300 between a sender's point of cyber access computer 200 and a recipient's point of cyber access computer 200, and most especially cyber interactions that use radio frequency, may be protected from intrusion and interference by others through the use of encryption, or other suitable cyber security measures that render the contents of transfer packets useless to all but the sender and the intended recipient of the transfer packets.

The devices, processes, and procedures that serve the part of a cyber communications network that is used between a sender's point of cyber access computer and a recipient's point of cyber access computer may be configured to provide for the cyber communications network transfer of transfer packets that are free from intrusion or interference by others.

(14) an Individual's Cyber Device Manager and the Individual's Device-Based Cyber Assets An individual's device-based cyber assets may include at least one member selected from the group consisting of: (a) video cameras, (b) televisions, (c) television programming access or selection devices, (d) personal health monitors, (e) personal health care devices, (f) devices for accurately testing the identity of a person or a device, (g) vehicles, (h) cyber vaults, (i) cyber file back-up or restore devices, (j) global position locating devices, (k) cyber device managers that are utilized for home or business automation management (which may include monitoring, recording, or operationally interacting with lights, heating or cooling systems, locks, garage door openers, lawn sprinkler systems, security systems, water or electric consumption, automated pet doors, personal weather stations, or (l) any other device-based cyber assets.

An individual may have device-based cyber assets that are not an integral part of the individual's point of cyber access computer.

An individual's device-based cyber assets may have cyber interactions with the individual through utilization of a cyber device manager.

An individual's cyber device manager enables safe and secure cyber interactions between the individual and the individual's device-based cyber assets. The individual's cyber device manager may be configured to provide the individual with safe and secure access control, administrative control, and operational control of the individual's device-based cyber assets.

An individual may gain access control, administrative control, or operational control of the individual's cyber device manager through the individual's private computer 230. Utilizing this choice of configuration of the combination of a private computer, and a cyber device manager, no others may gain access control, administrative control, or operational control of the individual's cyber device manager.

There may be complete security for an individual's cyber interactions that are transferred from the individual's cyber device manager to the individual's private computer.

An individual's cyber device manager may accurately test the identity of the individual's device-based cyber assets constantly, prior to or immediately prior to providing cyber interactions from the individual's device-based cyber assets with further access to the individual's cyber device manager.

An individual's device-based cyber assets may test or verify the identity of the individual's cyber device manager constantly, prior to or immediately prior to the individual's device-based cyber asset's providing further cyber access to cyber interactions from the individual's cyber device manager.

An individual's cyber device manager may work in conjunction with the individual's point of cyber access computer.

An individual may have a cyber device manager that may be located in the individual's point of cyber access computer, or a cyber device manager may be located within the constructs of the individual's private computer. An individual's cyber device manager may also be an independent device. Locating a cyber device manager within the constructs of the individual's properly configured private computer may provide for the highest attainable level of security and privacy for cyber interactions with the individual's device-based cyber assets.

For example, an individual's cyber device manager may have cyber interactions with a cyber device on a person. One particular cyber device that may be located on the person may report on the person's blood sugar level. The person may also have a cyber insulin delivery system that is operated through cyber interactions with the person's cyber device manager. The person's health and well-being may depend on cyber interactions with both of these devices. Therefore, the person may be best served by using the highest level of security and privacy available for cyber interactions between the cyber device manager and these two cyber devices. This may be accomplished by having cyber interactions between these two device-based cyber assets provided by a private-computer-located cyber device manager.

An individual's cyber device manager, and the same individual's device-based cyber assets may interconnect using the resources of a cyber communications networks.

An individual's cyber device manager may use resources of the universal operating system for its cyber operations or cyber interactions.

An individual's device-based cyber assets may be configured to only interact with the individual. Other parties that wish to have cyber interactions with the individual's device-based cyber assets must request that the individual provide the requestor with the requested cyber resource. The requested cyber resource may be made available for the requestor through the requestor's cyber interaction with the individual's public computer.

An individual's cyber device manager or the individual's device-based cyber assets may provide historical records of cyber interactions or cyber activities.

(15) Cyber Communications Network Between an Individual's Cyber Device Manager and the Individual's Remote Device-Based Cyber Assets The purpose of the part of the cyber communications network that is used between an individual's cyber device manager and the individual's remote device-based cyber assets is to safely and securely transfer properly formatted and properly identified transfer packets between the individual's cyber device manager and the individual's remote device-based cyber assets.

An individual's cyber device manager's interaction with the individual's device-based cyber assets may come from the individual's cyber device manager, through the individual's private computer, to and through the individual's point of cyber access computer, to and through a cyber communications network, and to the individual's remote device-based cyber asset.

An individual's remote device-based cyber asset's interaction with the individual's cyber device manager may come from the individual's remote device-based cyber assets, to and through a cyber communications network, to and through the individual's point of cyber access computer, to at least one member selected from the group consisting of: (a) the individual's cyber device manager, or (b) the individual's private computer, and then on to the individual's cyber device manager.

There may be many unique transfer packet formats for cyber interactions between an individual's cyber device manager and the individual's device-based cyber assets. The different and unique transfer packet formats may be used to identify cyber interactions that came from different types of cyber devices or to identify cyber interactions for different functions or purposes.

Cyber interactions between an individual's cyber device manager and the individual's device-based cyber assets may use at least one member selected from the group consisting of:

(a) one or more lines of cyber communications;
(b) one or more types of lines of cyber communications; or
(c) one or more sources of lines of cyber communications.

An individual's device-based cyber assets may use a cyber telephone device that is being used by the individual or a cyber portal that is being used by the individual as a cyber communications network link to or from the individual's point of cyber access computer.

An individual's cyber device manager may be required to pass at least one accurate identity tests prior to or immediately prior to at least one step or each step that the individual's cyber device manager's cyber interactions take through a cyber communications networks. Further, the individual's device-based cyber assets may be required to pass at least one accurate identity tests prior to or immediately prior to one step or each step that the individual's remote device-based cyber asset's cyber interactions take throughout a cyber communications networks.

Cyber interactions that use the part of the cyber communications network between an individual's cyber device manager and the individual's remote device-based cyber assets, (and especially those cyber interactions that use radio frequency), may be protected from intrusion and interference by others by the use of encryption or other suitable cyber security measures that render the content of transfer packets useless to all but the sender and the designated recipient of the transfer packets.

The devices, processes, and procedures that control the operations of this part of a cyber communications network, through their use of the programming, processes, and procedures that are a part of the universal operating system, may provide for the safe and secure transfer of transfer packets that are free from intrusion or interference by others.

(16) Examples of Use of the Point-of-Cyber-Access Cyber System

On election day in November every voter in the United States may, through use of a cyber portal, gain accurately identified access to his or her point of cyber access computer. Through utilization of the accurate-identity-testing-based access control services of the cyber system, every voter will have the ability to safely, securely, and privately cast his or her vote in at least one, or in all, of the elections where the person is eligible to cast a vote.

In the context of education, in an elementary school classroom, a student may use a cyber portal such as shown in FIGS. 16A-16F. As shown in FIG. 16B, this device may have two approximately 8" by 11" image display screens that are hinged together on one side like a book in portrait format. The student may turn the same cyber portal 90 degrees where it may be configured to resemble and provide the functions of a laptop computer.

The student may utilize the cyber portal and the resources of a communications networks to interact with the student's remotely located point of cyber access computer.

As shown in FIGS. 16C and 16F, the student may use a stylus 907 in conjunction with a digital tablet feature of the cyber portal's display screens to write, to draw, or to interact with an image appearing on the display screens. The student may also use the cyber portal's touchless user interface for interaction with the student's remotely located point of cyber access computer. The touchless user interface may also be configured to provide the student with a touchless stylus function or a touchless keyboard that is shown on at least one of the cyber portal's image display screens. Furthermore, the student may use the cyber portal's microphone or camera for cyber interaction with the student's point of cyber access computer. Also, the student may use at least one other type of cyber input device that may work in conjunction with the student's cyber portal.

The student's point of cyber access computer may provide the student with access to cyber educational materials from multiple sources such as, for example, a public cyber library, a cyber compendium of information, or the school district's cyber library.

The student's point of cyber access computer may use school district-supplied computer programs, school district-supplied computer applications, and school district-supplied cyber educational materials.

The student uses a cyber portal to remotely access the student's point of cyber access computer so that the student may use the school district-supplied cyber-based educational resources and materials that are to be used during the class that the student is currently attending.

The cyber portal may be configured to provide the student with full interactive access to available cyber-based educational resources and materials.

The student may use a stylus 907 to draw, hand write a report or to work on math problems.

The student stores the student's schoolwork using the storage resources of the student's point of cyber access computer.

The student submits finished school work to the student's teacher using cyber mail functions.

The student may also enter in to cyber telephone communication interactions with the student's teacher during class by simply using video telephone functions for remote interaction with the student's teacher from across the classroom.

The student's teacher, through use of school district-supplied computer programs or computer applications, may access, during class, a copy of the image that is displayed on the student's cyber portal. Using the same school district-supplied computer programs and computer applications, the student's teacher may interact with the student during class by providing graphic input that may be viewed by the student in real time on an image display screen of the student's cyber portal.

All of the previously addressed school-related cyber activities do not necessarily require that cyber interconnection and computing infrastructure be provided to the student by the school district. Cyber-based educational activity is performed using cyber mail functions, cyber interaction functions, and cyber video telephone functions.

The school district may provide the student with any cyber educational materials that the school district deems appropriate.

The school district may also provide the student with cyber educational materials that are appropriate for the student's abilities in any field of study. Furthermore, the school district may supply the student with cyber educational materials that are formatted to be of most interest to the student and that are most appropriate for the student's best learning styles.

It should also be noted that the student may use, from anywhere the student is located, a cyber portal to remotely access any of the cyber-based educational resources that are available to the student through the student's point of cyber access computer.

In the context of the health care of a person has a health care-related interaction with a health care provider, the health care provider may safely, securely and privately:

(a) maintain a record of the interaction between the health care provider and the person for the remainder of the person's lifetime;

(b) provide a cyber system health care information registry with the person's point-of-cyber-access cyber system identity designation, along with the health care provider's point-of-cyber-access cyber system identity designation and the date of the health care-related interaction; and (c) provide the person with a complete record of the person's health care-related interaction with the health care provider by sending a copy of the health care provider's record to the person through the person's point of cyber access computer.

The person may choose to save all or part of, the health care provider's record of the person's health care-related interaction by transferring the copy of the health care provider's record from the person's public computer to the person's private computer where the record or at least part thereof, may be saved as a part of the person's absolutely safe, secure, and private files that contain all or selected parts of the person's personal health records.

The person may also choose to delete the copy of the health care provider's record of the person's health care-related interaction.

If the person happens to lose, or delete, the copy of the health care provider's record of the person's health care-related interaction, the person may contact the cyber system health care information registry and receive the needed information. The cyber system health care information registry provides information to the person that only includes the health care provider's point-of-cyber-access cyber system identity designation and the date of the person's health care-related interaction. Using information provided by the cyber system health care information registry, the person may request that the health care provider send the person a copy of the health care provider's record of the person's prior health care-related interaction. The health care provider may then provide a copy of the record of the person's health care-related interaction to the person only, thereby providing the person with complete privacy for, and control over, his or her cyber system-based health records.

The person may, anonymously, or with the other parties' knowledge of the person's identity, choose to share at least part of his or her health care-related information with specified other parties.

If a third party, such as a health care insurance company, was obligated to pay for part of the person's health care-related services, the third party insurance company may require that the person provide the third party insurance company with a cyber interaction that discloses or confirms details about the health care-related interaction. This simple process may be used to eliminate many types of health care fraud.

The person may safely, securely, and privately share all or part of the his or her health information with specified health care providers. The person's shared health information may provide the health care providers with a tool to use to better provide best possible appropriate health care services to the person.

The person may safely, securely, privately, and anonymously share all or part of the his or her personal health information with selected scientists or researchers that are working to provide improved health care outcomes. Quantum leaps forward may be made by scientists and researchers when vast amounts of donated reliable health information from large numbers of people are made available for research.

The person may also choose to provide all or part of his or her health information to an agency such as the United States Center for Disease Control and Prevention (CDC) so that the CDC may use the person as one of many that are used to monitor a geographic area or a specific part of the population for targeted health-related occurrences. The CDC may then monitor a sample of people to determine when and where there is an outbreak of flu or disease (which may be, for example, a food-borne or host-borne illness), and when and where there is an occurrence of other targeted health-related occurrences.

A cyber system's ability to allow a person to safely, securely, privately and anonymously share all or part of the his or her health information with selected other parties will provide public health entities with an informational tool that may fill the public health entities' state-of-the-public's-health needs for information.

A cyber system may enable or provide an all-inclusive world-wide database of health care information, as well as area-appropriate definitions for the health care information that is contained within the database. This database may be an ultimate informational tool for scientists or medical researchers to use to improve health care outcomes worldwide.

A cyber system may be configured to provide a person with safe, secure and private process or procedures for cyber interactions with cyber health monitoring devices or cyber health care resource delivery devices that are on, in or near the person.

For example, a person uses cyber health information sensors on his or her person. The cyber health information sensors, using the resources of the cyber system, interact with the person's point of cyber access computer. The person's cyber health information sensors report to the person's point of cyber access computer that the person has a blood sugar level that requires the person's cyber insulin delivery system (that may be placed on or in the person) to deliver a specified amount of insulin to the person. The person may require that his or her permission is given prior to the delivery of insulin, or the person may allow an automated delivery of insulin if the automated delivery does not exceed a pre-determined amount of insulin. The sensor observation indicates the person requires a dose of insulin that exceeds this pre-determined maximum acceptable amount, so, the person is required to approve the delivery of the indicated necessary dose of insulin before the indicated necessary dose of insulin is delivered.

The cyber system's ability to safely, securely and privately monitor and record information that is received from cyber health information sensors that are on, in or near a person may provide the person with intermittent or continuous reporting from cyber health information sensors. Information from cyber health information sensors may be used by the person or saved for later use by the person or health care providers. Alternatively, saved information from the person's cyber health information sensors may be used by science or medicine to enable science or medicine to better understand the intricacies of the workings of a human body in order to provide improved health care outcomes worldwide.

In another example, a person is driving towards his or her residence. The person inputs the voice command, "open the garage door," to a pocket-sized cyber portal/cyber telephone device. The person's point of cyber access computer receives the voice-based cyber interaction and, in turn, monitors the global position locating sensor that is a part of the cyber portal/cyber telephone device. Such monitoring allows the point of cyber access computer to determine the optimum point in time to interact with the garage door opener. The person's point of cyber access computer interacts with the garage door opener to open the garage door as the individual and the vehicle approach.

One skilled in the art will appreciate that some of the methodologies disclosed herein may be implemented utilizing one or more software programs. Such software programs may take the form of suitable programming instructions disposed in a tangible, non-transient medium which, when implemented by one or more computer processors, perform part or all of the methodologies described herein.

While the disclosed platform has been defined in terms of its preferred and alternative embodiments, those of ordinary skill in the art will understand that numerous other embodiments and applications of the disclosed platform will become apparent. Such other embodiments and applications shall be included within the scope and meaning of the disclosure as defined by the appended claims. Moreover, it is to be understood that the above description of the present disclosure is illustrative and is not intended to be limiting. It will thus be appreciated that various additions, substitutions and modifications may be made to the above described embodiments without departing from the scope of the present disclosure. Accordingly, the scope of the present disclosure should be construed in reference to the appended claims.

What is claimed is:

1. In combination with at least one cyber system, a scalable, configurable universal operating system stored on a non-transitory computer readable medium;
   wherein said scalable configurable universal operating system provides processes or procedures that are utilized for at least one operation of at least one component of said at least one cyber system;
   wherein said at least one cyber system is selected from the group consisting of a spectrum of cyber systems that utilize operating systems;
   wherein said at least one cyber system is utilized by at least one individual or at least one cyber device;
   wherein said at least one cyber system includes at least one member selected from the group consisting of:
   (a) cyber communications networks,
   (b) cyber portals,
   (c) point of cyber access computers,
   (d) private computers,
   (e) public computers,
   (f) cyber telephone systems,
   (g) cyber device managers,
   (h) cyber assets, and
   (i) cyber resources;
   wherein said scalable configurable universal operating system is configured to require that each individual be properly identified immediately prior to each step that said each individual's cyber interactions carry out and that each cyber device be properly identified immediately prior to each step that the cyber device's cyber interactions carry out;
   wherein said scalable configurable universal operating system is configured to require that, after each individual has been properly identified immediately prior to a first step that the individual's cyber interactions carry out, each individual is properly re-identified immediately prior to a second step that the individual's cyber interactions carry out, and wherein said scalable configurable universal operating system is configured to require that, after each cyber device has been properly identified immediately prior to a first step that the cyber device's cyber interactions carry out, each cyber device is properly identified immediately prior to a second step that the cyber device's cyber interactions carry out;
   wherein said scalable configurable universal operating system is scalable to include operating system resources that fall at one point in a range of from a minimum to a maximum, wherein at the minimum, said scalable configurable universal operating system is scaled to provide minimal operating system resources, and wherein at the maximum, said scalable configurable universal operating system is scaled to include all of the operating system resources;
   wherein scalable configurable universal operating system is configured to provide programming that provides processes or procedures that enable an individual to perform at least one action selected from the group consisting of:
   (a) adding to cyber devices, at least one member selected from the group consisting of: (i) cyber processes, (ii) cyber procedures, and (iii) cyber components,
   (b) removing from cyber devices, at least one member selected from the group consisting of: (i) cyber processes, (ii) cyber procedures, and (iii) cyber components,
   (c) altering at least one member selected from the group consisting of: (i) cyber processes, (ii) cyber procedures, and (iii) cyber components that are parts of cyber devices, and (d) changing the configuration of at least one member selected from the group consisting of: (i) cyber processes, (ii) cyber procedures, and (iii) cyber components that are parts of cyber devices;
   wherein said scalable configurable universal operating system further comprises at least one part of the at least one member selected from the group consisting of:
   (a) programming that provides processes or procedures that provide for properly identifying individuals,
   (b) programming that provides processes or procedures that provide for properly identifying cyber devices,
   (c) programming that provides processes or procedures that provide for requiring that at least one individual be properly identified prior to at least one step that at least one cyber interaction of said at least one individual carries out throughout said at least one cyber system,
   (d) programming that provides processes or procedures that provide for requiring that at least one cyber device be properly identified prior to at least one step that at least one cyber interaction of said at least one cyber device carries out throughout said at least one cyber system,
   (e) programming that provides processes or procedures that provide for at least one individual to be properly identified prior to at least one step that at least one cyber interaction of said at least one individual carries out throughout said at least one cyber system,
   (f) programming that provides processes or procedures that provide for at least one cyber device to be properly identified prior to at least one step that at least one cyber interaction of said at least one cyber device carries out throughout said at least one cyber system,
   (g) programming that provides processes or procedures that provide for operations of, or use of, cyber communications networks,
   (h) programming that provides processes or procedures that provide for operations of, or use of, cyber portals,
   (i) programming that provides processes or procedures that provide for operations of, or use of, point of cyber access computers,
   (j) programming that provides processes or procedures that provide for operations of, or use of, private computers,
   (k) programming that provides processes or procedures that provide for operations of, or use of, public computers,
   (l) programming that provides processes or procedures that provide for operations of, or use of, device-based cyber assets,
   (m) programming that provides processes or procedures that provide for operations of, or use of, device-based cyber resources,
   (n) programming that provides processes or procedures that provide for operations of, or use of, cyber device managers,
   (o) programming that provides processes or procedures that provide for operations of, or use of, cyber telephone systems, (p) programming that provides processes or procedures that provide for operations of, or use of, cyber transfer packet systems,
(q) programming that provides processes or procedures that provide for operations of, or use of, mobile or in-motion cyber devices,
(r) programming that provides processes or procedures that provide for operations of, or use of, cyber vaults,
(s) programming that provides processes or procedures that provide for operations of, or use of, cyber health systems,
(t) programming that provides processes or procedures that provide for operations of, or use of, at least one member selected from the group consisting of:
  (i) health care related cyber devices,
  (ii) health care related cyber assets, and
  (iii) health care related cyber resources,
(u) programming that provides processes or procedures that provide for operations of, or use of, cyber rights licensing systems,
(v) programming that provides processes or procedures that provide for operations of, or use of, cyber mail systems,
(w) programming that provides processes or procedures that provide for operations of, or use of, cyber sites,
(x) programming that provides processes or procedures that provide for operations of, or use of, cyber education systems,
(y) programming that provides processes or procedures that provide for operations of, or use of, cyber payment systems,
(z) programming that provides processes or procedures that provide for operations of, or use of, scalable configurable universal operating system standard device interconnection interfaces that are utilized by cyber devices,
(aa) programming that provides processes or procedures that provide for operations of, or use of, a frames and scrolls system or format for image-based cyber content,
(bb) programming that provides processes or procedures that provide for operations of, or use of, autonomous devices,
(cc) programming that provides processes or procedures that provide for at least one member selected from the group consisting of:
  (i) creating,
  (ii) accessing,
  (iii) modifying,
  (iv) using,
  (v) sharing,
  (vi) storing, and
  (vii) managing,
  file-based cyber assets,
(dd) programming that provides processes or procedures that provide for at least one member selected from the group consisting of:
  (i) creating,
  (ii) accessing,
  (iii) modifying,
  (iv) using,
  (v) sharing,
  (vi) storing, and
  (vii) managing
file-based cyber resources,
(ee) programming that provides processes or procedures that provide security,
(ff) programming that provides processes or procedures that provide historical records regarding any aspect of operations of cyber systems, and
(gg) programming that provides processes or procedures that enable an individual to exclusively select at least one setting of at least one member selected from the group consisting of:
  (i) administrative settings of the individual's cyber systems,
  (ii) operational settings of the individual's cyber systems, and
  (iii) access settings of the individual's cyber systems;
wherein said at least one cyber system includes at least one point-of-cyber-access cyber system;
wherein said scalable configurable universal operating system further includes programming that provides processes or procedures that require or provide for separate processing or support for one member or a combination of two or more members selected from the group consisting of:
(a) an individual's private cyber activities,
(b) an individual's private cyber content, and
(c) an individual's private cyber interactions, as well as separate and different processing or support for one member or a combination of two or more members selected from the group consisting of:
  (i) an individual's public cyber activities,
  (ii) an individual's cyber content that is made available to at least one other party or at least one cyber device of at least one other party, and
  (iii) an individual's public cyber interactions;
wherein said scalable configurable universal operating system further includes programming that provides processes or procedures that require or provide for use of at least one member selected from the group consisting of:
(a) unique processes,
(b) unique procedures,
(c) unique protocols,
(d) unique code, and
(e) unique formats,
to be used for at least one member selected from the group consisting of:
  (i) cyber programs,
  (ii) cyber applications,
  (iii) cyber activities, and
  (iv) cyber interactions,
that are utilized for differing purposes; and
wherein said scalable universal operating system includes programming that provides processes or procedures that utilize a combination of:
(a) a virtual equivalent of at least one projector, in conjunction with,
(b) a virtual equivalent of at least one projection display screen that receives and displays a virtual equivalent of at least one image output from said virtual equivalent of said at least one projector, and
(c) a virtual equivalent of at least one recorder or capture device that provides a virtual equivalent of at least one recording of at least one image from said at least one projection display screen, or a virtual equivalent of at least one recording of at least one part of an audio output from said at least one projector;
all of which are configured and utilized for providing interoperability conversion of at least one member selected from the group consisting of:
(A) cyber content, (B) cyber programming,
(C) human or cyber device interactions, and
(D) cyber activities,
to or from system standard processes or procedures of the scalable universal operating system.

2. The combination of claim 1, wherein said scalable configurable universal operating system further includes programming that provides processes or procedures that enable an individual to have exclusive control of at least one setting selected from the group consisting of:
   (a) administrative settings,
   (b) operational settings, and
   (c) access control settings,
for at least one member selected from the group consisting of:
   (i) said individual's point of cyber access computers,
   (ii) said individual's private computers,
   (iii) said individual's public computers,
   (iv) said individual's cyber device managers,
   (v) said individual's cyber telephone systems,
   (vi) said individual's cyber vaults,
   (vii) said individual's cyber assets, and
   (viii) said individual's cyber resources.

3. The combination of claim 1, wherein said scalable configurable universal operating system further includes programming that provides processes or procedures that enable an individual to perform at least one action selected from the group consisting of:
   (a) adding architectural components to,
   (b) adding programs to,
   (c) adding cyber devices to,
   (d) removing architectural components from,
   (e) removing programs from,
   (f) removing cyber devices from,
   (g) altering architectural component of,
   (h) altering programs of, and
   (i) altering cyber devices of,
said at least one cyber system.

4. The combination of claim 1, wherein said scalable configurable universal operating system further includes programming that provides processes or procedures that enable at least one individual to perform at least one action selected from the group consisting of:
   (a) adding processes or procedures to,
   (b) removing processes or procedures from, and
   (c) altering processes or the procedures
   of, at least one component of said at least one cyber system.

5. The combination of claim 1, wherein said scalable configurable universal operating system further includes programming that provides processes or procedures that enable at least one individual to perform at least one action selected from the group consisting of:
   (a) adding at least one member selected from the group consisting of:
      (i) components,
      (ii) processes and
      (iii) procedures,
      to at least one cyber device,
   (b) removing at least one member selected from the group consisting of:
      (i) components,
      (ii) processes, and
      (iii) procedures,
   from at least one cyber device, and
   (c) altering at least one member selected from the group consisting of:
      (i) components,
      (ii) processes, and
      (iii) procedures,
      of at least one cyber device.

6. The combination of claim 1, wherein said scalable configurable universal operating system further includes system standard processes or system standard procedures that are utilized for minimizing a number of differing processes or procedures used by others by providing said system standard processes or procedures for use by others.

7. The combination of claim 1, wherein said scalable configurable universal operating system further includes programming that provides processes or procedures that enable an individual to request or require that at least one other party or at least one cyber device of at least one other party provide said individual with said individual's at least one preference for at least one member selected from the group consisting of:
   (i) cyber interactions,
   (ii) cyber content, and
   (iii) privacy.

8. The combination of claim 1, wherein said scalable configurable universal operating system further includes programming that provides processes or procedures that enable an individual to selectively grant or to selectively deny at least one member selected from the group consisting of:
   (a) said individual's device-based cyber assets,
   (b) said individual's device-based cyber resources,
   (c) other parties, and
   (d) cyber devices of other parties,
access to at least one selected part of said individual's cyber assets or said individual's cyber resources, said at least one selected part being selected by said individual.

9. In combination with at least one cyber system, a tangible, non-transient computer readable medium having programming instructions recorded therein which, when executed by at least one computer processor, performs the step of:
   establishing a scalable configurable universal operating system which provides processes or procedures that are utilized for at least one part of at least one operation of at least one component of the at least one cyber system,
   wherein said at least one cyber system is utilized by at least one individual or at least one cyber device,
   wherein said at least one cyber system includes at least one member selected from the group consisting of:
   (a) cyber communications networks,
   (b) cyber portals,
   (c) point of cyber access computers,
   (d) private computers,
   (e) public computers,
   (f) cyber telephone systems,
   (g) cyber device managers,
   (h) cyber assets, and
   (i) cyber resources,
   wherein said scalable configurable universal operating system is configured to require that each individual be properly identified immediately prior to each step that said each individual's cyber interactions carry out and that each cyber device be properly identified immediately prior to each step that the cyber device's cyber interactions carry out, and
   wherein said scalable configurable universal operating system is scalable to include operating system resources that fall at one point in a range of from a minimum to a maximum, wherein at the minimum said scalable configurable universal operating system is scaled to provide minimal operating system resources and wherein at the maximum said scalable configurable universal operating system is scaled to include all of the operating system resources;

wherein scalable configurable universal operating system is configured to provide programming that provides processes or procedures that enable an individual to perform at least one action selected from the group consisting of:

adding to cyber devices, at least one member selected from the group consisting of: (i) cyber processes, (ii) cyber procedures, and (iii) cyber components;

removing from cyber devices, at least one member selected from the group consisting of: (i) cyber processes, (ii) cyber procedures, and (iii) cyber components;

altering at least one member selected from the group consisting of: (i) cyber processes, (ii) cyber procedures, and (iii) cyber components that are parts of cyber devices; and changing a configuration of at least one member selected from the group consisting of: (i) cyber processes, (ii) cyber procedures, and (iii) cyber components that are parts of cyber devices;

providing, with the established scalable configurable universal operating system, at least one part of at least one member selected from the group consisting of:

(a) processes or procedures that provide for properly identifying individuals, (b) processes or procedures that provide for properly identifying cyber devices, (c) processes or procedures that provide for requiring that at least one individual be properly identified prior to at least one step that at least one cyber interaction of said at least one individual carries out throughout said at least one cyber system, (d) processes or procedures that provide for requiring that at least one cyber device be properly identified prior to at least one step that at least one cyber interaction of said at least one cyber device carries out throughout said at least one cyber system, (e) processes or procedures that provide for at least one individual to be properly identified prior to at least one step that at least one cyber interaction of said at least one individual carries out throughout said at least one cyber system, (f) processes or procedures that provide for at least one cyber device to be properly identified prior to at least one step that at least one cyber interaction of said at least one cyber device carries out throughout said at least one cyber system, (g) processes or procedures that provide for operations of, or use of, cyber communications networks, (h) processes or procedures that provide for operations of, or use of, cyber portals, (i) processes or procedures that provide for operations of, or use of, point of cyber access computers, (j) processes or procedures that provide for operations of, or use of, private computers, (k) processes or procedures that provide for operations of, or use of, public computers, (l) processes or procedures that provide for operations of, or use of, device-based cyber assets, (m) processes or procedures that provide for operations of, or use of, device-based cyber resources, (n) processes or procedures that provide for operations of, or use of, cyber device managers, (o) processes or procedures that provide for operations of, or use of, cyber telephone systems, (p) processes or procedures that provide for operations of, or use of, cyber transfer packet systems, (q) processes or procedures that provide for operations of, or use of, mobile or in-motion cyber devices, (r) processes or procedures that provide for operations of, or use of, cyber vaults, (s) processes or procedures that provide for operations of, or use of, cyber health systems, (t) processes or procedures that provide for operations of, or use of, at least one member selected from the group consisting of:
   (i) health care related cyber devices,
   (ii) health care related cyber assets, and
   (iii) health care related cyber resources, (u) processes or procedures that provide for operations of, or use of, cyber rights licensing systems, (v) processes or procedures that provide for operations of, or use of, cyber mail systems, (w) processes or procedures that provide for operations of, or use of, cyber site systems, (x) processes or procedures that provide for operations of, or use of, cyber education systems, (y) processes or procedures that provide for operations of, or use of, cyber payment systems, (z) processes or procedures that provide for operations of, or use of, at least one scalable configurable universal operating system standard device interconnection interface that is utilized by at least one cyber device, (aa) processes or procedures that provide for operations of, or use of, a frames and scrolls system or format for image-based cyber content, (bb) processes or procedures that provide for operations of, or use of, autonomous devices, (cc) processes or procedures that provide for at least one member selected from the group consisting of:
   (i) creating,
   (ii) accessing,
   (iii) modifying,
   (iv) using,
   (v) sharing,
   (vi) storing, and
   (vii) managing, file-based cyber assets, (dd) processes or procedures that provide for at least one member selected from the group consisting of:
   (i) creating,
   (ii) accessing,
   (iii) modifying,
   (iv) using,
   (v) sharing,
   (vi) storing, and
   (vii) managing,
file-based cyber resources, (ee) processes or procedures that provide security, (ff) processes or procedures that provide historical records regarding any aspect of operations of cyber systems, and (gg) processes or procedures that enable an individual to exclusively select at least one setting of at least one member selected from the group consisting of:
   (i) administrative settings of the individual's at least one cyber system,
   (ii) operational settings of the individual's at least one cyber system, and (iii) access settings of the individual's at least one cyber system; and wherein said scalable universal operating system includes programming that provides processes or procedures that utilize a combination of:
- (a) a virtual equivalent of at least one projector, in conjunction with,
- (b) a virtual equivalent of at least one projection display screen that receives and displays a virtual equivalent of at least one image output from said virtual equivalent of said at least one projector, and
- (c) a virtual equivalent of at least one recorder or capture device that provides a virtual equivalent of at least one recording of at least one image from said at least one projection display screen, or a virtual equivalent of at least one recording of at least one part of an audio output from said at least one projector;
- all of which are configured and utilized for providing interoperability conversion of at least one member selected from the group consisting of:
  - (A) cyber content,
  - (B) cyber programming,
  - (C) human or cyber device interactions, and
  - (D) cyber activities, to or from system standard processes or procedures of the scalable universal operating system.

\* \* \* \* \*